(12) United States Patent
Jang et al.

(10) Patent No.: US 11,902,643 B2
(45) Date of Patent: Feb. 13, 2024

(54) CAMERA MODULE AND CAMERA DEVICE COMPRISING SAME

(71) Applicant: LG INNOTEK CO., LTD., Seoul (KR)

(72) Inventors: Young Bae Jang, Seoul (KR); Dae Sik Jang, Seoul (KR); Chul Kim, Seoul (KR); Hyun Gyu Roh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 243 days.

(21) Appl. No.: 17/616,444

(22) PCT Filed: Jun. 4, 2020

(86) PCT No.: PCT/KR2020/007265
§ 371 (c)(1),
(2) Date: Dec. 3, 2021

(87) PCT Pub. No.: WO2020/246820
PCT Pub. Date: Dec. 10, 2020

(65) Prior Publication Data
US 2022/0239808 A1 Jul. 28, 2022

(30) Foreign Application Priority Data

Jun. 4, 2019 (KR) .................. 10-2019-0066250
Jun. 12, 2019 (KR) .................. 10-2019-0069303
Jul. 1, 2019 (KR) .................. 10-2019-0078576

(51) Int. Cl.
*H04N 23/54* (2023.01)
*G03B 13/36* (2021.01)
*H04N 23/55* (2023.01)

(52) U.S. Cl.
CPC ............. *H04N 23/54* (2023.01); *G03B 13/36* (2013.01); *H04N 23/55* (2023.01)

(58) Field of Classification Search
None
See application file for complete search history.

(56) References Cited

U.S. PATENT DOCUMENTS 7,826,734 B2 11/2010 Shirono et al.
9,091,802 B2 7/2015 Lee et al.
(Continued)

FOREIGN PATENT DOCUMENTS

CN 104520677 A 4/2015
CN 107688245 A 2/2018
(Continued)

OTHER PUBLICATIONS

International Search Report (PCT/ISA/210) issued in PCT/KR2020/007265 dated Sep. 29, 2020.

*Primary Examiner* — Cynthia Segura
(74) *Attorney, Agent, or Firm* — Birch, Stewart, Kolasch & Birch, LLP

(57) ABSTRACT

A camera module according to an embodiment includes base; a guide portion disposed on an inner side of the base; a lens assembly moving along the guide portion; and a substrate disposed on an outer side of the base, wherein the lens assembly includes a conductor disposed under a lower surface thereof, and wherein the substrate includes a resonance coil disposed in a region facing the lower surface of the lens assembly and overlapping at least a part of the conductor in a direction perpendicular to an optical axis direction in response to movement of the lens assembly.

20 Claims, 30 Drawing Sheets

(56) References Cited

U.S. PATENT DOCUMENTS

| | | |
|---|---|---|
| 9,689,712 B2 | 6/2017 | Prüssmeier |
| 9,766,476 B2 | 9/2017 | Yeo |
| 9,897,432 B2 | 2/2018 | Bachar et al. |
| 10,126,633 B2 | 11/2018 | Avivi et al. |
| 10,133,152 B2 | 11/2018 | Kang et al. |
| 10,739,608 B2 | 8/2020 | Moto et al. |
| 10,768,438 B2 | 9/2020 | Moto et al. |
| 10,834,322 B2 | 11/2020 | Lee et al. |
| 10,962,736 B2 | 3/2021 | Kim et al. |
| 2015/0048817 A1 | 2/2015 | Prüssmeier |
| 2018/0067277 A1* | 3/2018 | Bang ............... H02P 25/034 |
| 2018/0095341 A1 | 4/2018 | Lee et al. |
| 2018/0175758 A1* | 6/2018 | Chan ................ H02K 11/225 |
| 2019/0011661 A1 | 1/2019 | Kim et al. |
| 2019/0124265 A1 | 4/2019 | Lee et al. |
| 2019/0258076 A1 | 8/2019 | Moto et al. |
| 2020/0241238 A1 | 7/2020 | Park |
| 2020/0363648 A1 | 11/2020 | Moto et al. |

FOREIGN PATENT DOCUMENTS

| | | |
|---|---|---|
| CN | 109218578 A | 1/2019 |
| CN | 109696737 A | 4/2019 |
| JP | 2006-98579 A | 4/2006 |
| JP | 2009-271204 A | 4/2018 |
| KR | 10-2010-0003172 A | 1/2010 |
| KR | 10-1252488 B1 | 4/2013 |
| KR | 10-2014-0086622 A | 7/2014 |
| KR | 10-2015-0007699 A | 1/2015 |
| KR | 10-2017-0126993 A | 11/2017 |
| KR | 10-2018-0037879 A | 4/2018 |
| KR | 10-1849016 B1 | 4/2018 |
| KR | 10-2018-0085460 A | 7/2018 |
| KR | 10-2019-0037863 A | 4/2019 |

\* cited by examiner (a)

(b)

(c)

(a)

(b)

(a)

(b)

CAMERA MODULE AND CAMERA DEVICE COMPRISING SAME

CROSS REFERENCE TO RELATED APPLICATIONS

This application is the National Phase of PCT International Application No. PCT/KR2020/007265, filed on Jun. 4, 2020, which claims priority under 35 U.S.C. 119(a) to Patent Application Nos. 10-2019-0066250, filed in the Republic of Korea on Jun. 4, 2019, 10-2019-0069303, filed in the Republic of Korea on Jun. 12, 2019, and 10-2019-0078576, filed in the Republic of Korea on Jul. 1, 2019, all of which are hereby expressly incorporated by reference into the present application.

TECHNICAL FIELD

An embodiment relates to a camera module and a camera device comprising the same.

BACKGROUND ART

The camera module captures a subject and stores it as an image or video, and is installed in mobile terminals such as cell phones, laptops, drones, and vehicles.

On the other hand, portable devices such as smartphones, tablet PCs, and laptops have built-in micro camera modules, and such a camera module may perform an autofocus (AF) function that automatically adjusts a distance between an image sensor and a lens to align the focal lengths of the lenses.

In addition, recent camera modules may perform a zooming function of zooming up or zooming out by increasing or decreasing a magnification of a distant subject through a zoom lens.

In addition, recent camera modules employ Image Stabilization (IS) technology to correct or prevent image shake due to camera movement caused by unstable fixing devices or user movement.

The image stabilization (IS) technology includes an optical image stabilizer (OIS) technology and an image stabilization prevention technology using an image sensor.

OIS technology is a technology that corrects motion by changing the path of light, and image stabilization technology using an image sensor is a technology that compensates movement by mechanical and electronic methods, but OIS technology is being adopted more and more.

On the other hand, OIS technology is a method of correcting the image quality by moving the lens or image sensor of the camera to correct the optical path, in particular, OIS technology detects camera movement through a gyro sensor and calculates a distance that a lens or image sensor should move based on this.

For example, the OIS correction method includes a lens movement method and a module tilting method. In the lens movement method, only the lens in the camera module is moved to realign a center of the image sensor and the optical axis. On the other hand, the module tilting method is a method of moving an entire module including the lens and image sensor.

In particular, the module tilting method has a wider correction range than the lens movement method, and since the focal length between the lens and the image sensor is fixed, it has the advantage of minimizing image distortion.

On the other hand, in the case of the lens movement method, a Hall sensor is used to detect the position and movement of the lens. However, the Hall sensor as described above has linearity when the lens movement distance is small, but has a problem in that the linearity decreases as the lens movement distance increases. In addition, the Hall sensor is greatly affected by a surrounding environment, and in particular, has a problem of poor reliability due to heat generated when the camera module is driven.

DISCLOSURE

Technical Problem

An embodiment provides a camera module including a position detection sensor having excellent linearity and hysteresis even when a lens movement distance increases, and a camera device including the same.

In addition, an embodiment provides a camera module and a camera device including the same, which can solve reliability problems that may occur in various usage environments of the camera module and facilitate assembly by making a base and a rail separable from each other.

In addition, an embodiment provides a camera module and a camera device including the same, which can facilitate the design of the lens barrel and the design of the mover by making the lens barrel and the mover separable from each other. It also provides a camera module and device that facilitates assembly of the lens barrel, mover, base and rail.

In addition, an embodiment provides a camera module capable of preventing friction torque from being generated when a lens is moved through zooming in the camera module, and a camera device including the same.

In addition, an embodiment provides a camera module and a camera device including the same, which can prevent the occurrence of a phenomenon in which a lens decent or a lens tilt or the center of the lens and the center axis of the image sensor do not coincide when the lens is moved through zooming in the camera module.

In addition, an embodiment provides an ultra-slim and ultra-small camera module and a camera device including the same.

In addition, an embodiment provides a camera actuator capable of securing a sufficient amount of light by resolving a size limitation of a lens in a lens assembly of an optical system when OIS is implemented, and a camera module including the same.

In addition, an embodiment provides a camera module capable of exhibiting the best optical characteristics by minimizing the occurrence of a decent or tilt phenomenon when implementing OIS, and a camera device including the same.

In addition, an embodiment provides a camera module capable of preventing magnetic field interference with a magnet for AF or Zoom and a camera device including the same when implementing OIS.

In addition, one of the technical tasks of the embodiment is to provide a camera module capable of implementing OIS with low power consumption and a camera device including the same.

The technical problems of the embodiments are not limited to those described in this item, and include those that can be grasped from the entire description of the invention.

Technical Solution

A camera module according to an embodiment includes base; a guide portion disposed on an inner side of the base; a lens assembly moving along the guide portion; and a substrate disposed on an outer side of the base, wherein the lens assembly includes a conductor disposed under a lower surface thereof, and wherein the substrate includes a resonance coil disposed in a region facing the lower surface of the lens assembly and overlapping at least a part of the conductor in a direction perpendicular to an optical axis direction in response to movement of the lens assembly.

In addition, the guide portion includes a first guide portion disposed on a first inner side of the base; and a second guide portion disposed on a second inner side facing the first inner side of the base, wherein the lens assembly includes a first lens assembly moving along the first guide portion; and a second lens assembly moving along the second guide portion.

In addition, the conductor includes a first conductor disposed under a lower surface of the first lens assembly; and a second conductor disposed under a lower surface of the second lens assembly; wherein the resonance coil includes a first resonance coil overlapping at least a part of the first conductor within a movement range of the first conductor corresponding to a stroke of the first lens assembly; and a second resonance coil overlapping at least a part of the second conductor within a movement range of the second conductor corresponding to a stroke of the second lens assembly.

In addition, the first resonance coil is disposed on the substrate to be spaced apart from the second resonance coil.

In addition, the movement range of the first conductor does not overlap the movement range of the second conductor in a direction perpendicular to the optical axis direction.

In addition, the first resonance coil is spaced apart from the first conductor by a first distance, wherein the second resonance coil is spaced apart from the second conductor by a second distance, wherein at least one of the first and second distances is in the range of 1.0 mm to 2.0 mm.

In addition, at least one of the first and second resonance coils has a thickness of 50 μm or more.

In addition, at least one of the first and second resonance coils has a width in the range of 50 um to 1 mm.

In addition, at least one of the first and second resonance coils is disposed by turning a plurality of times with a spacing in the range of 50 um to 300 um on the substrate.

In addition, at least one of the first and second resonance coils has an outer width that is at least three times greater than an inner width.

In addition, the substrate includes a plurality of insulating layers, and each of the first and second resonance coils is disposed on the plurality of insulating layers to have a plurality of layer structures.

In addition, the plurality of insulating layers includes first to fourth insulating layers, wherein each of the first and second resonance coils includes a first portion disposed on the first insulating layer and disposed by turning in a first direction; a second portion disposed on the second insulating layer, connected to the first portion, and disposed by turning in a second direction opposite to the first direction; a third portion disposed on the third insulating layer, connected to the second portion, and disposed by turning in the first direction; and a fourth portion disposed on the fourth insulating layer, connected to the third portion, and disposed by turning in the second direction.

In addition, each of the first and second resonance coils includes an oscillation coil and a first and second receiving coil, and the oscillation coil is disposed to surround an outer side of the first and second receiving coils.

In addition, the plurality of insulating layers includes first to sixth insulating layers, wherein each of the first and second resonance coils includes a first portion of the oscillation coil disposed on the first insulating layer and disposed by turning in a first direction; a second portion of the oscillation coil disposed on the second insulating layer, connected to the first portion of the oscillation coil, and disposed by turning in a second direction opposite to the first direction; a first portion of the first receiving coil disposed on the second insulating layer; a second portion of the first receiving coil disposed on the third insulating layer and connected to the first portion of the first receiving coil; a first portion of the second receiving coil disposed on the fourth insulating layer; a third portion of the oscillation coil disposed on the fifth insulating layer, connected to the second portion of the oscillation coil, and disposed by turning in the first direction; a second portion of the second receiving coil disposed on the fifth insulating layer and connected to the first portion of the second receiving coil; and a fourth portion of the oscillation coil disposed on the sixth insulating layer, connected to the third portion of the oscillation coil, and disposed by turning in the second direction.

In addition, the first receiving coil and the second receiving coil have a shape in which a sine wave and a cosine wave are combined.

In addition, the sine wave and the cosine wave include a rising part and a falling part, and a rising part of the first receiving coil is disposed on a different layer from a falling part of the first receiving coil, and a rising part of the second receiving coil is disposed on a different layer from a falling part of the first receiving coil.

On the other hand, a camera module according to an embodiment includes a base; a guide portion disposed on an inner side of the base; a lens assembly moving along the guide portion; and a substrate disposed on an outer side the base, wherein the lens assembly includes a mover on which the driving portion is disposed; and a lens barrel detachably coupled to the mover and on which a lens is disposed.

In addition, the guide portion, a first guide portion disposed on a first inner side of the base; and a second guide portion disposed on a second inner side facing the first inner side of the base, wherein the lens assembly includes a first lens assembly moving along the first guide portion; and a second lens assembly moving along the second guide portion.

In addition, the first lens assembly includes a first lens barrel on which a first lens is disposed and a first mover on which a first driving portion is disposed, and the second lens assembly includes a second lens barrel on which a second lens is disposed. and a second mover on which a second driving portion is disposed.

In addition, the first mover includes a first coupling portion to which the first driving portion is coupled and a second coupling portion to which the first lens barrel is coupled, and the second mover includes a third coupling portion to which the second driving portion is coupled, and a fourth coupling portion to which the second lens barrel is coupled, wherein the first lens barrel is detachably coupled to the second coupling portion, and the second lens barrel is detachably coupled to the fourth coupling portion.

In addition, the substrate includes a first region disposed on an outer side of a lower surface of the base; a second region disposed on a first outer side corresponding to the first inner side of the base; and a third region disposed on a second outer side corresponding to the second inner side of the base.

In addition, the first lens barrel includes a first yoke receiving portion coupled to the second coupling portion and receiving the first yoke therein, and the second lens barrel includes a second yoke receiving portion coupled to the fourth coupling portion and receiving the second yoke therein.

In addition, the camera module further includes a first ball disposed between the first guide portion and the first mover; and a second ball disposed between the second guide portion and the second mover.

In addition, the first ball includes at least one first-first ball disposed on an upper side of the first mover and at least one first-second ball disposed on a lower side of the first mover, and wherein the second ball includes at least one second-first ball disposed on an upper side of the second mover and at least one second-second ball disposed on a lower side of the second mover.

In addition, the first mover includes a first-first arrangement portion having a first shape so that the first-first ball is disposed on an upper surface thereof, and a first-second arrangement portion having a second shape so that the second-first ball is disposed on a lower surface thereof, wherein the second mover includes a second-first arrangement portion having the first shape so that the second-first ball is disposed on an upper surface thereof, and a second-second arrangement portion having the second shape so that the second-second ball is disposed on a lower surface thereof, and wherein the first shape is different from the second shape.

In addition, the first shape has a groove shape into which the first-first ball or the second-first ball is inserted, and the second shape has a rail shape in which the first-second ball or the second-second ball is disposed and extends in an optical axis direction.

In addition, at least one of the first to third regions of the substrate is a rigid region, and the substrate includes a first flexible region between the first and second regions and a second flexible region between the second and third regions, wherein the first and second flexible regions are bent along an outer side of the base, and the each of the first to third regions is disposed on different outer surfaces of the base.

In addition, the first lens assembly includes a first conductor disposed on a lower surface of the first lens barrel, and the second lens assembly includes a second conductor disposed on a lower surface of the second lens barrel.

In addition, the substrate includes a first resonance coil disposed on a first part of the first region and a second resonance coil disposed on a second part of the first region, and wherein the first resonance coil is spaced apart from the second resonance coil by a predetermined interval.

In addition, the camera module according to an embodiment includes a base; a first guide portion disposed on a first inner side of the base; a second guide portion disposed on a second inner side of the base; a first lens assembly moving along the first guide portion; a second lens assembly moving along the second guide portion; and a substrate disposed on an outer side of the base, wherein the substrate includes: a first region disposed on a lower surface of the base; a second region disposed on a first outer side corresponding to the first inner side of the base, and a third region disposed on a second outer side corresponding to the second inner side of the base.

In addition, the first lens assembly includes a first lens barrel on which a first lens is disposed and a first mover on which a first driving portion is disposed, and the second lens assembly includes a second lens barrel on which a second lens is disposed, and a second mover on which a second driving portion is disposed, wherein the substrate includes a third driving portion disposed on the second region to face the first driving portion, and a fourth driving portion disposed on the third region to face the second driving portion.

In addition, at least one of the first to third regions of the substrate is a rigid region, and the substrate includes a first flexible region between the first and second regions; and a second flexible region between the second and third regions, and wherein the first and second flexible regions are bent along the outer side of the base.

In addition, the first lens assembly includes a first conductor disposed under a lower surface of the first lens barrel, and the second lens assembly includes a second conductor disposed on a lower surface of the second lens barrel.

In addition, a width of at least one of the first conductor and the second conductor changes in the optical axis direction.

In addition, at least one of the first and second conductors has any one of a triangular shape and a rhombus shape.

In addition, the width of the first and second conductors is linearly changed in the optical axis direction.

In addition, the substrate includes a first resonance coil disposed on a first part of the first region and a second resonance coil disposed on a second part of the first region, wherein the first resonance coil is spaced apart from the second resonance coil by a predetermined interval.

In addition, an opening is formed on a lower surface of the base in an overlapping region of the first resonance coil and the second resonance coil.

In addition, the first part of the first region overlaps with a movement range of the first conductor corresponding to a stroke of the first lens assembly in a first direction, and the second part of the first region is a portion overlapping with a movement range of the second conductor corresponding to the stroke of the second lens assembly in the first direction, and the movement range of the first conductor does not overlap with the movement range of the second conductor in the first direction.

In addition, the first resonance coil is spaced apart from the first conductor by a first distance, the second resonance coil is spaced apart from the second conductor by a second distance, and wherein each of the first and second distances satisfies a range of 1.0 mm to 2.0 mm.

Advantageous Effects

According to the embodiment, the first barrel assembly 121 and the first mover 122, which are separately formed and assembled, are separately adopted, without disposing the driving portion on the lens barrel so that the movement-related operation is performed in the lens barrel itself. Accordingly, design easiness of the first barrel assembly 121 and the first mover 122 may be improved. That is, the first barrel assembly 121 in the embodiment may be designed in consideration of only the lens specifications, the first mover 122 only needs to be designed in consideration of matters related to the movement, and accordingly, design easiness can be improved.

In addition, in the prior art, when the reliability of the actuator is evaluated, since all movement-related parts such as a magnet or a ball are disposed in the first lens barrel, and as described above, the reliability evaluation of the actuator was performed only in a state in which all parts such as the first lens barrel, the magnet, and the ball were combined. Accordingly, in the prior art, when a problem occurs in the performance of the actuator, the lens barrel itself must be discarded, resulting in costly waste.

On the other hand, according to the embodiment, the first mover 122 and the first barrel assembly 121 are designed separately. In this case, when evaluating the reliability of the actuator in the embodiment, the reliability evaluation related to the movement of the first mover 122 may be performed in a state in which the first barrel assembly 121 is not coupled to the first mover 122, and accordingly, the ease of reliability evaluation can be improved. In addition, when a problem occurs in the reliability evaluation of the first mover 122, only the first mover 122 needs to be discarded, and accordingly, the manufacturing cost can be significantly reduced.

In addition, in the embodiment, the position of the lens assembly is sensed through an inductive change instead of the Hall sensor for detecting the position of the lens assembly in the prior art, and accordingly, it is possible to increase the position detection accuracy of the lens assembly, thereby improving the operation reliability of the camera module.

In addition, in the embodiment, the movement positions of the first lens assembly and the second lens assembly are sensed using the first resonator and the second resonator, and accordingly, it is possible to provide a position detection sensor having excellent linearity and hysteresis even when the lens movement distance is increased.

According to the camera module according to the embodiment, there is a technical effect that can solve the problem of friction torque generation during zooming (zooming).

For example, in the embodiment, as the lens assembly is driven in a state in which the first guide portion and the second guide portion, which are precisely numerically controlled in the base, are driven, frictional resistance can be reduced by reducing frictional torque, and accordingly there are technical effects such as improvement of driving force during zooming, reduction of power consumption, and improvement of control characteristics.

Accordingly, according to the embodiment, when zooming, there is a complex technical effect that can significantly improve image quality or resolution by minimizing the friction torque and preventing the occurrence of a lens tilt or a lens decenter or a phenomenon in which the lens group and a central axis of the image sensor are not aligned.

In addition, the camera module according to the embodiment may align the plurality of lens groups by solving the problem of lens decenter or tilt during zooming, and through this, there is a technical effect of remarkably improving image quality or resolution by preventing a change in the angle of view or defocusing.

For example, according to the embodiment, the first guide portion includes the first-first rail and the first-second rail, so that the first-first rail and the first-second rail guide the first lens assembly, accordingly, there is a technical effect that can increase the alignment accuracy.

In addition, by providing two rails per lens assembly, there is a technical effect of ensuring accuracy with the other one even when one of the rails is misaligned.

In addition, according to the embodiment, by providing two rails per lens assembly, when a ball friction force issue, which will be described later, occurs in one of the rails, the rolling operation can be smoothly performed in the other rail, and accordingly, there is a technical effect that can secure the driving force.

In addition, according to the embodiment, by providing two rails per lens assembly, it is possible to secure a wide gap between the balls to be described later, through this, driving force can be improved, magnetic field interference can be prevented, and there is a technical effect of preventing tilt of the lens assembly.

In the prior art, when the guide rail is disposed on the base itself, a gradient occurs depending on the injection direction, so there is a difficulty in dimensional management, and there is a technical problem in that the friction torque increases and the driving force decreases when it is not properly injected.

On the other hand, according to the embodiment, the guide rail is not disposed on the base itself, but the first guide portion and the second guide portion are separately formed and assembled separately from the base, and this has a special technical effect that can prevent the generation of gradients depending on the injection direction.

DESCRIPTION OF DRAWINGS

FIG. 5b is a perspective view in which the driving portion is coupled to the lens portion and the mover shown in FIG. 5a.

FIG. 19b is a plan view of the resonator shown in FIG. 19a.

FIG. 20b is a view specifically showing a resonance coil in the resonator shown in FIG. 20a.

MODES OF THE INVENTION

Hereinafter, preferred embodiments of the present invention will be described in detail with reference to the accompanying drawings.

However, the technical spirit of the present invention is not limited to some embodiments described, but may be implemented in various different forms, and, as long as it is within the scope of the technical spirit of the present invention, one or more of the components may be selectively combined and substituted between the embodiments.

In addition, terms (including technical and scientific terms) used in the embodiments of the present invention may be interpreted as meanings that can be generally understood by those of ordinary skill in the art to which the present invention pertains unless explicitly defined and described, and the meanings of commonly used terms such as predefined terms may be interpreted in consideration of the contextual meaning of the related art. In addition, the terms used in the embodiments of the present invention are for describing the embodiments and are not intended to limit the present invention.

In this specification, the singular may also include the plural unless specifically stated in the phrase, and when it is described as "A and (and) at least one (or more than one) of B and C", it may include one or more of all combinations that can be combined with A, B, and C. In addition, in describing the components of the embodiment of the present invention, terms such as first, second, A, B, (a), (b), etc. may be used.

These terms are only used to distinguish the component from other components, and are not limited to the essence, order, or order of the component by the term. And, when it is described that a component is 'connected', 'coupled' or 'contacted' to another component, the component is not only directly connected, coupled or contacted to the other component, but also with the component it may also include a case of 'connected', 'coupled' or 'contacted' due to another element between the other elements.

In addition, when it is described as being formed or disposed on "above (on) or below (under)" of each component, the above (on) or below (under) is one as well as when two components are in direct contact with each other. Also includes a case in which another component as described above is formed or disposed between two components. In addition, when expressed as "above (up) or below (under)", it may include not only the upward direction but also the meaning of the downward direction based on one component.

EMBODIMENT

Figure 1:
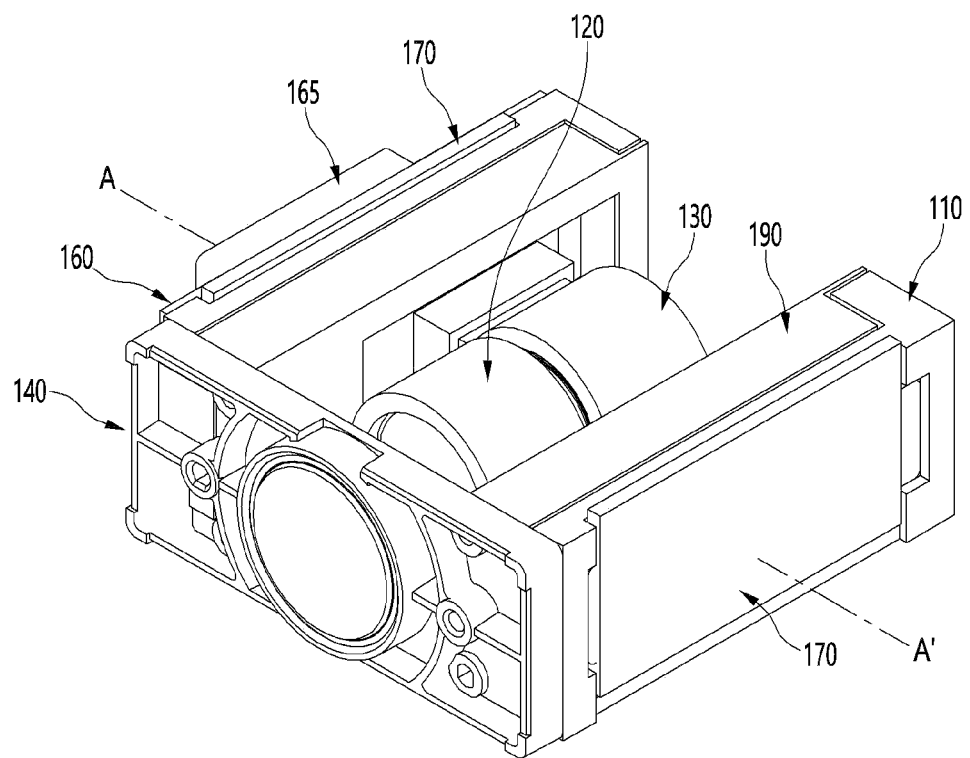
FIG. 1 is a perspective view of a camera module according to an embodiment.
Figure 2:
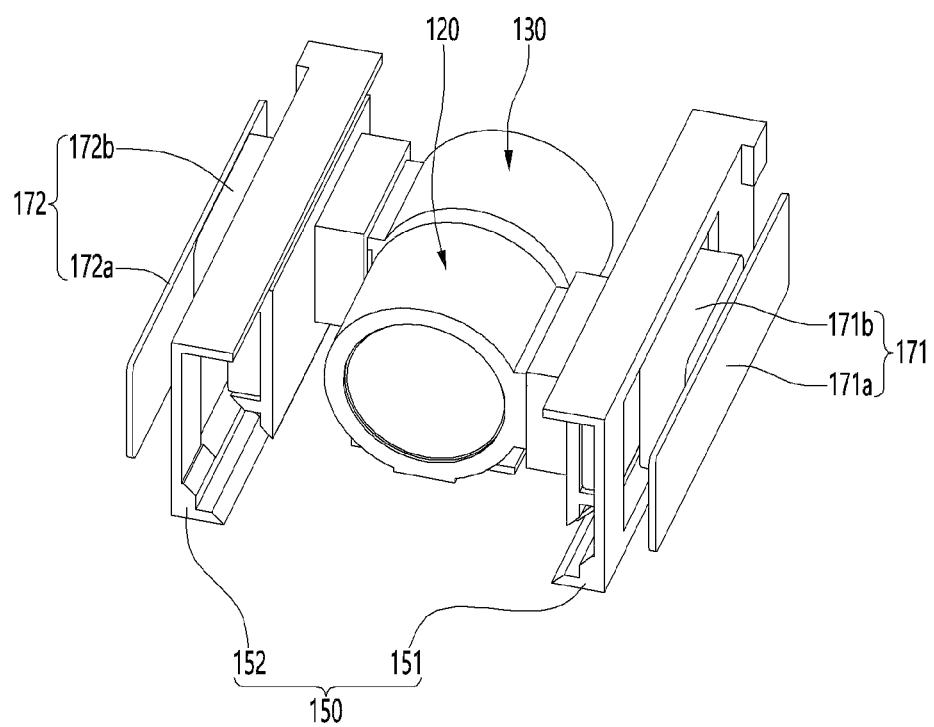
FIG. 2 is a perspective view in which some components are omitted from the camera module according to the embodiment shown in FIG. 1.
Figure 3:
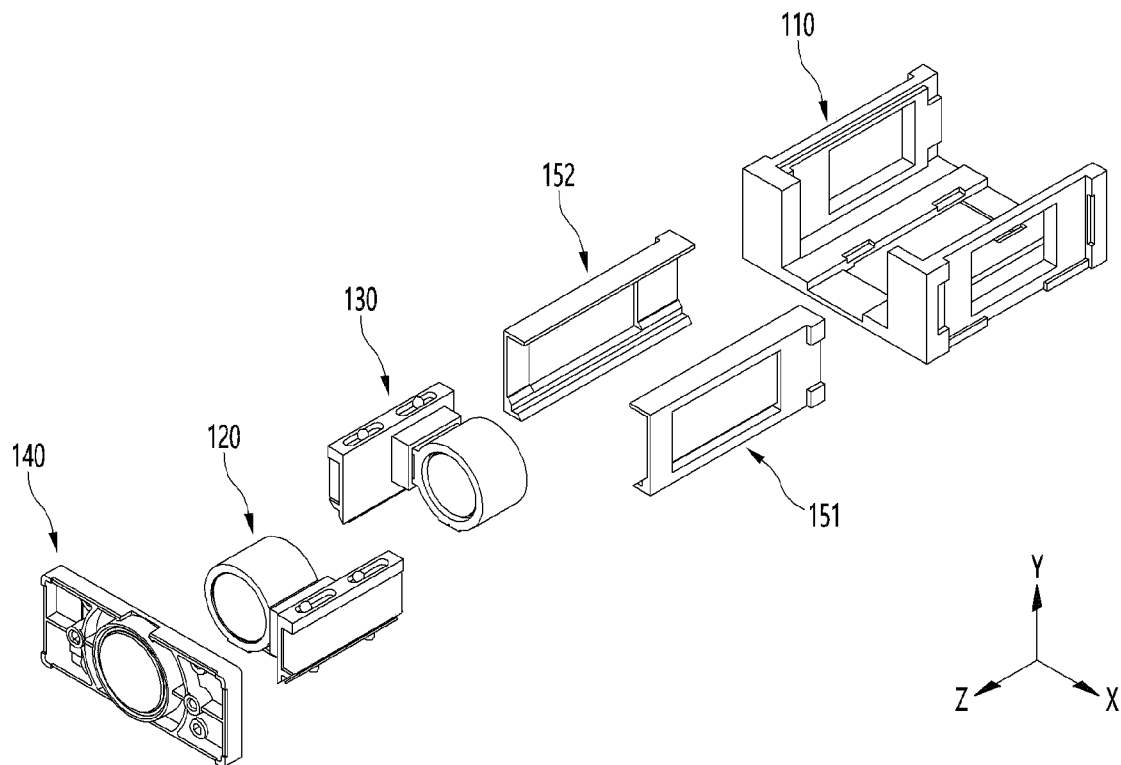
FIG. 3 is an exploded perspective view in which some components are omitted from the camera module according to the embodiment shown in FIG. 1.

FIG. 1 is a perspective view of a camera module according to an embodiment, FIG. 2 is a perspective view in which some components are omitted from the camera module according to the embodiment shown in FIG. 1, and FIG. 3 is an exploded perspective view in which some components are omitted from the camera module according to the embodiment shown in FIG. 1.

Referring to FIG. 1, a camera module 100 according to an embodiment may include a base 110, a substrate 160 disposed on an outer side of the base 110, a driver IC 165 disposed on one surface of the substrate 160, a first lens assembly 120, a second lens assembly 130, a third lens assembly 140, a driving portion 170, and a guide cover 190.

FIG. 2 is a perspective view in which the base 110, the substrate 160, the guide cover 190, and the driver IC 165 are omitted in FIG. 1, and referring to FIG. 2, the camera module according to the embodiment may include a guide portion 150 including a first guide portion 151 and a second guide portion 152, a third driving portion 171, the fourth driving portion 172, a first lens assembly 120, and a second lens assembly 130.

The third driving portion 171 and the fourth driving portion 172 may include a coil or a magnet.

For example, when the third driving portion 171 and the fourth driving portion 172 include a coil, the third driving portion 171 may include a first coil portion 171a and a first yoke 171b, and, the fourth driving portion 172 may include a second coil portion 172a and a second yoke 172b.

Alternatively, the third driving portion 171 and the fourth driving portion 172 may include a magnet.

In the xyz-axis direction shown in FIG. 3, the z-axis means an optical axis direction or a direction parallel to this, the xz plane represents a ground, and the x-axis means a direction perpendicular to the z-axis in the ground (xz plane), and the y-axis may mean a direction perpendicular to the ground.

Referring to FIG. 3, the camera module 100 according to the embodiment may include a base 110, a first guide portion 151 disposed on one side of the base, a second guide portion 152 disposed on the other side of the base 110, a first lens assembly 120 corresponding to the first guide portion 151, a second lens assembly 130 corresponding to the second guide portion 152, a first ball 181 (to be described later) disposed between the first guide portion and the first lens assembly 120, and a second ball (to be described later) disposed between the second guide portion 152 and the second lens assembly 130.

In addition, the embodiment may include a third lens assembly 140 disposed in front of the first lens assembly 120 in the optical axis direction.

Hereinafter, specific features of the camera module according to the embodiment will be described in detail with reference to attached drawings.

<Guide Portion>

Referring to FIGS. 2 and 3, in the embodiment, the first guide portion 151 is disposed adjacent to a first sidewall (111, to be described later) of the base 110, and a second guide portion 152 disposed adjacent to a second sidewall 112 (described later) opposite to the first sidewall 111 of the base 110.

The first guide portion 151 may be disposed between the first lens assembly 120 and the first sidewall 111 of the base 110.

The second guide portion 152 may be disposed between the second lens assembly 130 and the second sidewall 112 of the base 110. The first sidewall 111 and the second sidewall 112 of the base 110 may be disposed to face each other.

According to the embodiment, as the lens assembly is driven in a state in which the first guide portion 151 and the second guide portion 152, which are precisely numerically controlled in the base 110, are driven, frictional resistance can be reduced by reducing frictional torque, and accordingly there are technical effects such as improvement of driving force during zooming, reduction of power consumption, and improvement of control characteristics.

Accordingly, according to the embodiment, when zooming, there is a complex technical effect that can significantly improve image quality or resolution by minimizing the friction torque and preventing the occurrence of a lens tilt or a lens decenter or a phenomenon in which the lens group and a central axis of the image sensor are not aligned.

In the prior art, when the guide rail is disposed on the base itself, a gradient occurs depending on the injection direction, so there is a difficulty in dimensional management, and there is a technical problem in that the friction torque increases and the driving force decreases when it is not properly injected.

In addition, in the prior art, the base and the guide rail are integrally formed. In this case, the base may be formed of plastic that can be molded by injection, and thus the guide rail is also made of plastic. However, the camera module is exposed to various dangerous situations (e.g., falling) in use environment, thereby causing a reliability problem. For example, when a dangerous situation such as a fall occurs in the environment in which the camera module is used, a problem such as nicking of the guide rail occurs, and thus the lens assembly cannot be moved to an accurate position.

On the other hand, according to the embodiment, instead of arranging the guide rail on the base itself, the first guide portion 151 and the second guide portion 152 that are separately formed and assembled are separately adopted, and thereby, there is a special technical effect that can prevent the generation of gradient depending on the injection direction. In addition, as the base 110 and the guide portions 151 and 152 are separately employed, the base 110 may be formed of plastic, and the guide portions 151 and 152 may be formed of a metal strong against impact.

The base 110 may be injected in the z-axis direction. When the rail is integrally formed with the base in the prior art, there is a problem in that a straight line of the rail is distorted due to a gradient occurring while the rail is injected in the z-axis.

According to the embodiment, by the first guide portion 151, the second guide portion 152 is injected separately from the base 110, it is possible to significantly prevent the generation of gradients compared to the prior art, so precise injection is possible, and there is a special technical effect that can prevent the generation of gradients due to injection.

In the embodiment, a length of the first guide portion 151 and the second guide portion 152 is shorter than that of the base 110 as they are injected in the X-axis direction. In this case, when the rails 151a and 152a are disposed on the first guide portion 151 and the second guide portion 152, it is possible to minimize the generation of gradient during injection, and there is a technical effect that the straight line of the rail is less likely to be distorted.

Figure 4:
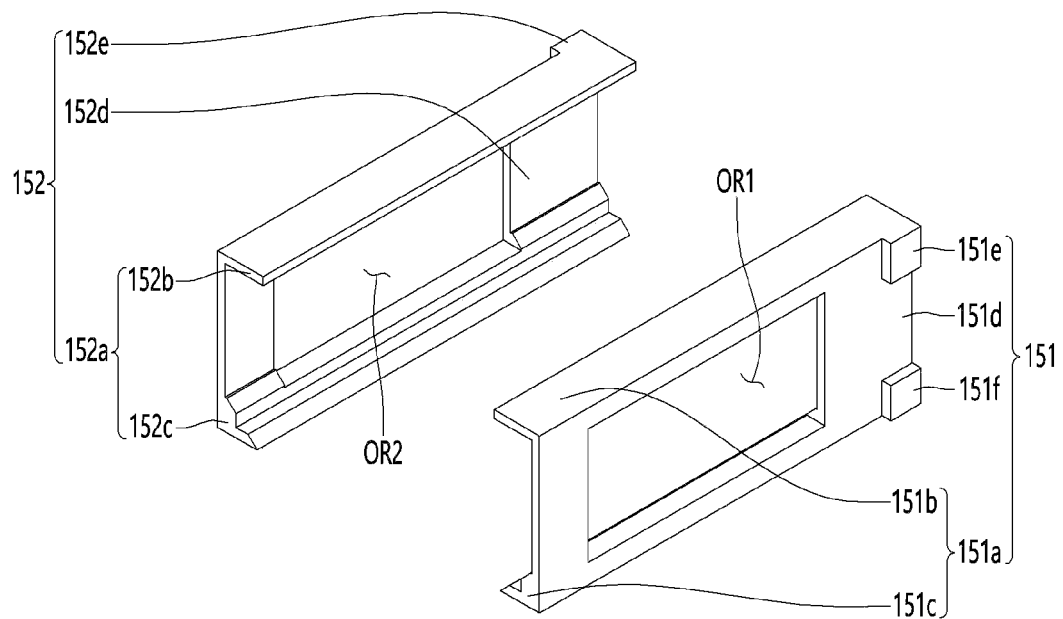
FIG. 4 is an enlarged perspective view of a guide portion in the camera module according to the embodiment.

FIG. 4 is an enlarged perspective view of a guide portion in the camera module according to the embodiment.

Referring to FIG. 4, the first guide portion 151 may include a single or a plurality of first rails 151a. Also, the second guide portion 152 may include a single or a plurality of second rails 152a.

For example, the first rail 151a of the first guide portion 151 may include a first-first rail 151b and a first-second rail 151c. The first guide portion 151 may include a first support portion 151d between the first-first rail 151b and the first-second rail 151c.

Specifically, the first guide portion 151 may include a first support portion 151d. In addition, the first-first rail 151b of the first guide portion 151 may be disposed to protrude from an upper end of an inner surface of the first support portion 151d in the direction in which the second guide portion 152 is disposed (or the direction in which the second sidewall 112 of the base 110 is disposed). In addition, the first-second rail 151c of the first guide portion 151 may be disposed to protrude from a lower end of the inner surface of the first support portion 151d in the direction in which the second guide portion 152 is disposed (or the direction in which the second sidewall 112 of the base 110 is disposed).

According to the embodiment, by providing two rails per lens assembly, there is a technical effect of ensuring accuracy with the other one even when one of the rails is misaligned.

In addition, according to the embodiment, by providing two rails per lens assembly, when a ball friction force issue, which will be described later, occurs in one of the rails, the rolling operation can be smoothly performed in the other rail, and accordingly, there is a technical effect that can secure the driving force.

The first rail 151a may be connected from one surface disposed in the optical axis direction of the first guide portion 151 to the other surface.

A camera actuator and the camera module including the same according to the embodiment may align the plurality of lens groups by solving the problem of lens decenter or tilt during zooming, and through this, there is a technical effect of remarkably improving image quality or resolution by preventing a change in the angle of view or defocusing.

For example, according to the embodiment, the first guide portion 151 includes a first-first rail 151b and a first-second rail 151c, since the first-first rail 151b and the first-second rail 151c guide the first lens assembly 120, there is a technical effect of increasing alignment accuracy.

In addition, according to an embodiment, by providing two rails per lens assembly, it is possible to secure a wide spacing between the balls to be described later, this can improve the driving force, and there is a technical effect of preventing magnetic field interference and preventing tilt in a stopping or moving state of the lens assembly.

In addition, the first guide portion 151 may include a first guide protrusion extending in a lateral direction perpendicular to the extending direction of the first rail 151a.

That is, the first guide portion 151 may include a first guide protrusion protruding from an outer surface of the first support portion 151d in a direction opposite to the direction in which the first rail 151a is disposed.

The first guide protrusion includes a first-first guide protrusion 151e protruding from the upper end of the outer surface of the first support portion 151d in a direction in which the first sidewall 111 of the base 110 is disposed, and a first-second guide protrusion 151f protruding from the lower end of the outer surface of the first support portion 151d in a direction in which the first sidewall 111 of the base 110 is disposed. The positions of the first-first guide protrusion 151e and the first-second guide protrusion 151f may be fixed as they are coupled to a guide coupling portion (described later) provided on the base 110. This will be described later.

Also, referring to FIG. 4, the second guide portion 152 in the embodiment may include a single or a plurality of second rails 152a.

For example, the first rail 152a of the second guide portion 152 may include a second-first rail 152b and a second-second rail 152c. The second guide portion 152 may include a second support portion 152d between the second-first rail 152b and the second-second rail 152c.

Specifically, the second guide portion 152 may include a second support portion 152d. In addition, the second-first rail 152b of the second guide portion 152 may be disposed to protrude from an upper end of an inner surface of the second support portion 152d in the direction in which the first guide portion 151 is disposed (or the direction in which the first sidewall 111 of the base 110 is disposed). In addition, the second-second rail 152c of the second guide portion 152 may be disposed to protrude from a lower end of the inner surface of the second support portion 152d in the direction in which the first guide portion 151 is disposed (or the direction in which the first sidewall 112 of the base 110 is disposed).

According to the embodiment, by providing two rails per lens assembly, there is a technical effect of ensuring accuracy with the other one even when one of the rails is misaligned.

In addition, according to the embodiment, by providing two rails per lens assembly, when a ball friction force issue, which will be described later, occurs in one of the rails, the rolling operation can be smoothly performed in the other rail, and accordingly, there is a technical effect that can secure the driving force.

The second rail 152a may be connected from one surface disposed in the optical axis direction of the second guide portion 152 to the other surface.

A camera actuator and the camera module including the same according to the embodiment may align the plurality of lens groups by solving the problem of lens decenter or tilt during zooming, and through this, there is a technical effect of remarkably improving image quality or resolution by preventing a change in the angle of view or defocusing.

For example, according to the embodiment, the second guide portion 152 includes a second-first rail 152b and a second-second rail 152c, since the second-first rail 152b and the second-second rail 152c guide the second lens assembly 130, there is a technical effect of increasing alignment accuracy.

In addition, according to an embodiment, by providing two rails per lens assembly, it is possible to secure a wide spacing between the balls to be described later, this can improve the driving force, and there is a technical effect of preventing magnetic field interference and preventing tilt in a stopping or moving state of the lens assembly.

In addition, the second guide portion 152 may include a second guide protrusion extending in a lateral direction perpendicular to the extending direction of the second rail 152a.

That is, the second guide portion 152 may include a second guide protrusion protruding from an outer surface of the second support portion 152d in a direction opposite to the direction in which the second rail 152a is disposed.

The second guide protrusion includes a second-first guide protrusion 152e protruding from the upper end of the outer surface of the second support portion 152d in a direction in which the second sidewall 112 of the base 110 is disposed, and a second-second guide protrusion (not shown) protruding from the lower end of the outer surface of the second support portion 152d in a direction in which the second sidewall 112 of the base 110 is disposed. The positions of the second-first guide protrusion 152e and the second-second guide protrusion may be fixed as they are coupled to a guide coupling portion (described later) provided on the base 110. This will be described later.

Meanwhile, the first rail 151a of the first guide portion 151 may include a first-first rail 151b having a first shape R1 and a first-second rail 151c having a second shape R2.

In addition, the second rail 152a of the second guide portion 152 may include a second-first rail 152b having a first shape R1 and a second-second rail 152c having a second shape R2.

In this case, the first shape R1 and the second shape R2 of the first guide portion 151 may be different from each other.

For example, the first shape R1 of the first guide portion 151 and the second guide portion 152 may have a straight shape. In other words, the first-first rail 151b and the second-first rail 152b may have a flat plate shape.

Also, the second shape R2 of the first guide portion 151 and the second guide portion 152 may have an L-shape. However, this is only an embodiment, and the first shape R1 and the second shape R2 of the first guide portion 151 and the second guide portion 152 may be deformed into various shapes according to embodiments.

Meanwhile, although not shown in the drawing, at least one of rib (not shown) may be respectively disposed in a region adjacent to the first-second rail 151c and the second-second rail 152c among the inner surfaces of the first support portion 151d and the second support portion 152d.

In the prior art, as the number of injection-molded products increases or the thickness of the injection-molded products increases, shrinkage occurs, making it difficult to manage dimensions, and when an amount of injection-molded products is reduced, contradictions such as weakening of strength occur.

According to this embodiment, by arranging at least one rib between the first support portion 151d and the first-second rails 151c and between the second support portion 152d and the second-second rails 152c, and there is a complex technical effect that can increase the accuracy of numerical management and secure strength at the same time by reducing the amount of injection molded product.

Meanwhile, the first guide portion 151 may include a first open region OR1. Also, the second guide portion 152 may include a second open region OR2. The first open region OR1 may be an opening exposing the third driving portion 171. Preferably, the first open region OR1 may be an opening exposing the first coil portion 171b constituting the third driving portion 171. Preferably, the first open region OR1 may overlap and align with the first coil portion 171b in the x-axis direction.

The second open region OR2 may be an opening exposing the fourth driving portion 172. Preferably, the second open region OR2 may be an opening exposing the second coil portion 172b constituting the fourth driving portion 172. Preferably, the second open region OR2 may overlap and be aligned with the second coil portion 172b in the x-axis direction.

<First and Second Lens Assemblies and Balls>

Figure 5A:
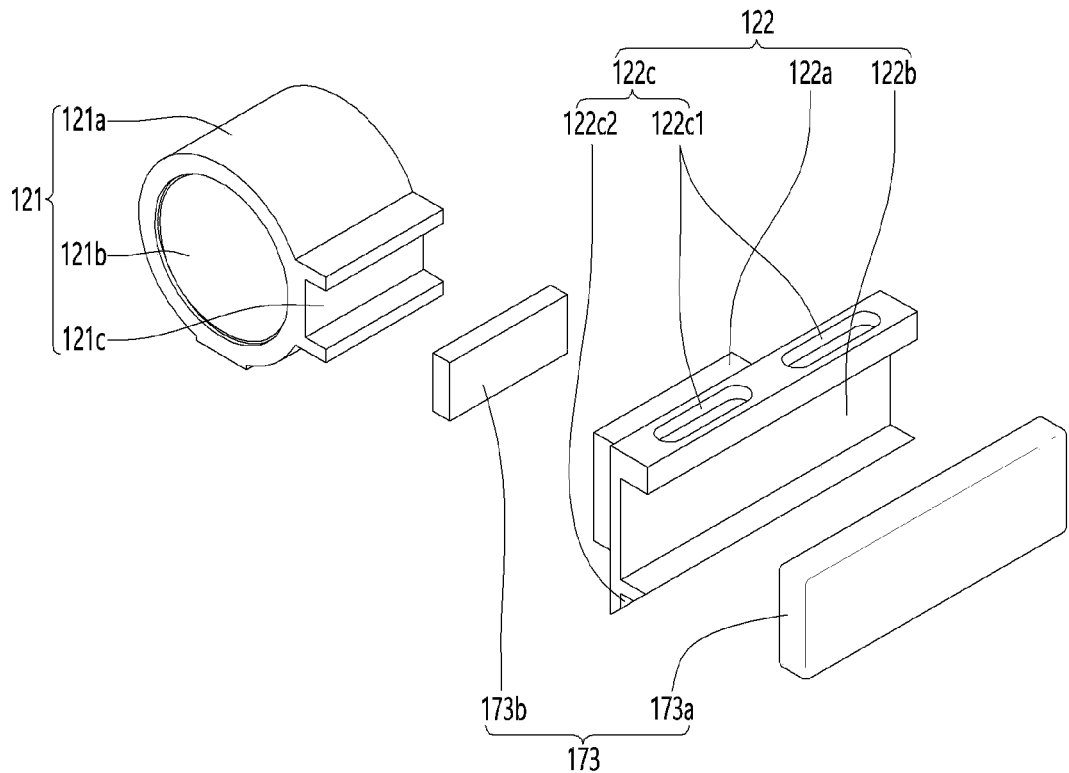
FIG. 5a is an exploded perspective view of a first lens assembly in the camera module according to the embodiment shown in FIG. 3.
Figure 5B:
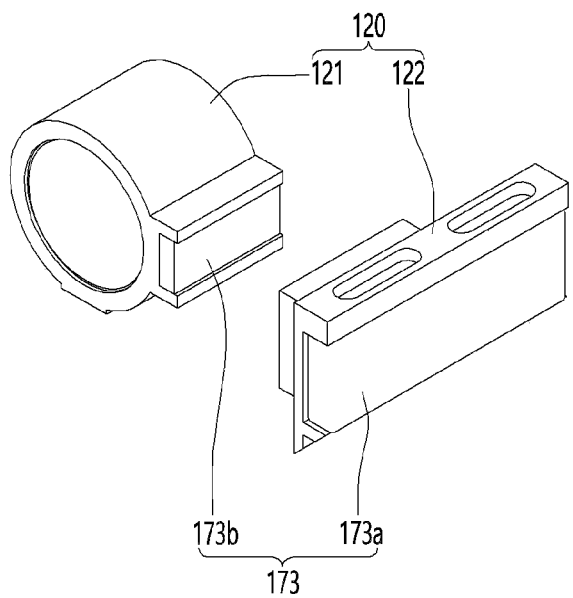
Figure 5C:
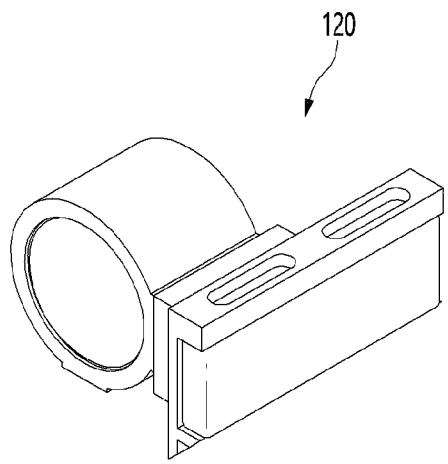
FIG. 5c is a perspective view of a first lens assembly in which a lens portion and a mover are coupled according to an embodiment.
Figure 5D:
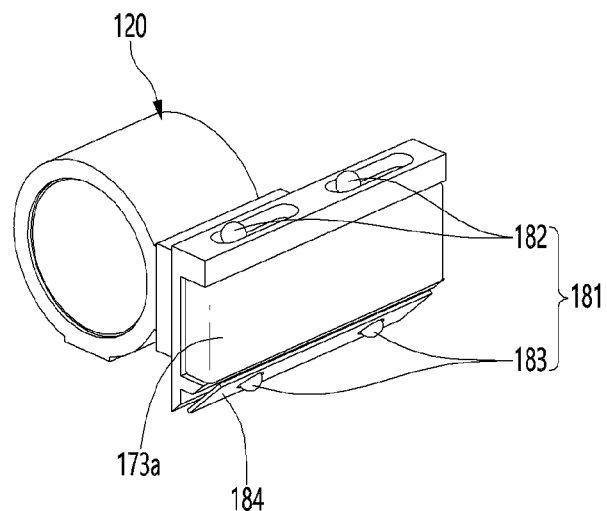
FIG. 5d is a perspective view in which a ball is coupled to the first lens assembly.

Next, FIG. 5a is an exploded perspective view of a first lens assembly 120 in the camera module according to the embodiment shown in FIG. 3, FIG. 5b is a perspective view in which the driving portion is coupled to the lens portion and the mover shown in FIG. 5a, FIG. 5c is a perspective view of a first lens assembly 120 in which a lens portion and a mover are coupled according to an embodiment, and FIG. 5d is a perspective view in which a ball is coupled to the first lens assembly 120.

Referring briefly to FIG. 3, the embodiment may include a first lens assembly 120 moving along the first guide portion 151 and a second lens assembly 130 moving along the second guide portion 152.

Referring back to FIGS. 5a to 5d, the first lens assembly 120 may include a first barrel assembly 121 including a first lens barrel 121a in which a first lens 121b is disposed, a first mover 122 in which a first driving portion 173 is disposed. The first lens barrel 121a and the first mover 122 may be a first housing, and the first housing may have a barrel or barrel shape. The first driving portion 173 may be a magnet driving portion, but is not limited thereto, and may be a coil driving portion including a coil in some cases.

Meanwhile, although only the first lens assembly 120 is showed in the drawings, the second lens assembly 130 may also have a structure corresponding to the first lens assembly 120. That is, the second lens assembly 130 may include a second barrel assembly (not shown) including a second lens barrel in which a second lens (not shown) is disposed, and a second mover (not shown) in which a second driving portion (not shown) is disposed. Here, the second lens barrel and the second mover may be a second housing, and the second housing may have a barrel or barrel shape. The second driving portion may be a magnet driving portion, but is not limited thereto, and may be a coil driving portion including a coil in some cases.

The first driving portion 173 may correspond to the two first rails 151a, and the second driving portion may correspond to the two second rails 152a.

In an embodiment, the first barrel assembly 121 and the first mover 122 may be separated from each other. To this end, the first lens barrel 121a constituting the first barrel assembly 121 has a receiving space for receiving the first lens 121b therein, and an outer surface protrudes in a direction in which the first mover 122 is disposed, and includes a first yoke receiving portion 121c for receiving one configuration of the first driving portion 173 in the protruding interior. A third yoke 173b constituting the first driving portion 173 may be received in the first yoke receiving portion 121c. The first yoke receiving portion 121c may also be referred to as a protruding portion or protrusion coupled to the first mover 122. In addition, a second yoke receiving portion (not shown) in which the fourth yoke is received may also be formed in the second mover corresponding to the second lens assembly 130.

Meanwhile, the first mover 122 includes a first coupling portion 122a. The first coupling portion 122a may have a receiving space therein. Preferably, the receiving space of the first coupling portion 122a may be formed to correspond to the shape of an outer surface of the yoke receiving portion 121c. The yoke receiving portion 121c may be fitted and coupled to the first coupling portion 122a.

In the camera module according to the embodiment, the first lens assembly 120 as a component of the camera actuator may be assembled after the first mover 122 and the first barrel assembly 121 are not integrally formed, but are separately formed.

That is, in the first lens assembly 120 in the prior art, the first mover and the first barrel assembly are integrally formed. In this case, the first barrel assembly should be manufactured in consideration of many factors during manufacturing. That is, in the prior art, the first barrel assembly is designed in consideration of various factors such as the shape and size of the first lens barrel based on the specification of the first lens. However, when the first mover and the first barrel assembly are integrally formed as described above, in addition to the lens specifications, matters related to the movement that the first mover must have should be considered in consideration of the design of the first lens barrel, and accordingly, there was a difficulty in designing the first barrel assembly. That is, in the prior art, when designing the lens barrel, in addition to the lens specification, the movement-related configuration such as the ball arrangement position or the magnet position must also be considered, and accordingly, there were too many considerations, which made the design difficult.

On the other hand, according to the embodiment, the driving portion is disposed on the lens barrel so that movement-related operations are not performed in the lens barrel itself, and by separately employing the first barrel assembly 121 and the first mover 122 that are separately formed and assembled, the easiness of designing the first barrel assembly 121 and the first mover 122 may be improved. That is, the first barrel assembly 121 in the embodiment may be designed in consideration of only the lens specifications, the first mover 122 only needs to be designed in consideration of matters related to the movement, and accordingly, design easiness can be improved.

In addition, in the prior art, when the reliability of the actuator is evaluated, since all movement-related parts such as a magnet or a ball are disposed in the first lens barrel, and as described above, the reliability evaluation of the actuator was performed only in a state in which all parts such as the first lens barrel, the magnet, and the ball were combined. Accordingly, in the prior art, when a problem occurs in the performance of the actuator, the lens barrel itself must be discarded, resulting in costly waste.

On the other hand, according to the embodiment, the first mover 122 and the first barrel assembly 121 are designed separately. In this case, when evaluating the reliability of the actuator in the embodiment, the reliability evaluation related to the movement of the first mover 122 may be performed in a state in which the first barrel assembly 121 is not coupled to the first mover 122, and accordingly, the ease of reliability evaluation can be improved. In addition, when a problem occurs in the reliability evaluation of the first mover 122, only the first mover 122 needs to be discarded, and accordingly, the manufacturing cost can be significantly reduced.

In addition, the first mover 122 includes a second coupling portion 122b to which the first magnet 173a of the first driving portion 731 is coupled, and a first coupling portion 122a to which a yoke receiving portion 121c received the third yoke 173b therein is coupled, and are respectively disposed to opposite surfaces with respect to a frame. Accordingly, a gap between the first magnet 173a and the third yoke 173b can be minimized, due to this, the magnetic force between the first coil 171b and the first magnet 173a is strengthened to maximize the driving force of the first mover 122.

Meanwhile, in the embodiment, the first mover 122 and the second mover 132 (refer to FIG. 14) may be driven using a single or a plurality of balls. For example, the embodiment may include a first ball 181 disposed between the first guide portion 151 and the first mover 122 of the first lens assembly 120, and a second ball 185, 186 disposed between the second guide portion 152 and the second mover 132 of the second lens assembly 130.

For example, the first ball 181 of the embodiment includes a single or a plurality of first-first balls 182 disposed on an upper side of the first mover 122 and a single or a plurality of first-second balls 183 disposed on a lower side of the first mover 122.

In an embodiment, the first-first ball 182 of the first balls 181 moves along the first-first rail 151b that is one of the first rails 151a, and the first-second ball 183 of the first balls 181 may move along a first-second rail 151c that is the other one of the first rails 151a.

A camera actuator and the camera module the same according to the embodiment may align the plurality of lens groups by solving the problem of lens decenter or tilt during zooming, and through this, there is a technical effect of remarkably improving image quality or resolution by preventing a change in the angle of view or defocusing.

For example, according to the embodiment, the first guide portion includes a first-first rail and a first-second-2 rail, and the first-first rail and the first-second rail guide the first lens assembly 120, and accordingly, when the first lens assembly 1120 moves, there is a technical effect of increasing the accuracy of the optical axis alignment with the second lens assembly 130.

Meanwhile, in the embodiment, the first mover 122 of the first lens assembly 120 may include a first arrangement portion 122c in which the first ball 181 is disposed. In addition, the second mover 132 of the second lens assembly 130 may include a second arrangement portion 187 (refer to FIG. 14) in which the second ball 185 is disposed.

The first arrangement portions 122c of the first mover 122 of the first lens assembly 120 may be plural. Preferably, the first arrangement portion 122c may include a first-first arrangement portion 122c1 in which the first-first ball 182 of the first balls 181 is disposed, and a first-second arrangement portion 122c2 in which the first-second ball 183 of the first balls 181 is disposed. The second arrangement portion of the second mover 132 of the second lens assembly 130 may be plural. Preferably, the second arrangement portion may include a second-first arrangement portion 187 in which the second-first ball 185 of the second balls is disposed, and a second-second arrangement portion (not shown) in which the second-second ball 186 of the second balls is disposed.

In this case, the first-first arrangement portion 122c1 and the first-second arrangement portion 122c2 may have different shapes from each other. For example, the first-first arrangement portion 122c1 may be spaced apart from each other by a predetermined interval, and may have a groove shape into which a plurality of first-first balls 182 are respectively inserted. In this case, a distance between the plurality of grooves constituting the first-first arrangement portion 122c1 may be longer than a thickness of the first lens barrel 121a based on the optical axis direction.

Also, in an embodiment, the first-second arrangement portion 122c2 may have a rail shape. In other words, the first-second arrangement portion 122c2 may be a ball rail extending in the optical axis direction. In this case, the first-second arrangement portion 122c2 may have an L-shape, but is not limited thereto. For example, the rail of the first-second arrangement portion 122c2 may be in a U-shape or V-shape or a shape in contact with the plurality of first-second balls 183 at two or three points, other than the L shape.

In addition, the first-second ball 183 of the first balls 181 is disposed on the rail of the first-second arrangement portion 122c2. At this time, when the first-second balls 183 composed of a plurality are simply disposed on the rail of the first-second arrangement portion 122c2, a change may occur in an interval between the plurality of first-second balls 183 according to the movement of the first lens assembly 120. In addition, when the plurality of first-second balls 183 come into contact with each other according to a change in the spacing between the plurality of first-second balls 183, movement characteristics of the first lens assembly 120 may be affected, and a position shift of the first lens assembly 120 may occur. Accordingly, the first ball guide portion 184 may be disposed between the first-second arrangement portion 122c2 and the first-second rail 151c. The first ball guide portion 184 may be a plate-shaped member. The first ball guide portion 184 may include a groove (not shown) into which the plurality of first-second balls 183 are inserted. In addition, the plurality of first-second balls 183 may be inserted into the groove of the first ball guide portion 184, and disposed between the first-second arrangement portion 122c2 of the first mover 122 and the first-second rail 151c. In addition, a second ball guide portion 188 (refer to FIG. 14) may be disposed between the second-second arrangement portion and the second-second rail.

Figure 6:
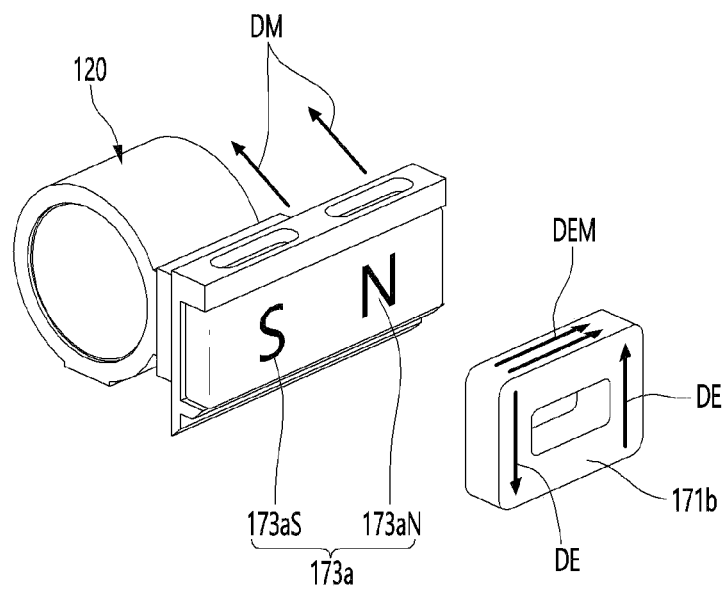
FIG. 6 is a view showing an example of driving a camera module according to an embodiment.

Next, FIG. 6 is a view showing an example of driving a camera module according to an embodiment.

Referring to FIG. 6, an interaction in which electromagnetic force DEM is generated between the first magnet 173a and the first coil portion 171b in the camera module according to the embodiment will be described.

As in FIG. 6, a magnetization method of the first magnet 173a in the camera module according to the embodiment may be a vertical magnetization method. For example, in the embodiment, both the N pole 173aN and the S pole 173aS of the first magnet 173a may be magnetized to face the first coil portion 171b. Accordingly, the N pole 173aN and the S pole 173aS of the first magnet 173a may be respectively disposed on the first coil portion 171b to correspond to a region in which current flows in the y-axis direction perpendicular to the ground.

In the embodiment, when a magnetic force DM is applied in the direction opposite to the x-axis at the N pole 173aN of the first magnet 173a and a current DE flows in the y-axis direction in the region of the first coil portion 171b corresponding to the N pole 173aN, an electromagnetic force (DEM) acts in the z-axis direction according to Fleming's left hand rule.

In addition, in the embodiment, when a magnetic force DM is applied in the x-axis direction at the S pole 173aS of the first magnet 173a and the current DE flows in the opposite direction to the y-axis perpendicular to the ground in the first coil portion 171b corresponding to the S pole 173aS, an electromagnetic force (DEM) acts in the z-axis direction according to Fleming's left hand rule.

At this time, since the third driving portion 171 including the first coil portion 171b is in a fixed state, the first lens assembly 120 including a first mover 122 on which a first magnet 173a is disposed and a first lens barrel coupled to the first mover 122 may be moved backward and forward along the rail of the first guide portion 151 in a direction parallel to the z-axis direction by the electromagnetic force DEM according to the current direction. The electromagnetic force DEM may be controlled in proportion to the current DE applied to the first coil portion 171b.

Similarly, in the camera module according to the embodiment, when an electromagnetic force (DEM) between the second magnet (not shown) and the second coil portion 172b is generated, the second lens assembly 130 may move along the rail of the second guide portion 152 horizontally to the optical axis.

Figure 7:
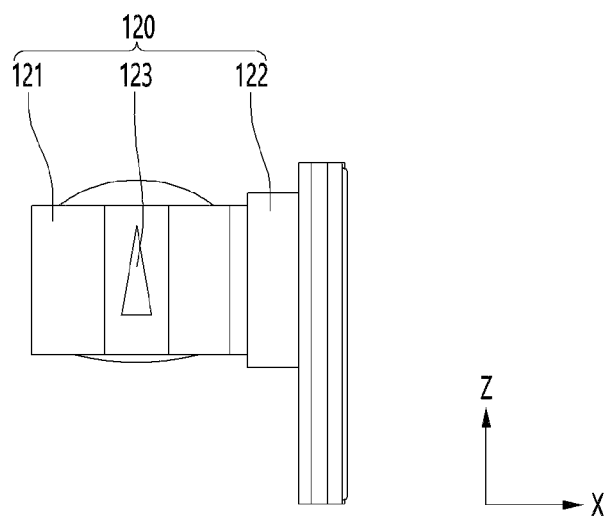
FIG. 7 is a view showing a lower portion of the first lens assembly in the camera module according to the embodiment.

FIG. 7 is a view showing a lower portion of the first lens assembly in the camera module according to the embodiment.

Referring to FIG. 7, the first lens assembly 120 includes a first conductor 123. In addition, the second lens assembly 130 includes a second conductor (not shown). The first conductor 123 may be made of a metal material through which electricity may pass, and may include, for example, gold (Au), but is not limited thereto.

Specifically, the first conductor 123 is attached to a lower surface of the first lens assembly 120. Specifically, the first conductor 123 is attached to the lower surface of the first lens barrel 121a constituting the first barrel assembly 121 of the first lens assembly 120.

The first conductor 123 may have a shape whose width changes in the optical axis direction (z-axis direction). For example, the first conductor 123 may have a triangular shape in which the width linearly decreases or increases in the optical axis direction. A position of the first conductor 123 in the base 110 may change according to the movement of the first lens assembly 120. The first conductor 123 may be a target for detecting the position of the first lens assembly 120. In addition, the second conductor may have the same shape as the first conductor 123, but is not limited thereto. For example, the first conductor 123 may have a triangular shape, and the second conductor 123 may have a rhombus shape.

Preferably, the first conductor 123 interferes with the magnetic field generated by the first resonator 161a (to be described later) disposed on a first substrate 161. That is, an interfering magnetic field corresponding to the reverse direction of the magnetic field generated in the first resonator 161a is generated in the first conductor 123. In addition, the interfering magnetic field reduces the inductance of the first resonator 161a. In this case, the intensity of the interfering magnetic field generated in the first conductor 123 is changed according to the position of the first lens assembly 120. At this time, the width of the first conductor 123 is changed toward the optical axis direction corresponding to the moving direction of the first lens assembly 120 as described above. Accordingly, the intensity of the interfering magnetic field generated by the first conductor 123 also increases or decreases as the first lens assembly 120 moves in the optical axis direction.

At this time, assuming that the first resonator 161a has a reference inductance, the first resonator 161a has a first inductance smaller than the reference inductance due to the interfering magnetic field generated from the first conductor 123 according to the position of the first lens assembly 120. The position of the first conductor 123 may be detected based on the first inductance, and the position of the first lens assembly 120 may be detected based on the position of the first conductor 123.

In addition, the second conductor disposed on the second lens assembly 130 interferes with the magnetic field generated by the second resonator 16ba (to be described later) disposed on a first substrate 161. That is, an interfering magnetic field corresponding to the reverse direction of the magnetic field generated in the second resonator 161b is generated in the second conductor. In addition, the interfering magnetic field reduces the inductance of the second resonator 161b. In this case, the intensity of the interfering magnetic field generated in the second conductor is changed according to the position of the second lens assembly 130. At this time, the width of the second conductor is changed toward the optical axis direction corresponding to the moving direction of the second lens assembly 120 as described above. Accordingly, the intensity of the interfering magnetic field generated by the second conductor also increases or decreases as the second lens assembly 130 moves in the optical axis direction.

At this time, assuming that the second resonator 161b has a reference inductance, the second resonator 161b has a second inductance smaller than the reference inductance due to the interfering magnetic field generated from the second conductor according to the position of the second lens assembly 130. The position of the second conductor may be detected based on the second inductance, and the position of the second lens assembly 130 may be detected based on the position of the second conductor.

Positions on the first conductor 123 and the second conductor, and a relationship between the first resonator 161a and the second resonator 161b, and position sensing operation of the first lens assembly 120 and the second lens assembly 130 will be described in more detail below.

<Third Lens Assembly>

Figure 8:
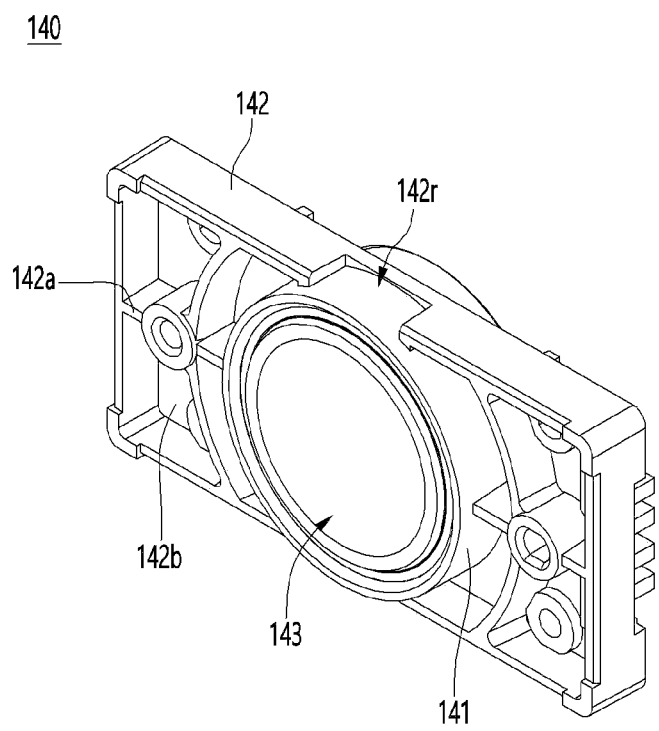
FIG. 8 is a perspective view of a third lens assembly in the camera module according to the embodiment shown in FIG. 3 in a first direction.
Figure 9:
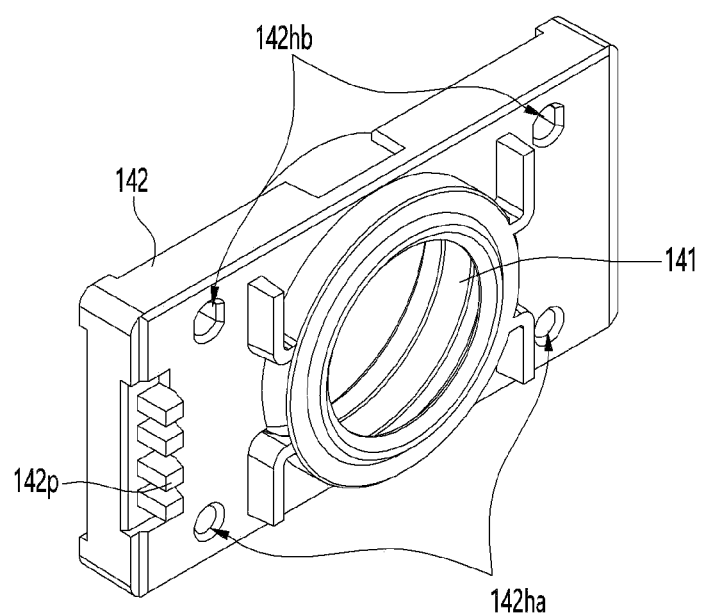
FIG. 9 is a perspective view of the third lens assembly 140 shown in FIG. 8 in the second direction.

Next, FIG. 8 is a perspective view of a third lens assembly in the camera module according to the embodiment shown in FIG. 3 in a first direction, and FIG. 9 is a perspective view of the third lens assembly 140 shown in FIG. 8 in the second direction, and this is a perspective view from which the third lens was removed.

Referring to FIG. 8, in the embodiment, the third lens assembly 140 may include a third housing 142, a third barrel 141, and a third lens 143.

In the embodiment, the third lens assembly 140 may include a barrel recess 142r on an upper end of the third barrel 141 so that the thickness of the third barrel 141 of the third lens assembly 140 can be uniformly matched. There is a complex technical effect that can increase the accuracy of numerical management by reducing the amount of injection molded products.

Also, according to an embodiment, the third lens assembly 140 may include a housing rib 142a and a housing recess 142b in the third housing 142.

In the embodiment, the third lens assembly 140 includes a housing recess 142b in the third housing 142, thereby reducing the amount of injection products to increase the accuracy of numerical management and at the same time providing the third housing 142 with the housing rib 142a, there is a complex technical effect that can secure the strength.

Next, referring to FIG. 9, the third lens assembly 140 may include a single or a plurality of housing holes in the third housing 142. For example, the housing hole may include a third regular hole 142*ha* and a third long hole 142*hb* around the third barrel 141 of the third housing 142.

The housing hole may be coupled to a first protrusion (not shown) that may be provided on the first guide portion 151 or the base 110, and a second protrusion that may be provided on the second guide portion 152 or the base 110 (not shown).

The third regular hole 142*ha* may be a circular hole, and the third long hole 142*hb* may have different diameters in a uniaxial direction and in a biaxial direction perpendicular thereto. For example, the third long hole 142*hb* may have a larger diameter in a y-axis direction perpendicular to the x-axis than a diameter in an x-axis direction horizontal to the ground.

The housing hole of the third lens assembly may include two third regular holes 142*ha* and two third long holes 142*hb*.

The third regular hole 142*ha* may be disposed on the lower side of the third housing 142, and the third long hole 142*hb* may be disposed on the upper side of the third housing 142, but is not limited thereto. However, the present invention is not limited thereto, and the third long hole 142*hb* may be positioned in a diagonal direction to each other, and the third long hole 142*ha* may be positioned in a diagonal direction to each other.

In an embodiment, the third housing 142 of the third lens assembly 140 may include a single or a plurality of housing protrusions 142*p*. In the embodiment, reverse insertion can be prevented by providing the housing protrusion 142*p* on an inner side the third housing 142, and it can be prevented from being reversed left and right from being coupled to the base 110.

The housing protrusion 142*p* may be plural, for example, four, but is not limited thereto. At this time, although not shown in the drawing, the housing protrusion 142*p* may be coupled to a side recess (not shown) disposed to protrude from the side surface of the base 110.

<Base>

Figure 10A:
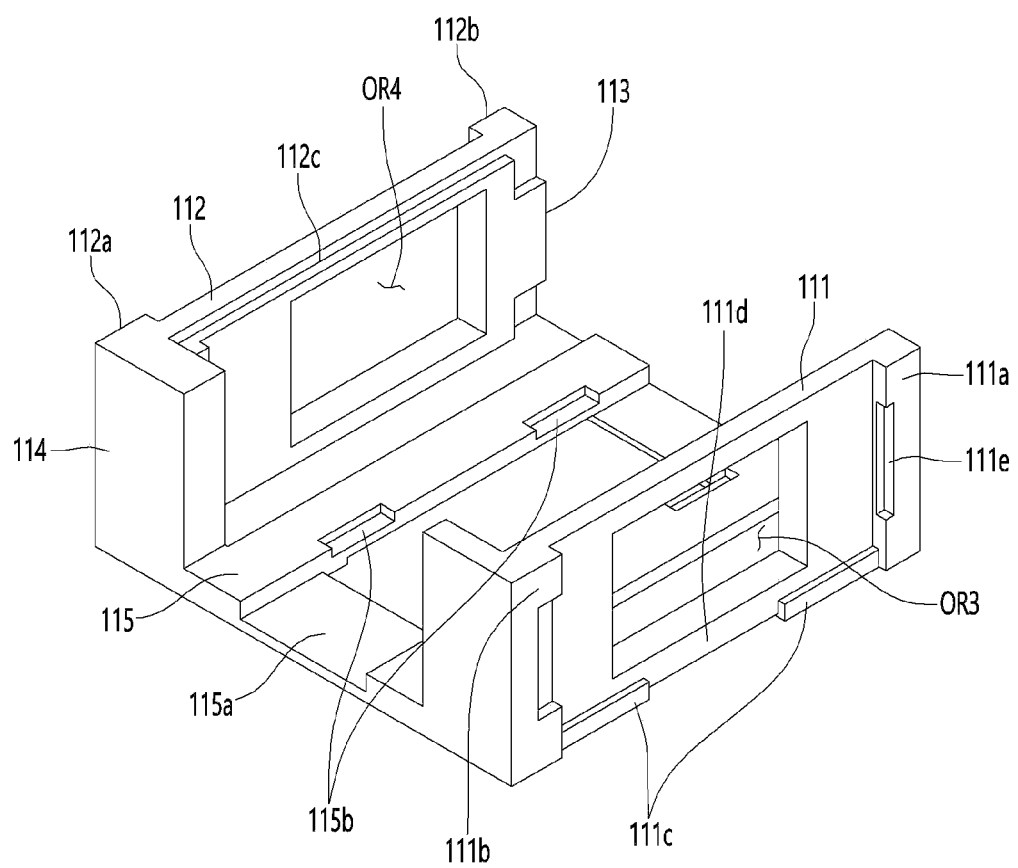
FIG. 10a is a perspective view of a base in the camera module according to the embodiment shown in FIG. 3 in a first direction.
Figure 10B:
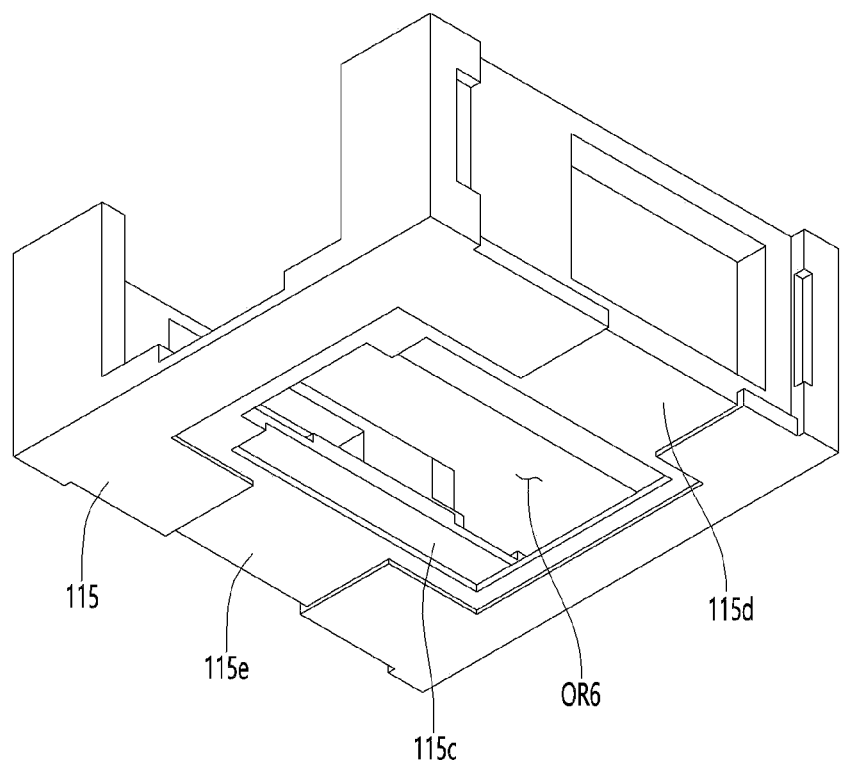
FIG. 10b is a perspective view of the base shown in FIG. 10A in a second direction.

Next, FIG. 10*a* is a perspective view of a base in the camera module according to the embodiment shown in FIG. 3 in a first direction, and FIG. 10*b* is a perspective view of the base shown in FIG. 10A in a second direction.

Referring to FIG. 3, a first guide portion 151, a second guide portion 152, a first lens assembly 120, and a second lens assembly 130 are disposed in the base 110 according to the embodiment. The third lens assembly 140 may be disposed on one side of the base 110.

Referring back to FIG. 10*a*, the base 110 may have a shape in which the upper surface is removed in a rectangular parallelepiped shape having a space therein.

For example, the base 110 may include a first sidewall 111, a second sidewall 112, a third sidewall 113, a fourth sidewall 114, and a lower end of the first sidewall and a second sidewall 114, and a base lower surface connecting between a lower end of the first sidewall 111 and a lower end of the second sidewall 112. At this time, the base 110 in the figure has a form in which a base upper surface connecting between an upper end of the first sidewall and an upper end of the second sidewall is removed, but the present invention is not limited thereto, according to an embodiment, the base 110 may include a base upper surface (not shown).

For example, the base 110 may include a first sidewall 111 and a second sidewall 112 corresponding to the first sidewall 111. For example, the second sidewall 112 may be disposed in a direction facing the first sidewall 111.

Meanwhile, the first sidewall 111 may include a third open region OR3. Also, the second sidewall 112 may include a fourth open region OR4. The third open region OR3 may be an opening exposing the third driving portion 171. Preferably, the third open region OR3 may be an opening exposing the first coil portion 171*b* constituting the third driving portion 171. Preferably, the third open region OR3 may overlap and be aligned with the first coil portion 171*b* and the first open region OR1 of the first guide portion 151 in the x-axis direction.

The fourth open region OR4 may be an opening exposing the fourth driving portion 172. Preferably, the fourth open region OR4 may be an opening exposing the second coil portion 172*b* constituting the fourth driving portion 172. Preferably, the fourth open region OR4 may overlap and align with the second coil portion 172*b* and the second open region OR2 of the second guide portion 152 in the x-axis direction.

The base 110 further includes a third sidewall 113 disposed between the first sidewall 111 and the second sidewall and connecting the first sidewall 111 and the second sidewall 112. The third sidewall 113 may be disposed in a direction perpendicular to the first sidewall 111 and the second sidewall 112.

The first, second, and third sidewalls 111, 112, and 113 may be formed in an integral injection type with each other or may have a combined configuration to each other.

Meanwhile, although not shown in the figure, a base protrusion (not shown) may be disposed on the fourth sidewall 114 of the base 110.

A plurality of the base protrusions may be disposed on the fourth sidewall 114.

The base protrusion may be coupled to a third regular hole and a third long hole of the third lens assembly 140.

The fourth sidewall 114 may have an open shape, and thus may include a fifth open region (not shown).

The first guide portion 151, the second guide portion 152, the first lens assembly 120, and the second lens assembly 130 may be detachably coupled to the inner side of the base 110 through the fifth open region.

An outer surface of the first sidewall 111 may include first base protrusions 111*a* and 111*b* protruding in the x-axis direction. For example, the first sidewall 111 may include a first-first base protrusion 111*a* and a first-second base protrusion 111*b* extending in the y-axis direction. In the embodiment, by providing the first-first base protrusion 111*a* and the first-second base protrusion 111*b* on the first sidewall 111, when the first substrate 161 is assembled, epoxy or adhesive may be applied for bonding between the second rigid region RO2 (to be described later) of the first substrate 161 and the base 110 to improve a strong bonding force.

Meanwhile, a lower end of the outer surface of the first sidewall 111 includes a plurality of first-third base protrusions 111*c* extending in the z-axis direction and spaced apart from each other by a predetermined interval. In addition, a space between the plurality of first-third base protrusions 111*c* may form a first recess 111*d*. When the first substrate 161 is coupled to the base 110 through bending, the first flexible region FO1 of the first substrate 161 may be positioned in the first recess 111*d*, and accordingly, when the first substrate 161 is bent and coupled to the base 110 through bending, it may serve as a guide.

In addition, second recesses 111*e* may be formed in the first-first base protrusion 111*a* and the first-second base protrusion 111*b*, respectively. The second recess 111*e* may serve as a guide when the first yoke 171a of the third driving portion 171 is coupled, and accordingly, the coupling force of the first yoke 171a may be improved.

The outer surface of the second sidewall 112 may include second base protrusions 112a and 112b protruding in the x-axis direction. For example, the second sidewall 112 may include a second-first base protrusion 112a and a second-second base protrusion 112b extending in the y-axis direction. In the embodiment, by providing the second-first base protrusion 112a and the second-second base protrusion 112b on the second sidewall 112, When assembling the first substrate 161, an epoxy or adhesive is applied for bonding between the third rigid region RO3 (to be described later) of the first substrate 161 and the base 110, thereby improving a strong bonding force.

On the other hand, the lower end of the outer surface of the second sidewall 112 includes a plurality of second-third base protrusions (not shown) extending in the z-axis direction and spaced apart from each other by a predetermined interval. In addition, a space between the plurality of second-third base protrusions may form a third recess (not shown). A second flexible region FO2 of the first substrate 161 may be positioned in the third recess when the first substrate 161 is coupled to the base 110 through bending. Accordingly, the third recess may serve as a guide when the first substrate 161 is coupled to the base 110 through bending.

In addition, fourth recesses (not shown) may be formed in the second-first base protrusion 112a and the second-second base protrusion 112b, respectively. The fourth recess may serve as a guide when the second yoke 172a of the fourth driving portion 172 is coupled, and accordingly, the coupling force of the second yoke 172a may be improved.

Meanwhile, a second coupling portion 112c may be disposed on an inner surface of the second sidewall 112. In addition, a first coupling portion (not shown) may be disposed on an inner surface of the first sidewall 111.

The first coupling portion may be coupled to the first guide protrusion of the first guide portion 151, and accordingly, it is possible to guide the first guide portion 151 to be stably and firmly coupled to the base 110.

In addition, the second coupling portion 112c is coupled to the second guide protrusion of the second guide portion 152, accordingly, it is possible to guide the second guide portion 152 to be stably and firmly coupled to the base 110.

The base 110 may include a base lower surface 115.

An upper groove 115a may be formed on an upper surface of the base lower surface 115. In the embodiment, by providing the upper groove 115a on the upper surface of the base lower surface 115, and it is possible to prevent shrinkage during injection by maintaining a constant cross-sectional thickness for assembling the first guide portion 151 and the second guide portion 152.

In addition, an upper recess 115b may be provided on the upper surface of the base lower surface 115. A cover protrusion (described later) of the guide cover 190 may be fitted into the upper recess 115b. In an embodiment, while maintaining the rigidity of the camera module, a guide cover 190 for protecting the first guide portion 151 and the second guide portion 152 may be provided, and the coupling force with the guide cover 190 may be increased by providing the upper recess 115b in the base 110.

Also, referring to FIG. 10b, the lower surface of the base lower surface 115 may include a first lower groove 115c. In the embodiment, since the first lower groove 115c is provided on the lower surface of the base lower surface 115, when the first substrate 161 is coupled, an epoxy or adhesive is applied for bonding between the first rigid region RO1 of the first substrate 161 and the base 110, thereby improving a strong bonding force.

On the other hand, the lower surface of the base lower surface 115 may include a second lower groove 115d. In the embodiment, by providing the second lower groove 115d on the lower surface of the base lower surface 115, when the first substrate 161 is coupled, bending of the first flexible region FO1 may be guided while fixing the first flexible region FO1 of the first substrate 161.

In addition, the lower surface of the base lower surface 115 may include a third lower groove 115e. In the embodiment, by providing the third lower groove 115e in the lower surface of the base lower surface 115, when the first substrate 161 is coupled, bending of the second flexible region FO2 may be guided while fixing the second flexible region FO2 of the first substrate 161.

In addition, a sixth open region OR6 may be provided in the base lower surface 115. The sixth open region OR6 may expose the first rigid region RO1 of the first substrate 161 coupled thereunder. For example, the sixth open region OR6 may expose the first resonator 161a and the second resonator 161b disposed on the first rigid region RO1 of the first substrate 161. Preferably, the sixth open region OR6 may overlap and be aligned with the first resonator 161a, the second resonator 161b, the first conductor 123, and the second conductor in the y-axis direction.

<Guide Cover>

Figure 11:
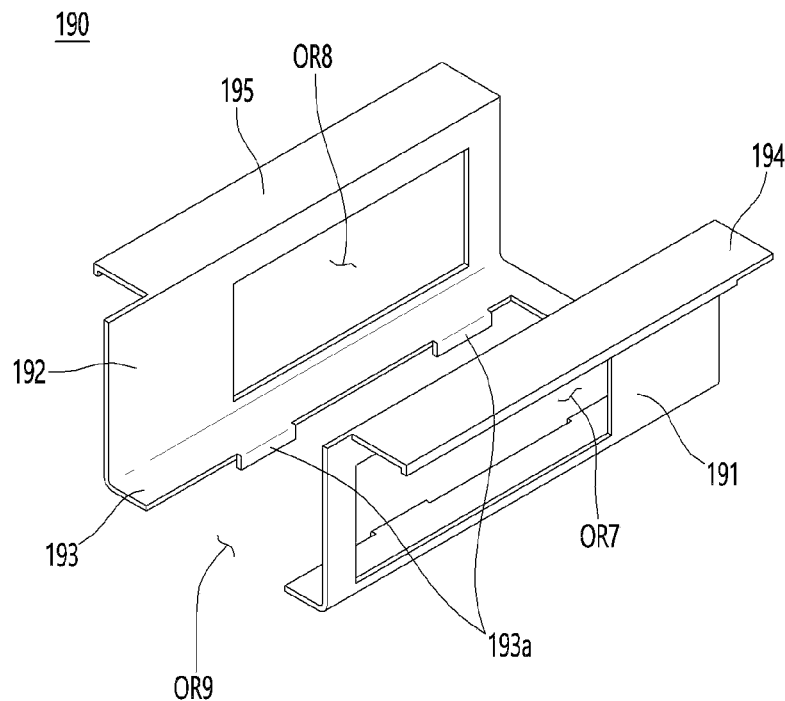
FIG. 11 is a perspective view of a guide cover in the camera module according to the embodiment shown in FIG. 3.

FIG. 11 is a perspective view of a guide cover 190 in the camera module according to the embodiment shown in FIG. 3.

The guide cover 190 may be disposed in the base 110. The guide cover 190 may cover the first guide portion 151 and the second guide portion 152 disposed in the base 110.

To this end, the guide cover 190 may include a first cover sidewall 191 and a second cover sidewall 192. In addition, the guide cover 190 may include a cover lower surface 193 connecting a lower end of the first cover side wall 191 and a lower end of the second cover side wall 192.

For example, the guide cover 190 may include a first cover sidewall 191 and a second cover sidewall 192 corresponding to the first cover sidewall 191. For example, the second cover sidewall 192 may be disposed in a direction facing the first cover sidewall 191.

Meanwhile, the first cover sidewall 191 may include a seventh open region OR7. Also, the second cover sidewall 192 may include an eighth open region OR8. The seventh open region OR7 may be an opening exposing the first barrel assembly 121 of the first lens assembly 120. Preferably, the eighth open region OR8 may be an opening into which the first barrel assembly 121 is inserted.

The eighth open region OR8 may be an opening exposing the second barrel assembly of the second lens assembly 130. Preferably, the eighth open region OR8 may be an opening into which the second barrel assembly is inserted.

The first cover sidewall 191 may be disposed on an inner side of the first mover 122 to cover the inner side of the first mover 122. The second cover sidewall 192 may be disposed on an inner side the second mover to cover the inner side of the second mover.

In addition, the guide cover 190 may include a first extension portion 194 extending in the x-axis direction from the upper end of the first cover sidewall 191. The first extension portion 194 may be disposed on the upper surface of the first mover 122 to cover the upper surface of the first mover 122.

The guide cover 190 may include a second extension portion 195 extending in the x-axis direction from the upper end of the second cover sidewall 192. The second extension portion 195 may be disposed on the upper surface of the second mover to cover the upper surface of the second mover.

In addition, the guide cover 190 may include a cover lower surface 193. The cover lower surface 193 may be disposed in a direction perpendicular to the first cover sidewall 191 and the second cover sidewall 192.

The first cover sidewall 191, the second cover sidewall 192, and the cover lower surface 193 may be formed in an integral injection shape with each other or may have a combined configuration.

The cover lower surface 193 may include a ninth open region OR9. The ninth open region OR9 may expose a lower surface of the first barrel assembly 121 of the first lens assembly 120 disposed thereon and a lower surface of the second barrel assembly of the second lens assembly 130. In addition, the cover lower surface 193 may expose the first resonator 161a and the second resonator 161b of the first substrate 161 disposed thereunder.

Meanwhile, a cover protrusion 193a may be provided on the cover lower surface 193. The cover protrusion 193 may be fitted in the upper recess provided in the base 110.

The embodiment arranges the guide cover 190 in the base 110, and the strength of the camera module can be improved while protecting the first guide portion 151 and the second guide portion 152 through the guide cover 190.

<First Substrate>

Figure 12A:
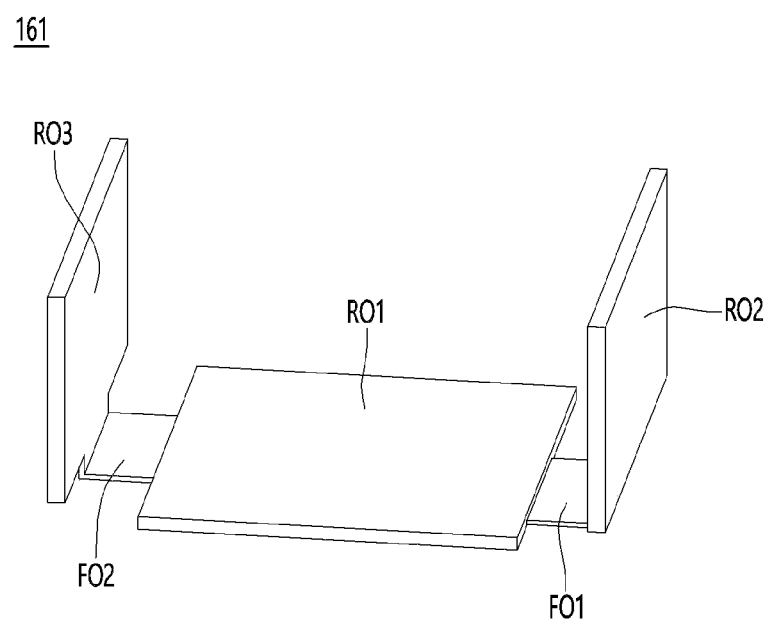
FIG. 12a is a perspective view showing a first substrate in a first state in a camera module according to an embodiment.
Figure 12B:
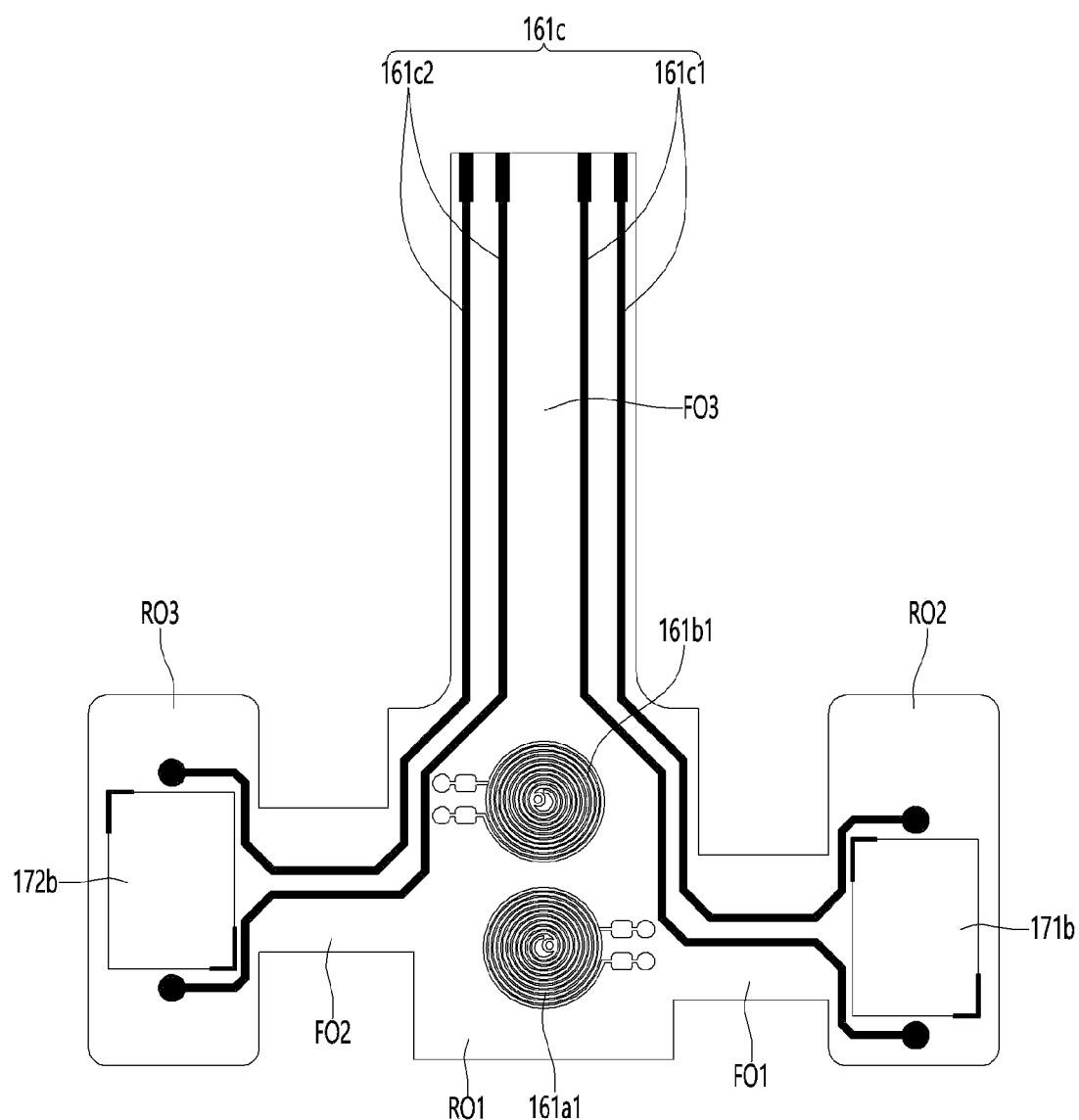
FIG. 12b is a plan view of the first substrate of FIG. 12a in a second state.
Figure 12C:
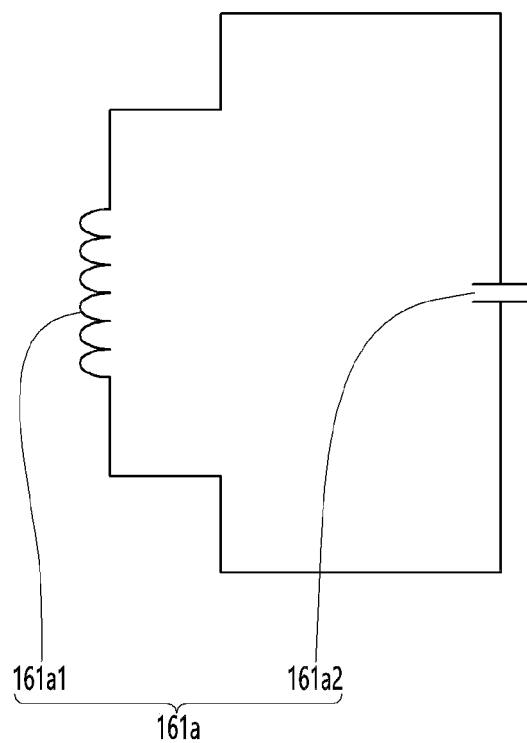
FIG. 12c is a circuit diagram showing an equivalent circuit of a first resonator disposed on a first substrate in a camera module according to an embodiment.

FIG. 12a is a perspective view showing a first substrate in a first state in a camera module according to an embodiment, FIG. 12b is a plan view of the first substrate of FIG. 12a in a second state, and FIG. 12c is a circuit diagram showing an equivalent circuit of a first resonator disposed on a first substrate in a camera module according to an embodiment.

Referring to FIG. 12a, the first substrate 161 may be connected to a predetermined power supply unit (not shown) and supplied to the third driving portion 171, the fourth driving portion 172, the first resonator 161a, and the second resonator 161b. The first substrate 161 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB). Preferably, the first substrate 161 may be a rigid flexible printed circuit board (Rigid Flexible PCB).

Accordingly, the first substrate 161 may include a rigid region and a flexible region. Specifically, the first substrate 161 may include a rigid region on which components are disposed and a flexible region excluding the rigid region.

Specifically, the first substrate 161 may include a first rigid region RO1 in which the first resonator 161a and the second resonator 161b are disposed, a second rigid region RO2 in which the first coil portion 171b of the third driving portion 171, a third rigid region RO3 in which the second coil portion 172b of the fourth driving portion 172, a first flexible region FO1 between the first rigid region RO1 and the second rigid region RO2, and a second flexible region FO2 between the first rigid region RO1 and the third rigid region RO3.

Each of the first rigid region RO1, the second rigid region RO2, the third rigid region RO3, the first flexible region FO1, and the second flexible region FO2 may have a structure in which a plurality of insulating layers are stacked.

In this case, the plurality of insulating layers constituting the first rigid region RO1, the second rigid region RO2, and the third rigid region RO3 may be rigid or flexible. For example, the plurality of insulating layers constituting the first rigid region RO1, the second rigid region RO2, and the third rigid region RO3 may include glass or plastic. In detail, the plurality of insulating layers constituting the first rigid region RO1, the second rigid region RO2, and the third rigid region RO3 may include chemically strengthened/semi-tempered glass such as soda lime glass or aluminosilicate glass, reinforced or flexible plastics such as polyimide (PI), polyethylene terephthalate (PET), propylene glycol (PPG), polycarbonate (PC), or sapphire.

In addition, the plurality of insulating layers constituting the first flexible region FO1 and the second flexible region FO2 may have a flexible characteristic having a stretchable characteristic. The insulating layer constituting the first flexible region FO1 and the second flexible region FO2 may be an insulating layer having a curved or bent characteristic.

Accordingly, the first substrate 161 may be bent while partially having a flat surface and partially having a curved surface. Preferably, the first flexible region FO1 and the second flexible region FO2 may be curved while having a random curvature, or may have a surface including a random curvature and may be bent or curved.

The first substrate 161 may be disposed on the outer side of each of the base lower surface 115, the first sidewall 111, and the second sidewall 112 of the base 110 by bending the first flexible region FO1 and the second flexible region FO2.

The first rigid region RO1 is a region in which the first resonator 161a and the second resonator 161a are disposed. The first rigid region RO1 may be disposed on an outer side the base lower surface 115 of the base 110. That is, the first rigid region RO1 may be coupled to the first lower groove 115c provided in the base lower surface 115 of the base 110.

The second rigid region RO2 is a region in which the third driving portion 171 for moving the first lens assembly 120 is disposed. The second rigid region RO2 may be disposed on an outer side the first sidewall 111 of the base 110. That is, the second rigid region RO2 may be coupled to the base 110 between the first-first base protrusion 111a and the first-second base protrusion 111b provided on the first sidewall 111 of the base 110.

The third rigid region RO3 is a region in which the fourth driving portion 172 for moving the second lens assembly 130 is disposed. The third rigid region RO3 may be disposed on an outer side the second sidewall 112 of the base 110. That is, the third rigid region RO3 may be coupled to the base 110 between the second-first base protrusion 112a and the second-second base protrusion 112b provided on the second sidewall 112 of the base 110.

The first flexible region FO1 may also be referred to as a first bending region. The first flexible region FO1 may connect the first rigid region RO1 disposed on an outer side of the base lower surface 115 of the base 110 and the second rigid region RO2 disposed on an outer side of the first sidewall 111 of the base 110, by bending at one point. Accordingly, a part of the first flexible region FO1 may be disposed on the outer side of the base lower surface 115 of the base 110 based on a bending point, and the remaining part of the first flexible region FO1 may be disposed on the outer side of the first sidewall 111 of the base 110. That is, a part of the first flexible region FO1 may be coupled to the second lower groove 115d provided on the base lower surface 115, and the remaining part may be coupled to the first recess 111d provided on the first sidewall 111.

The second flexible region FO2 may also be referred to as a second bending region. The second flexible region FO2 may connect the first rigid region RO1 disposed on the outer side of the base lower surface 115 of the base 110 and the third rigid region RO3 disposed on an outer side of the second sidewall 112 of the base 110, by bending at one point. Accordingly, a part of the second flexible region FO2 may be disposed on the outer side of the base lower surface 115 of the base 110 based on a bending point, and the remaining part of the second flexible region FO2 may be disposed on the outer side of the second sidewall 112 of the base 110. That is, a part of the second flexible region FO2 may be coupled to the third lower groove 115e provided on the base lower surface 115, and the remaining part may be coupled to a recess (not shown) provided on the second sidewall 112.

Referring to FIG. 12b, the first substrate 161 has a bent shape based on the first flexible region FO1 and the second flexible region FO2 as shown in FIG. 12a in a first state (e.g., a state coupled to the base), but first flexible region FO1 and the second flexible region FO2 of the first substrate 161 have a flat shape as shown in FIG. 12b in a second state (e.g., a state before being coupled to the base).

In addition, the first resonator 161a and the second resonator 161b are disposed on the first rigid region RO1 of the first substrate 161 to be spaced apart from each other by a predetermined distance.

In this case, the first resonator 161a may include a first resonance coil 161a1. In addition, although not shown in the figure, the first resonator 161a may include a first resonance capacitor 161a2 connected with the first resonance coil 161a1 in series. The first resonator 161a may generate a magnetic field by resonating with a resonance frequency f. The first resonator 161a may be a first position sensor for detecting the position of the first lens assembly 120 based on an inductance value that changes according to a change in the strength of the generated magnetic field.

The second resonator 161b may include a second resonance coil 161b1. In addition, although not shown in the figure, the second resonator 161b may include a second resonance capacitor (not shown) connected with the second resonance coil 161b1 in series. The second resonator 161b may generate a magnetic field by resonating with a resonance frequency f. The second resonator 161b may be a second position sensor for detecting the position of the second lens assembly 130 based on an inductance value that changes according to a change in the strength of the generated magnetic field.

Also, the first substrate 161 may further include a third flexible region FO3 extending from the first rigid region RO1. The third flexible region FO3 may have a flat surface, and may be bent to have a curved surface in some cases. A terminal (not shown) connected to the second substrate 162 or a terminal (not shown) connected to a main board (not shown) other than the second substrate 162 may be disposed in the third flexible region FO3 of the first substrate 161.

Also, a circuit pattern 161c connected to the first resonator 161a, the second resonator 161b, the third driving portion 171, and the fourth driving portion 172 may be disposed on the first substrate 161. For example, the circuit pattern 151c may be disposed on the first rigid region RO1, the second rigid region RO2, the third rigid region RO3, the first flexible region FO1, the second flexible region FO2 and the third flexible region FO3 of the first substrate to transmit an electric signa. For example, the circuit pattern 161c may be included a first circuit pattern 161c1 connected to the third driving portion 171 and a second circuit pattern 161c2 connected to the fourth driving portion 172.

A third driving portion 171 may be disposed on the second rigid region RO2. Specifically, the first coil portion 171b constituting the third driving portion 171 may be disposed on the second rigid region RO2.

In addition, the fourth driving portion 172 may be disposed on the third rigid region RO3. Specifically, the second coil portion 172b constituting the fourth driving portion 172 may be disposed on the third rigid region RO3.

Meanwhile, a width of the first rigid region RO1 in the z-axis direction, a width of the second rigid region RO2 in the z-axis direction, and a width of the third rigid region RO3 in the z-axis direction may be the same, but is not limited thereto.

However, the width in the z-axis direction of the first flexible region FO1 of the first substrate 161 and the width in the z-axis direction of the second flexible region FO2 may be narrower than the width of the rigid regions RO1, RO2, and RO3. In an embodiment, bending of the first substrate 161 may be facilitated by adjusting the widths of the first flexible region FO1 and the second flexible region FO2.

Referring to FIG. 12c, the first resonator 161a may include a first resonance coil 161a1 and a first resonance capacitor 161a2. In this case, the first resonance coil 161a1 and the first resonance capacitor 161a2 may be connected in series with each other. Also, although not shown in the drawing, an oscillator (not shown) may be disposed on the first substrate 161. The oscillator may generate an alternating signal. That is, the oscillator may generate an AC signal having a predetermined resonance frequency, and the generated AC signal may be applied to the first resonator 161a and the second resonator 161b.

In addition, the first resonator 161a may perform a resonance operation by receiving the AC signal generated from the oscillator. That is, the first resonator 161a may generate a magnetic field in a peripheral region by the applied AC signal.

The first resonance coil 161a1 and the first resonance capacitor 161a2 may be referred to as an LC resonance circuit, and may oscillate by forming a so-called tank circuit.

Figure 13:
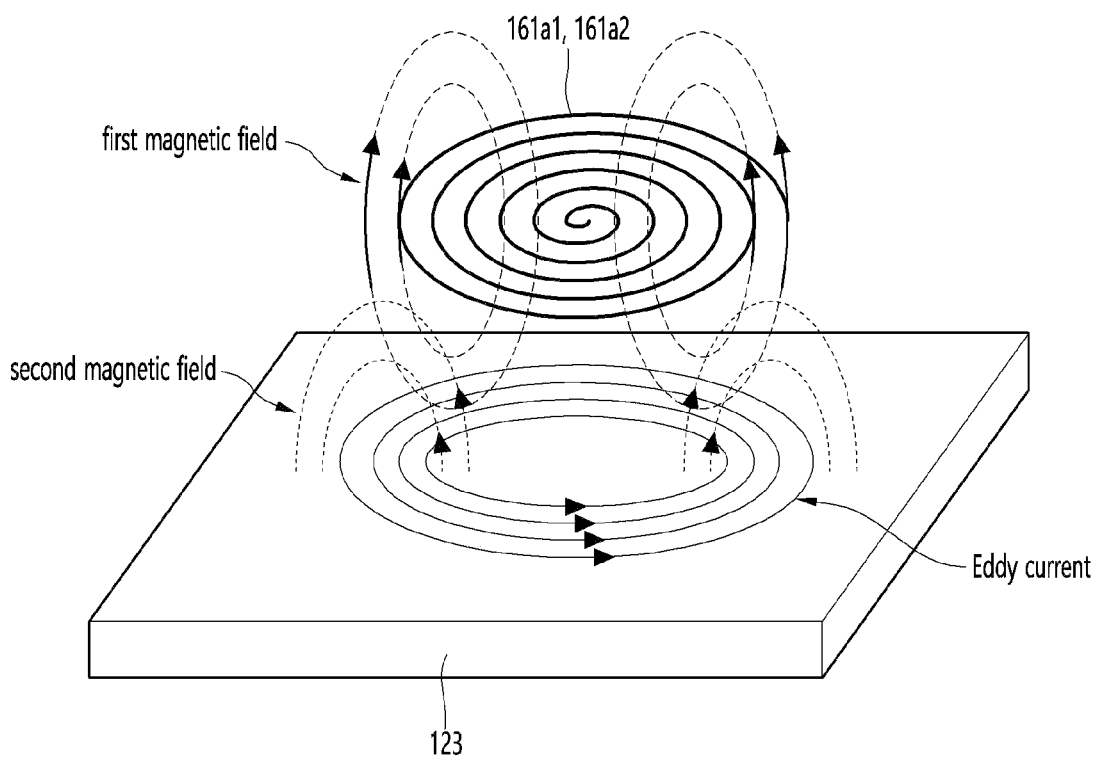
FIG. 13 is a view for explaining an operation principle of the first and second resonators according to the embodiment.

FIG. 13 is a view for explaining an operation principle of the first and second resonators according to the embodiment.

Referring to FIG. 13, when an AC signal corresponding to a resonance frequency is applied to the first resonator 161a or the second resonator 161b by an oscillator, a first magnetic field is generated around the resonance coils 161a1 and 161b1 constituting the first resonator 161a and the second resonator 161b.

In this case, the first and second conductors may be selectively present in a region around the first magnetic field generated by the resonance coils 161a1 and 161b1. The first conductor 123 is attached to the lower surface of the first lens assembly 120, and the second conductor is attached to the lower surface of the second lens assembly 130.

Here, the positions of the first conductor 123 and the second conductor change as the first lens assembly 120 and the second lens assembly 130 move.

In this case, the first conductor 123 is positioned in the upper region of the first resonance coil 161a1, and the position moves within the upper region of the first resonance coil 161a1 according to the movement of the first lens assembly 120.

In addition, the second conductor is positioned in the upper region of the second resonance coil 161b1, and the position moves within the upper region of the second resonance coil 161b1 according to the movement of the second lens assembly 130.

In this case, the upper region of the first resonance coil 161a1 and the upper region of the second resonance coil 161b1 do not overlap each other. That is, the first conductor moves only in the upper region of the first resonance coil 161a1 and does not move in the upper region of the second resonance coil 161b1. In other words, the first lens assembly 120 has a first stroke. In this case, the first lens assembly 120 may be a zoom lens assembly. Accordingly, the first lens assembly 120 has a first stroke between a tele position and a wide position. In addition, the first conductor 123 within the first stroke between the tele position and the wide position where the first lens assembly 120 can move is positioned only in the upper region of the first resonance coil 161a1 and, not positioned in the upper region of the second conductor.

In the embodiment, the first conductor 123 is positioned only in the upper region of the first resonance coil 161a1 within the first stroke of the first lens assembly 120, the inductance changed by the first conductor 123 can be accurately measured in the first resonator 161a, and it is possible to prevent the inductance of the second resonator 161b from being changed by the first conductor 123.

In addition, the second conductor moves only in the upper region of the second resonance coil 161b1 and does not move in the upper region of the first resonance coil 161a1. In other words, the second lens assembly 130 has a second stroke. In this case, the second lens assembly 130 may be a focus lens assembly. Accordingly, the second lens assembly 130 has a second stroke between the first focus position (the position closest to the image sensor within the range where the second lens assembly can move) and the second focus position (the position furthest from the image sensor within the range that the second lens assembly can move). In addition, the second conductor within the second stroke between the first focus position and the second focus position where the second lens assembly 130 can move is positioned only in the upper region of the second resonance coil 161b1 and, not positioned in the upper region of the first conductor.

In the embodiment, the second conductor is positioned only in the upper region of the second resonance coil 161b1 within the second stroke of the second lens assembly 130, the inductance changed by the second conductor can be accurately measured in the second resonator 161b, and it is possible to prevent the inductance of the first resonator 161a from being changed by the first conductor 123.

On the other hand, when the first conductor 123 is positioned in the upper region of the first resonance coil 161a1 in the state in which the first magnetic field corresponding to the AC signal based on the resonance frequency f is being generated in the first resonance coil 161a1 as described above, an eddy current is induced on the surface of the first conductor 123 by the first magnetic field.

In addition, the first conductor 123 generates a second magnetic field by the induced eddy current. At this time, the second magnetic field is generated in the opposite direction to the first magnetic field, and thus interferes with the first magnetic field generated by the first resonance coil 161a1. That is, the second magnetic field generated by the first conductor 123 acts as an interfering magnetic field that interferes with the first magnetic field. In addition, the second magnetic field reduces the strength of the first magnetic field, and thus reduces the inductance of the first resonator 161a. Here, the decrease in the strength of the first magnetic field may mean that a voltage applied to the first resonance coil 161a1 decreases, and also may mean that a current flowing in the first resonance coil 161a1 decreases.

In this case, a reduction width of the inductance increases in proportion to the strength of the second magnetic field. That is, as the distance between the first conductor 123 and the first resonance coil 161a1 increases, the reduction width of the inductance increases. Also, as the overlapping region of the first conductor 123 and the first resonance coil 161a1 in the y-axis direction increases, the reduction width of the inductance increases.

In addition, the inductance digital converter LDC may be connected to the first resonator 161a, and accordingly obtain a digital value corresponding to a change in the inductance value of the first resonator 161a.

At this time, the digital value output from the inductance digital converter (LDC) indicates how much the current position is moved based on the initial position of the first lens assembly 120 or the second lens assembly 130, and the current position of the first lens assembly 120 or the second lens assembly 130 may be detected based on the digital value.

Figure 14:
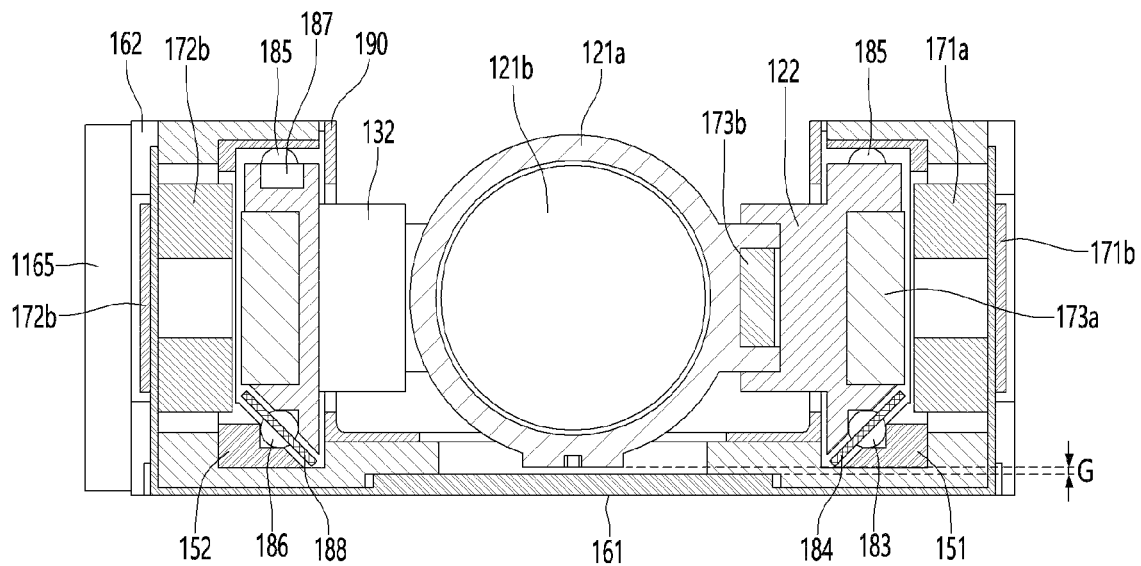
FIG. 14 is a cross-sectional view taken along line A-A' in the camera module of FIG. 1.

FIG. 14 is a cross-sectional view taken along line A-A' in the camera module of FIG. 1.

Referring to FIG. 14, the first guide portion 151, the second guide portion 152, the first lens assembly 120, and the second lens assembly 130 are disposed in the base 110.

In addition, a first conductor 123 is disposed on a lower surface of the first lens assembly 120, and a second conductor is disposed on a lower surface of the second lens assembly 130.

Also, on the upper surface of the first substrate 161, the first resonator 161a is disposed in a lower region corresponding to the first stroke of the first lens assembly 120, and the second resonator 161b is disposed in the lower region corresponding to the second stroke of the second lens assembly 130.

In addition, a linear distance in the y-axis direction at which the first resonator 161a and the first conductor 123 are disposed, that is, a region between the first resonator 161a and the lower surface of the first lens assembly 120 on which the first conductor 123 is disposed includes a gap corresponding to a first distance G. In this case, an inductance change width of the first resonator 161a varies according to the first distance G. Here, the inductance change width may mean an inductance change amount of the first resonator 161a when the first conductor 123 moves from the first position to the second position. At this time, it was confirmed that as the first distance G decreased, the amount of change in inductance increased, and thus the position detection accuracy was improved. And, as the first distance G increases, the amount of change in inductance decreases, and thus it can be confirmed that accurate position detection is difficult.

The amount of change in inductance of the first resonator 161a according to the first distance G is shown in Table 1 below.

TABLE 1

| | First distance (G)(mm) | | | | | |
|---|---|---|---|---|---|---|
| | 0.1 | 0.2 | 0.3 | 0.4 | 0.5 | 0.6 |
| amount of change (uH) | 1.611 | 1.534 | 1.437 | 1.324 | 1.246 | 1.164 |

As described above, it was confirmed that the magnetic flux with respect to the second magnetic field generated in the first conductor 123 increases as the first distance G decreases, and accordingly, it was confirmed that the amount of change in inductance of the first resonator 161a can be increased.

However, if the first distance G becomes too small, the movement of the first lens assembly 120 may be affected, and the inductance of the first resonator 161a may be changed by being influenced by the second conductor other than the first conductor 123. Therefore, the first distance G in the embodiment is to have a range of 0.1 mm to 0.2 mm. In this case, when the first distance G is less than 0.1 mm, the first resonator 161a may affect the movement characteristics of the first lens assembly 120. In addition, when the first distance G is smaller than 0.1 mm, the inductance of the first resonator 161a is changed by being influenced by the second conductor attached to the second lens assembly 130 other than the first conductor 123, accordingly, it may be difficult to accurately detect the position of the first lens assembly 120. In addition, when the first distance G is greater than 0.2 mm, the amount of change in inductance of the first resonator according to a change in the position of the first lens assembly is small, and accordingly, it may be difficult to accurately detect the position of the first lens assembly.

Also, the second resonator 161b may be designed to correspond to the design condition of the first resonator 161a.

Meanwhile, inductive sensing is basically measured by changes in inductance of the resonator and resonance impedance (Rp). In this case, the two parameters are affected by the design, components, and driving conditions of the resonance coil. In this case, Rp is affected by the thermal constant of a coil and a conductor, and the inductance of the resonator is affected by the coefficient of thermal expansion (CTE) of the coil structure (e.g., the substrate). And, since this effect has a very small effect on the inductance change of the entire resonance coil, the inductance change of the resonator is not affected by the thermal change compared to the Hall sensor.

Figure 15:
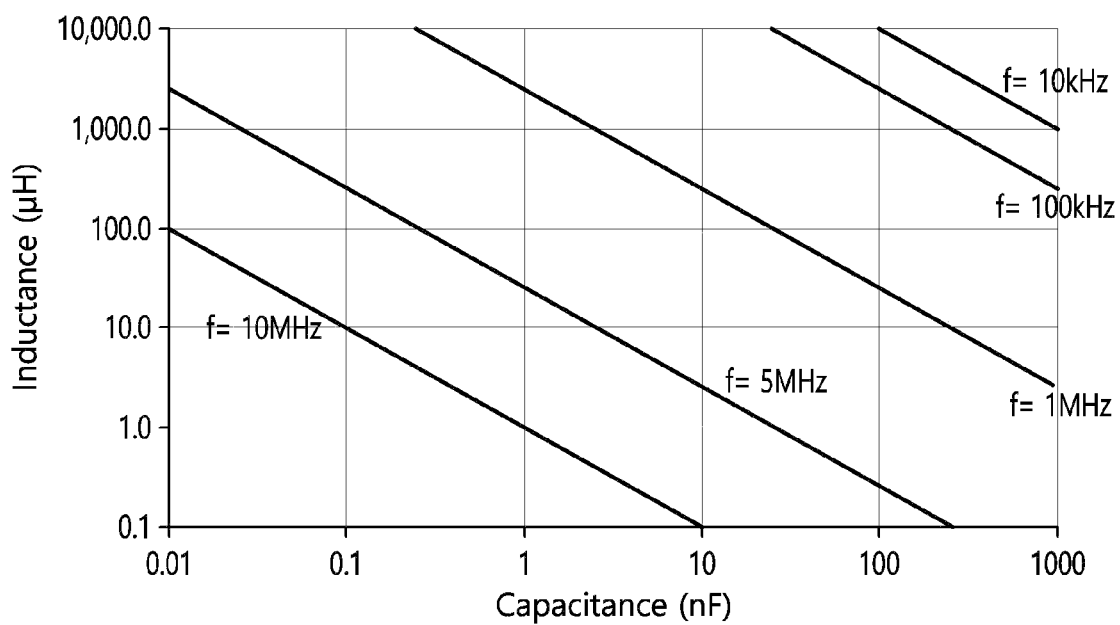
FIG. 15 is a view showing a change in characteristics of a resonator according to a resonance frequency according to an embodiment.

FIG. 15 is a view showing a change in characteristics of a resonator according to a resonance frequency according to an embodiment.

Meanwhile, the first resonator 161a or the second resonator 161b constitutes a resonance circuit and performs an oscillation operation corresponding to the resonance frequency f. At this time, the resonance frequency f is $$f[Hz] = \frac{1}{2\pi\sqrt{LC}}.$$

Here, L is the inductance of the resonance coil constituting the first resonator 161a or the second resonator 161b, and C is the capacitance of the resonance capacitor constituting the first resonator 161a or the second resonator 161b. And, as shown in FIG. 15, the inductance of the resonance coil and the capacitance of the resonance capacitor change according to the resonance frequency.

Figure 16:
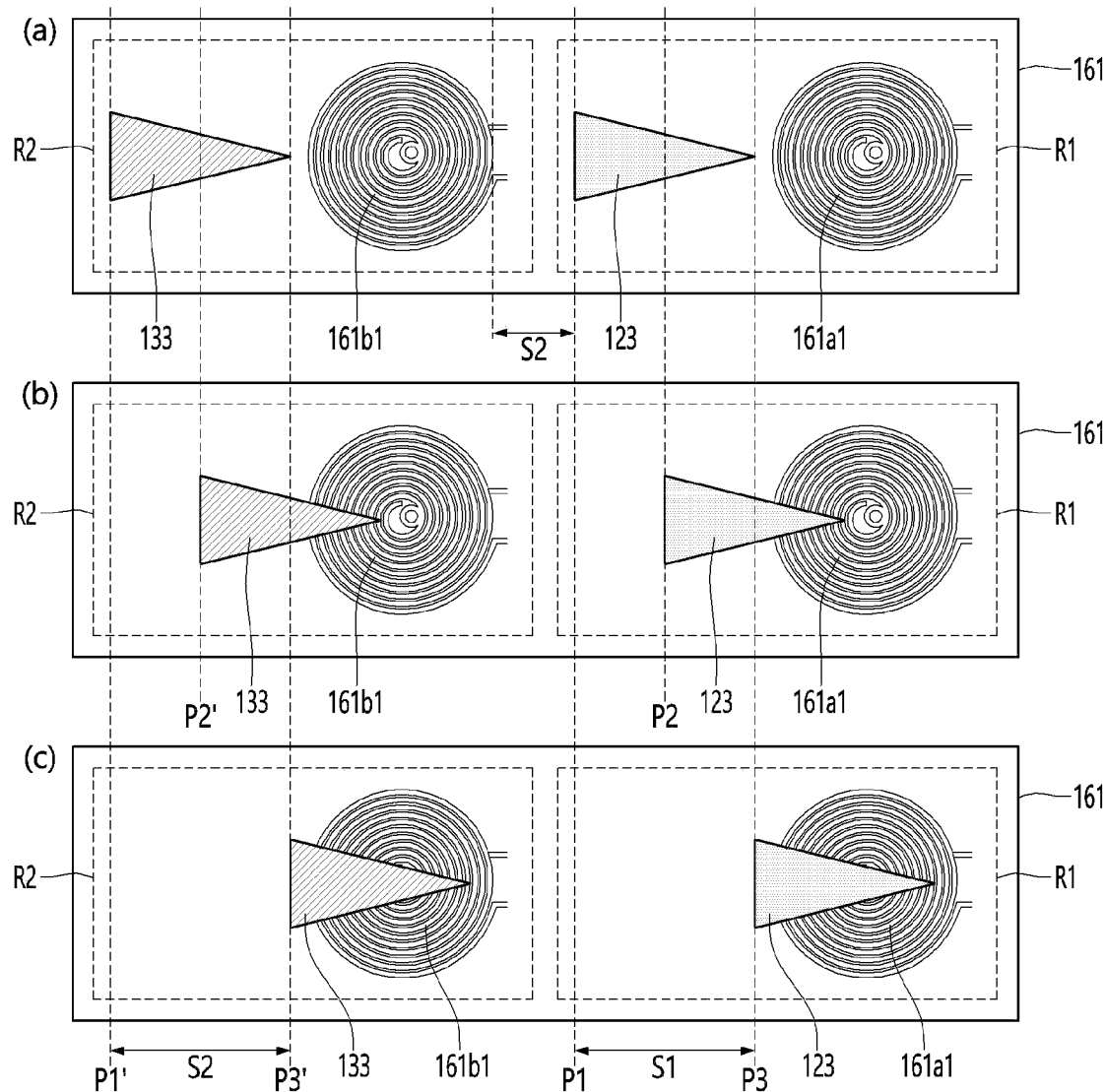
FIG. 16 is a view for explaining a position sensing operation of the lens assembly according to the embodiment.

FIG. 16 is a view for explaining a position sensing operation of the lens assembly according to the embodiment.

Referring to FIG. 16, a first resonance coil 161a1 and a second resonator 161b may be disposed on the first substrate 161 to be spaced apart from each other by a predetermined interval. The upper region of the substrate 161 may be divided into a first region R1 and a second region R2. In this case, the first region R1 is a position sensing region provided by the first resonance coil 161a1, and the second region R2 is a position sensing region provided by the second resonance coil 161b1.

In other words, when a metal material is present on the first region R1, the inductance of the first resonator 161a may be changed by the metal material. Also, when a metal material is present on the second region R2, the inductance of the second resonator 161b may be changed by the metal material present on the second region R2.

In this case, the first conductor 123 attached to the lower surface of the first lens assembly 120 may move only within a range between the first position P1 and the third position P3 corresponding to the first stroke S1 having the first lens assembly 120. In this case, the movable region of the first conductor 123 does not overlap the second region R2. Accordingly, the inductance of the second resonator 161b does not change due to the first conductor 123.

The second conductor 133 attached to the lower surface of the second lens assembly 130 may move only within a range between the first position P1' and the third position P3' corresponding to the second stroke S2 having the second lens assembly 130. In this case, the movable region of the second conductor 133 does not overlap the first region R1. Accordingly, the inductance of the first resonator 161a does not change due to the second conductor 133.

On the other hand, as the distance between the first resonator 161a and the first conductor 123 increases, furthermore, as the overlapping region between the first conductor 123 and the first resonance coil 161a1 increases in the y-axis direction, the inductance of the first resonator 161a is reduced under the influence of the interfering magnetic field generated in the first conductor 123.

In addition, as the distance between the second resonator 161b and the second conductor 133 increases, furthermore, as the overlapping region between the second conductor 133 and the second resonance coil 161b1 increases in the y-axis direction, the inductance of the second resonator 161b is reduced under the influence of the interfering magnetic field generated in the second conductor 133.

Referring to FIG. 16(a), when the first lens assembly 120 is in the tele position, and thus the first conductor 123 is present in the first position P1, the first resonator 161a may have a first-first inductance. In this case, the first-first inductance may have a value similar to that of the first reference inductance. Here, the first reference inductance may mean an inductance of the first resonator 161a in a state in which an interfering magnetic field does not exist. However, even when the first conductor 123 is present at the first position P1, the inductance of the first resonator 161a may be reduced by the interfering magnetic field generated in the first conductor 123, and, accordingly, the first-first inductance may be smaller than the first reference inductance.

In addition, when the second lens assembly 130 is in the first focus position, and thus the second conductor 133 is present in the first position P1', the second resonator 161b may have second-first inductance. In this case, the second-first inductance may have a value similar to that of the second reference inductance. Here, the second reference inductance may mean an inductance of the second resonator 161b in a state in which an interfering magnetic field does not exist. However, even when the second conductor 123 is present at the first position P1', the inductance of the second resonator 161b may be reduced by the interfering magnetic field generated in the second conductor 133, and, accordingly, the second-first inductance may be smaller than the second reference inductance.

Referring to FIG. 16(b), when the first lens assembly 120 is in a position between the tele position and the wide position, and thus the first conductor 123 is present in the second position P2, the first resonator 161a may have a first-second inductance. In this case, the first-second inductance may have a value similar to that of the first reference inductance and the first-first inductance. That is, as the position of the first lens assembly 120 moves, the position of the first conductor 123 also moves. In addition, when the first conductor 123 is in the second position P2 than when it is in the first position P1, the intensity of the interfering magnetic field is greater, and accordingly, the inductance of the first resonator 161a may have the first-second inductance that is decreased by a predetermined value from the first-first inductance.

In addition, when the second lens assembly 130 is in a second focus position, and thus the second conductor 133 is present in the second position P2' between the first position P1' and the second position P3', the second resonator 161b may have a second-second inductance. In this case, the second-second inductance may have a value similar to that of the second reference inductance and the second-first inductance. That is, as the position of the second lens assembly 130 moves, the position of the second conductor 133 also moves. In addition, when the second conductor 133 is in the second position P2' than when it is in the first position P1', the intensity of the interfering magnetic field is greater, and accordingly, the inductance of the second resonator 161b may have the second-second inductance that is decreased by a predetermined value from the second-first inductance.

Referring to FIG. 16(c), when the first lens assembly 120 is moved to the wide position, which is a maximum movable position, and thus the first conductor 123 is present in the third position P3, the first resonator 161a may have a first-third inductance. In this case, the first-third inductance may have a value similar to that of the first reference inductance, the first-first inductance and the first-second inductance. That is, as the position of the first lens assembly 120 moves, the position of the first conductor 123 also moves. In addition, when the first conductor 123 is in the third position P3 than when it is in the first position P1 or the second position P2, the intensity of the interfering magnetic field is greater, and accordingly, the inductance of the first resonator 161a may have the first-third inductance that is decreased by a predetermined value from the first-second inductance.

In addition, when the second lens assembly 120 is moved to the third focus position, which is a maximum movable position, and thus the second conductor 133 is present in the third position P3', the second resonator 161b may have a second-third inductance. In this case, the second-third inductance may have a value similar to that of the second reference inductance, the second-first inductance and the second-second inductance. That is, as the position of the second lens assembly 130 moves, the position of the second conductor 133 also moves. In addition, when the second conductor 133 is in the third position P3' than when it is in the first position P1' or the second position P2', the intensity of the interfering magnetic field is greater, and accordingly, the inductance of the second resonator 161b may have the second-third inductance that is decreased by a predetermined value from the second-second inductance.

As described above, when the first lens assembly 120 moves, the first conductor 123 attached to the first lens assembly 120 causes an inductance change of the first resonator 161a. At this time, the inductance is changed in proportion to the amount of movement of the first lens assembly 120, accordingly, the position of the first conductor 123 and the position of the first lens assembly 120 corresponding thereto can be detected by sensing the inductance of the first resonator 161a.

As described above, when the second lens assembly 130 moves, the second conductor 133 attached to the second lens assembly 130 causes an inductance change of the second resonator 161b. At this time, the inductance is changed in proportion to the amount of movement of the second lens assembly 130, accordingly, the position of the second conductor 133 and the position of the second lens assembly 130 corresponding thereto can be detected by sensing the inductance of the second resonator 161b.

Figure 17:
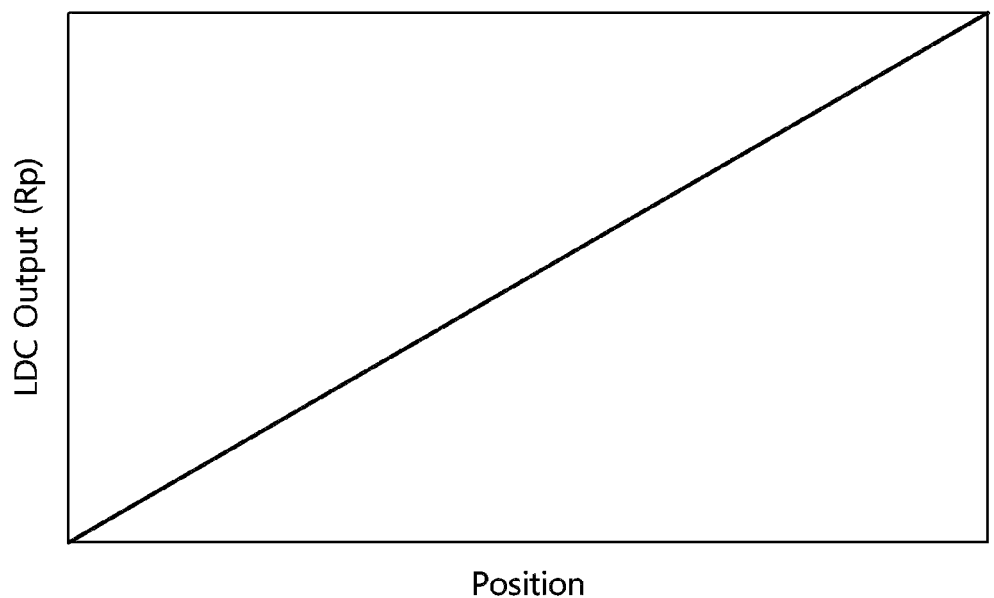
FIG. 17 is a graph showing a positional relationship of a lens assembly corresponding to an output value of an inductance digital converter (LDC) according to an embodiment.

FIG. 17 is a graph showing a positional relationship of a lens assembly corresponding to an output value of an inductance digital converter (LDC) according to an embodiment.

An inductance digital converter LDC detects the inductance of the first resonator 161a, converts and outputs it into a first digital value. In this case, the inductance digital converter LDC may detect the resonance impedance Rp. In this case, the resonance impedance Rp may be calculated as follows.

$$Rp=L/(Rs*c)$$

Here, Rp is the resonance impedance, L is the inductance, Rs is the series resistance value of the resonator, and C is the capacitance of the resonator.

The inductance digital converter LDC detects the inductance of the first resonator 161a, converts and outputs it into a first digital value. In this case, the inductance of the first resonator 161a is linearly changed according to the movement of the first lens assembly 120 within the first stroke of the first lens assembly 120. And, as shown in FIG. 17, a position of the first lens assembly 120 may be detected based on the first digital value (LDC output (Rp)).

The inductance digital converter LDC detects the inductance of the second resonator 161b, converts and outputs it into a second digital value. At this time, the inductance of the second resonator 161b is linearly changed according to the movement of the second lens assembly 130 within the second stroke of the second lens assembly 130. And, as shown in FIG. 17, a position of the second lens assembly 130 may be detected based on the second digital value (LDC output (Rp)).

Figure 18A:
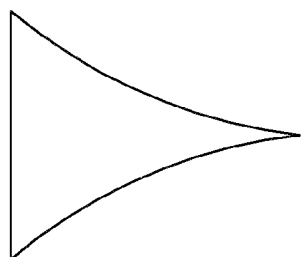
FIG. 18a is a view showing various embodiments of a shape of a conductor in a camera module according to an embodiment.
Figure 18A:
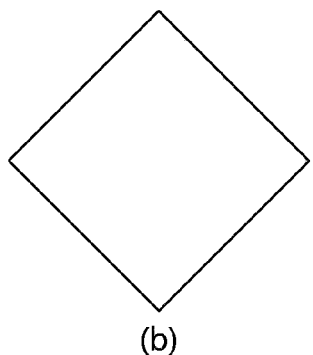
Figure 18A:
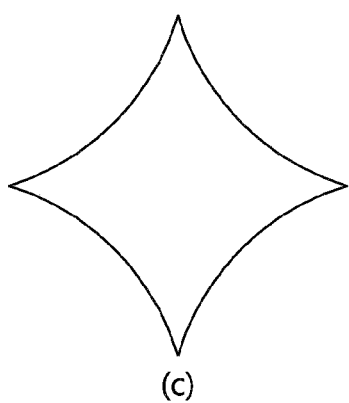

FIG. 18a is a view showing various embodiments of a shape of a conductor in a camera module according to an embodiment.

Referring to FIG. 18a, the conductors 123 and 133 may have a shape in which the width gradually changes in the direction of the optical axis. For example, as shown in FIG. 7, the conductors 123 and 133 may have a triangular shape in a plane shape and a straight line at each side thereof.

Alternatively, referring to FIG. 18a (a), the conductors 123 and 133 may have a triangular shape in a plane shape and a curve at each side thereof.

Also, alternatively, referring to FIG. 18a (b), the conductors 123 and 133 may have a rhombus shape in a plane shape and a straight line at each side thereof.

Also, alternatively, referring to FIG. 18a (c), the conductors 123 and 133 may have a rhombic shape in a plane shape and a curve at each side thereof.

However, the conductors 123 and 133 in the embodiment are not limited to the above-described shapes, and any shape in which the width linearly increases or decreases in the optical axis direction may be used as the shape of the conductors 123 and 133.

Meanwhile, when the conductors 123 and 133 have a rectangular shape with no change in width in the optical axis direction, it may be difficult to accurately detect the position of the lens assembly.

Figure 18B:
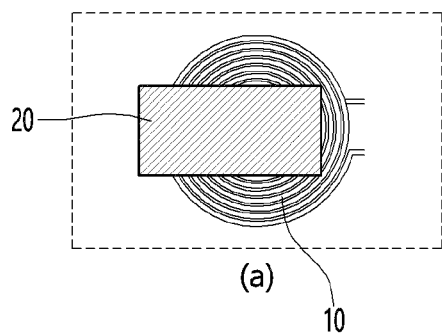
FIG. 18b is a view for explaining a problem in the case where the conductor has a rectangular shape.
Figure 18B:
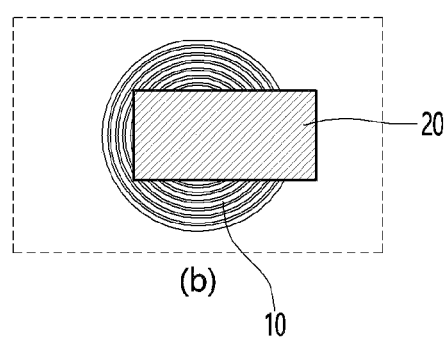

FIG. 18b is a view for explaining a problem in the case where the conductor has a rectangular shape.

Referring to FIG. 18b, when the conductor 20 has a rectangular shape, there is a problem in that position sensing is impossible or accurate position sensing is difficult depending on the position of the lens assembly.

That is, referring to FIG. 18b (a), when the conductor 20 is in the first position, an area of the overlapping region the y-axis direction between the conductor 20 and the resonance coil 10 may be 'A'.

At this time, referring to FIG. 18b (b), even when the conductor 123 moves from the first position to the second position, an area of the overlapping region between the conductor 20 and the resonance coil 10 in the y-axis direction may be 'A'. In other words, when the conductor 20 has a rectangular shape with no change in width in the optical axis direction, the inductance of the resonator may be the same even when the positions of the conductors 20 are different from each other. In this case, since there are two conditions corresponding to one result value, it is impossible to detect at which position the lens assembly is positioned among the two, thereby reducing the reliability of the camera module.

On the other hand, in the embodiment, the first conductor 123 and the second conductor 133 have a shape in which the width changes in the direction of the optical axis. Preferably, the first conductor 123 and the second conductor 133 may have a triangular planar shape. Accordingly, in the embodiment, only one condition corresponding to one result value exists, and accordingly, the position of the lens assembly may be accurately recognized using the digital value output from the inductance digital converter LDC.

<Resonator>

Hereinafter, the resonator according to the embodiment will be described in detail.

Figure 19A:
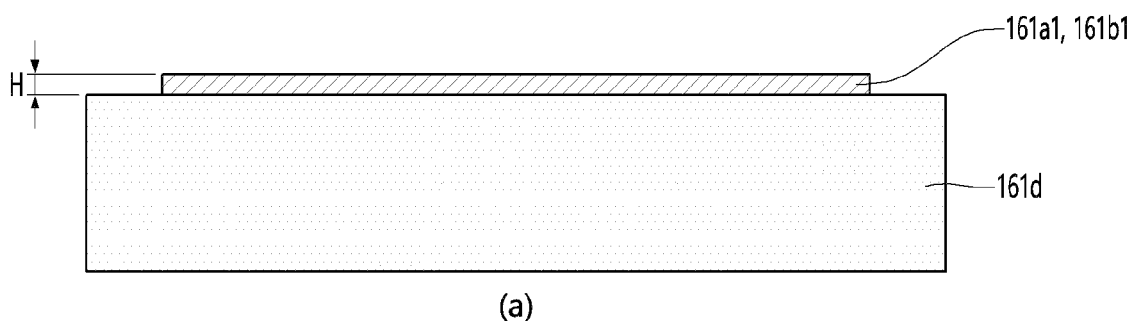
FIG. 19a is a cross-sectional view schematically showing a resonator according to an embodiment.
Figure 19A:
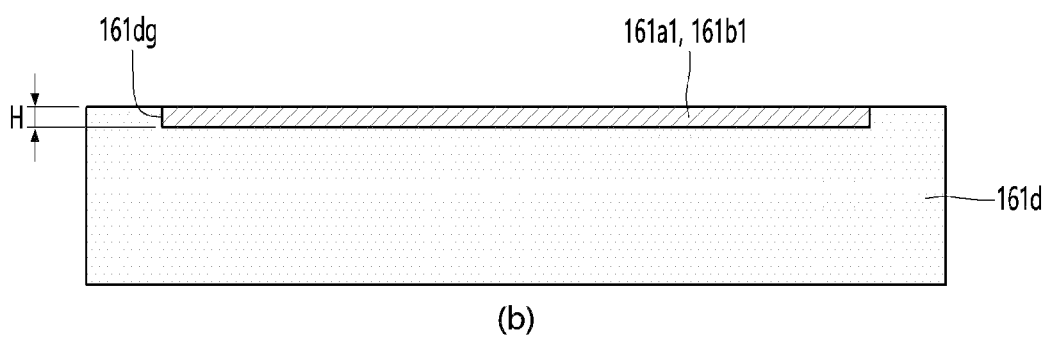
Figure 19B:
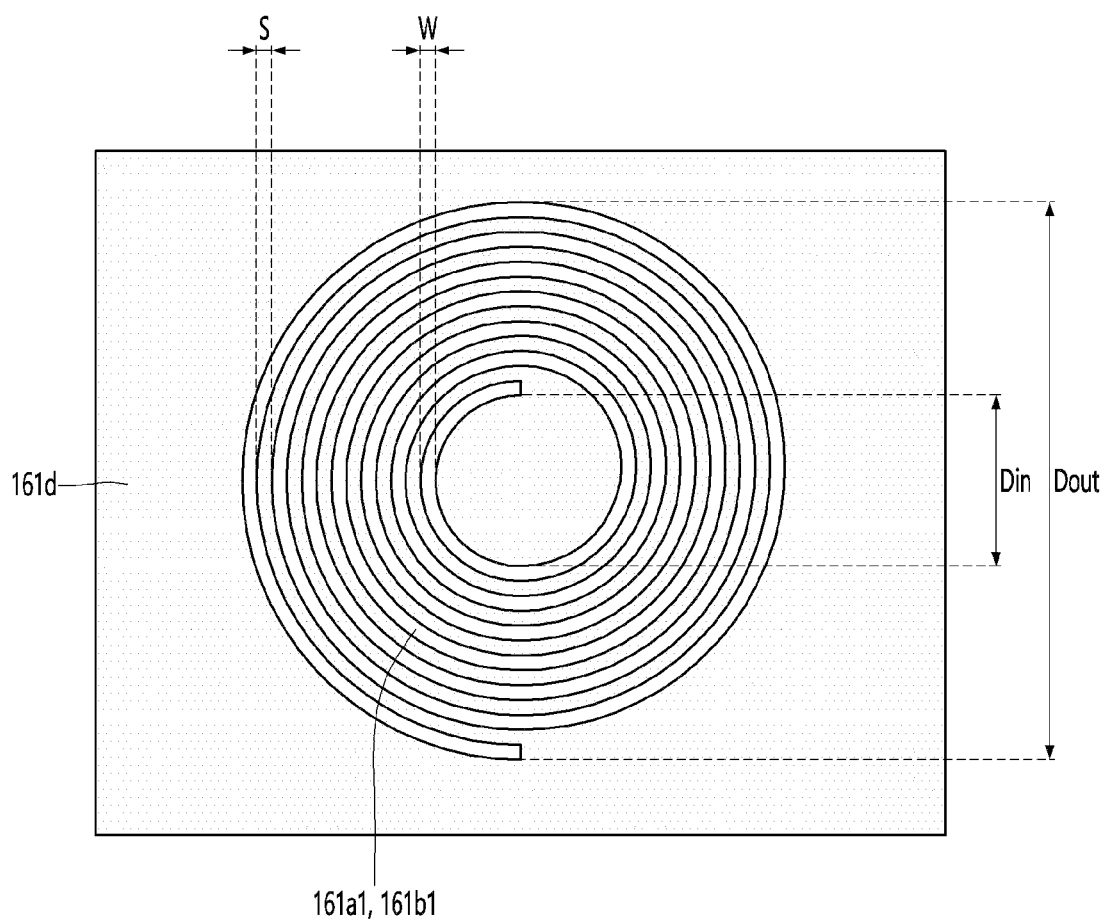

FIG. 19a is a cross-sectional view schematically showing a resonator according to an embodiment, and FIG. 19b is a plan view of the resonator shown in FIG. 19a.

Referring briefly to FIGS. 12a and 12b, the first substrate 161 includes a first resonator 161a and a second resonator 161b. And, in this case, the first resonator 161a may include a first resonance coil 161a1. In addition, although not shown in the drawing, the first resonator 161a may include a first resonance capacitor 161a2 connected with the first resonance coil 161a1 in series. The first resonator 161a may generate a magnetic field by resonating with a resonance frequency f. The first resonator 161a may be a first position sensor for detecting the position of the first lens assembly 120 based on an inductance value that changes according to a change in the strength of the generated magnetic field.

That is, the first resonance capacitor 161a2 forms a first LC resonance circuit together with the first resonance coil 161a1. Preferably, the first resonance capacitor 161a2 and the first resonance coil 161a1 may be a first parallel LC resonance circuit connected in parallel with each other. The first parallel LC resonance circuit may vibrate at a resonance frequency f to generate a magnetic field having a magnitude corresponding to the resonance frequency f.

The second resonator 161b may include a second resonance coil 161b1. In addition, although not shown in the drawing, the second resonator 161b may include a second resonance capacitor (not shown) connected with the second resonance coil 161b1 in series. The second resonator 161b may generate a magnetic field by resonating with the resonance frequency f. The second resonator 161b may be a second position sensor for detecting the position of the second lens assembly 130 based on an inductance value that changes according to a change in the strength of the generated magnetic field.

That is, the second resonance capacitor forms a second LC resonance circuit together with the second resonance coil 161b1. Preferably, the second resonance capacitor and the second resonance coil 161b1 may be a second parallel LC resonance circuit connected in parallel with each other. The second parallel LC resonance circuit may vibrate at the resonance frequency f to generate a magnetic field having a magnitude corresponding to the resonance frequency f.

Referring back to FIG. 19a, the first substrate 161 includes an insulating layer 161d and resonance coils 161a1 and 161b1 disposed on the insulating layer 161d. In this case, a resonance capacitor (not shown) disposed adjacent to the resonance coils 161a1 and 161b1 may be included on the insulating layer 161d. That is, each of the resonance coils 161a1 and 161b1 include one end and the other end. In addition, one end of the resonance capacitor may be connected to one end of the resonance coils 161a1 and 161b1, and the other end of the resonance capacitor may be connected to the other end of the resonance coils 161a1 and 161b1. Also, both ends of the resonance capacitor may be connected to an input terminal (not shown) of the inductance digital converter LDC.

Meanwhile, the insulating layer 161d may have a plurality of layer structures. In this case, the insulating layer 161d may include an insulating layer material having a flexible characteristic and an insulating layer material having a rigid characteristic such that a portion of the region has a flexible characteristic and the remaining partial region has a rigid characteristic. In addition, the insulating layer 161d disposed on the rigid region may include both the insulating layer material having a rigid characteristic and a flexible characteristic. In addition, an insulating layer material having a flexible characteristic may be only disposed in the insulating layer 161d disposed on the flexible region.

Resonance coils 161a1 and 161b1 may be disposed on the insulating layer 161d. In this case, the resonance coils 161a1 and 161b1 may be disposed to be spaced apart from each other by a predetermined interval on the insulating layer 161d.

Meanwhile, as shown in FIG. 19a (a), the resonance coils 161a1 and 161b1 may have a structure in which they protrude from the insulating layer 161d. Also, as shown in FIG. 19a (b), a groove 161dg corresponding to a coil shape may be formed on a surface of the insulating layer 161d, and accordingly, the resonance coils 161a1 and 161b1 may have a structure buried in the groove 161dg.

Such resonance coils 161a1 and 161b1 may be formed by performing an etching process, and may be formed by performing a plating process differently from this.

When the resonance coils 161a1 and 161b1 are formed through an etching process, a metal layer (not shown) may be disposed on the insulating layer 161d, and the metal layer may be etched to correspond to the coil shape to form the resonance coils 161a1, 161b1.

In addition, when the resonance coils 161a1 and 161b1 are formed through the plating process, a mask (not shown) having an opening corresponding to the coil shape may be formed on the insulating layer 161d, and accordingly, the resonance coils 161a1 and 161b1 may be formed by performing plating (electroless plating or electrolytic plating) to fill the opening of the mask.

Referring to FIG. 19B, the resonance coils 161a1 and 161b1 may be disposed on the insulating layer 161d by turning the plurality of times. That is, the resonance coils 161a1 and 161b1 may be wound on the insulating layer 161d with a predetermined number of turns. The resonance coils 161a1 and 161b1 may be disposed as a single layer on the insulating layer 161d. An outer surface of the resonance coils 161a1 and 161b1 may be coated with an insulating material or covered with an insulating layer, but are not limited thereto. The resonance coils 161a1 and 161b1 may be disposed on the insulating layer 161d with the number of turns in the range of 7 to 11 turns. Preferably, the resonance coils 161a1 and 161b1 may be disposed on the insulating layer 161d with the number of turns in the range of 8 to 10 turns. More preferably, the resonance coils 161a1 and 161b1 may be disposed on the insulating layer 161d by turning 9 times. The number of turns of the resonance coils 161a1 and 161b1 is related to the total inductance of the resonance part. As the number of turns of the resonance coils 161a1 and 161b1 increases, the total inductance of the resonator also increases, and the range of change in inductance also increases. In addition, when the change range of the inductance increases, the position of the lens assembly may be more accurately detected. However, as the number of turns of the resonance coils 161a1 and 161b1 increases, there is a problem in that the size of the camera module increases or the product price increases. Accordingly, in the embodiment, the resonance coils 161a1 and 161b1 are turned 9 times to be disposed on the insulating layer 161d.

Meanwhile, the resonance coils 161a1 and 161b1 have a predetermined thickness and are disposed on the insulating layer 161d. At this time, as the thickness of the resonance coils 161a1 and 161b1 increases, the total inductance of the resonator also increases. The thicker the thickness of the resonance coils 161a1 and 161b1 is, the better. However, when the thickness of the resonance coils 161a1 and 161b1 is thin, the total inductance becomes small, the number of turns of the resonance coils 161a1 and 161b1 must be increased to compensate for this, however, it is constrained by limited PCB space. In addition, when the thickness of the resonance coils 161a1 and 161b1 is thin, the resistance increases and signal loss occurs in the process of transmitting high-frequency signals (MHz or higher), and it may be more affected by the parasitic capacitor generated between the inductance. Therefore, in the embodiment, the thickness of the resonance coils 161a1 and 161b1 is set to have a minimum thickness of 50 μm or more. In addition, in the embodiment, the thickness (H, see FIG. 19A) of the resonance coils 161a1 and 161b1 is 1 mm or less. For example, the thickness H of the resonance coils 161a1 and 161b1 may range from 50 um to 1 mm. When the thickness H of the resonance coils 161a1 and 161b1 exceeds 1 mm, the thickness of the insulating layer must also increase as much as the thickness of the resonance coils 161a1 and 161b1, accordingly, there is a problem in that the overall size of the resonator increases.

Also, the resonance coils 161a1 and 161b1 may be disposed on the insulating layer 161d to have a predetermined width W, have the above-described number of turns, and be spaced apart from each other by a predetermined interval S. In this case, the width W of the resonance coils 161a1 and 161b1 may range from 50 um to 1 mm. That is, when the width of the resonance coils 161a1 and 161b1 is smaller than 50 um, the total inductance decreases, the number of turns of the resonance coils 161a1 and 161b1 must be increased to compensate for this, and this is limited by the limited PCB space. In addition, when the width of the resonance coils 161a1 and 161b1 is smaller than 50 um, the resistance increases and signal loss occurs in the process of transmitting a signal of a high-frequency signal (MHz or higher), and it may be more affected by the parasitic capacitor generated between the inductance.

Also, for the same reason as described above, the spacing S of the resonance coils 161a1 and 161b1 may be in a range of 50 μm to 300 μm. When the spacing S of the resonance coils 161a1 and 161b1 is less than 50 μm, accurate inductance sensing may not be possible due to mutual interference between neighboring coils. Also, when the spacing S between the resonance coils 161a1 and 161b1 is greater than 300 μm, the PCB space occupied by the resonance coils increases under the condition that the resonance coils have the same total inductance.

Meanwhile, the resonance coils 161a1 and 161b1 may be disposed on the insulating layer 161d to surround the first region and have the above-described number of turns. In this case, the width of the first region may correspond to an inner width Din of the resonance coils 161a1 and 161b1. The inner width Din may mean a width of a portion having the smallest distance of a straight line crossing the centers of the resonance coils 161a1 and 161b1 on the inner surfaces of the resonance coils 161a1 and 161b1. Also, the resonance coils 161a1 and 161b1 may have a predetermined outer width Dout. The outer width Dout may mean a width of a portion on the outer surface of the resonance coils 161a1 and 161b1 in which the distance of a straight line crossing the centers of the resonance coils 161a1 and 161b1 is greatest. In this case, in the embodiment, the outer width Dout is at least three times greater than the inner width Din. When the outer width Dout is less than three times the inner width Din, the change width decreases as the total inductance decreases, and accordingly, it may be difficult to accurately detect the position of the lens assembly.

Figure 20A:
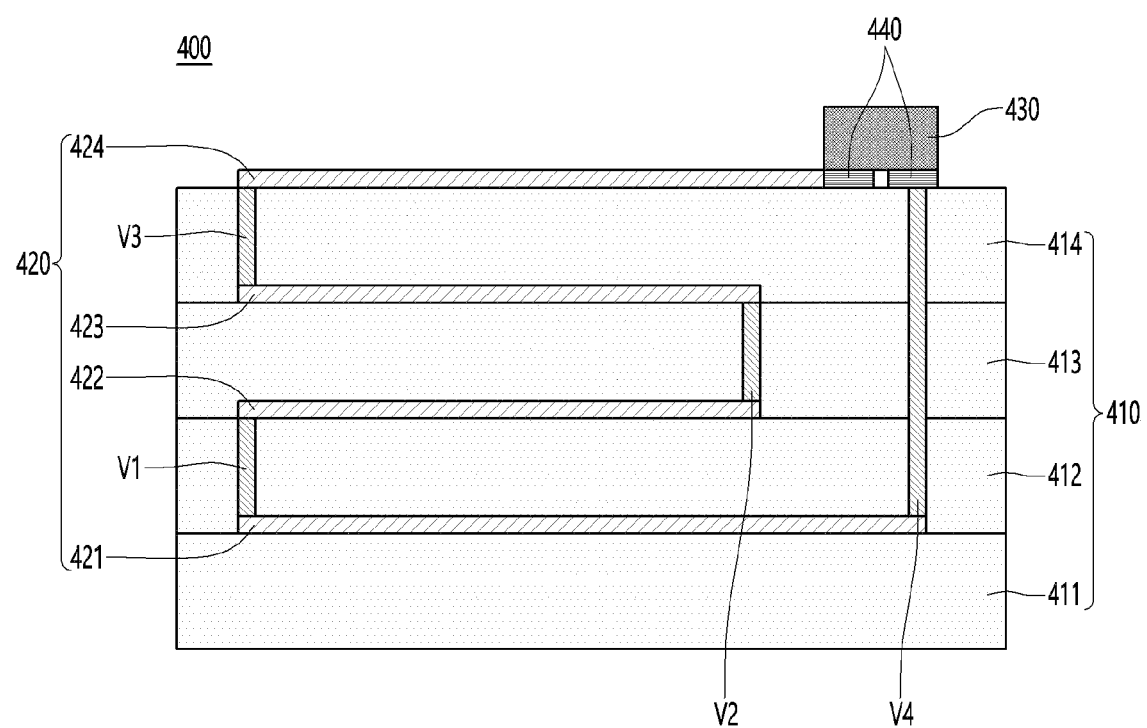
FIG. 20a is a cross-sectional view schematically showing a resonator according to another exemplary embodiment.
Figure 20B:
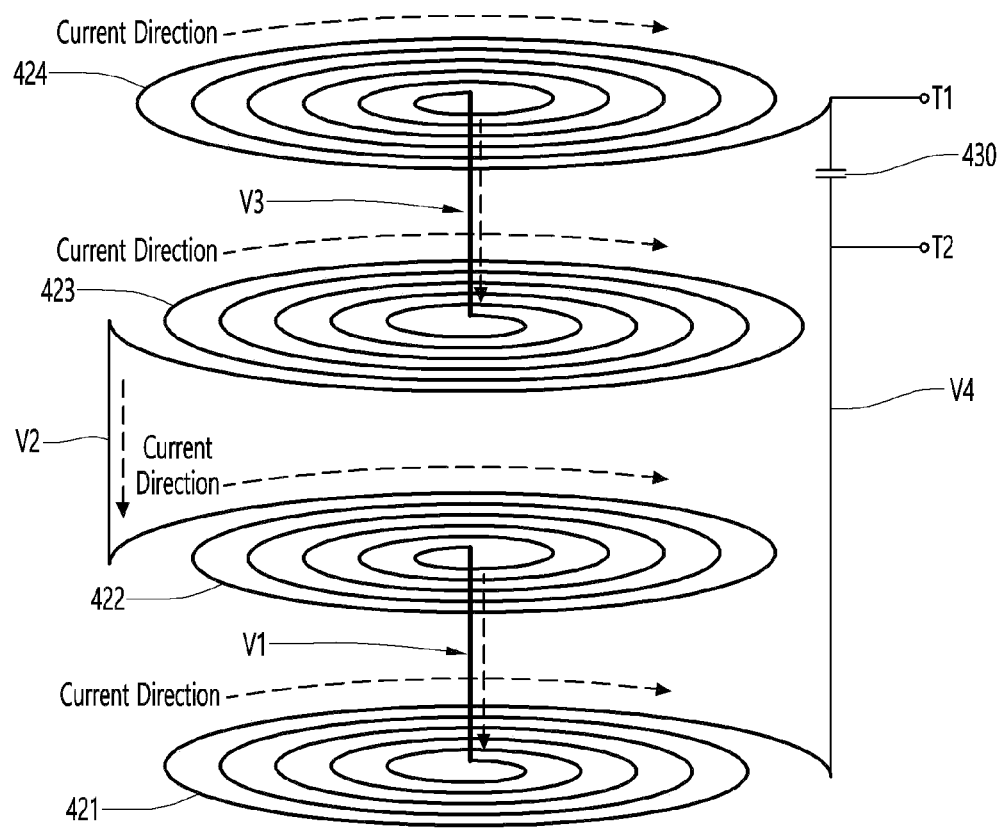
Figure 20C:
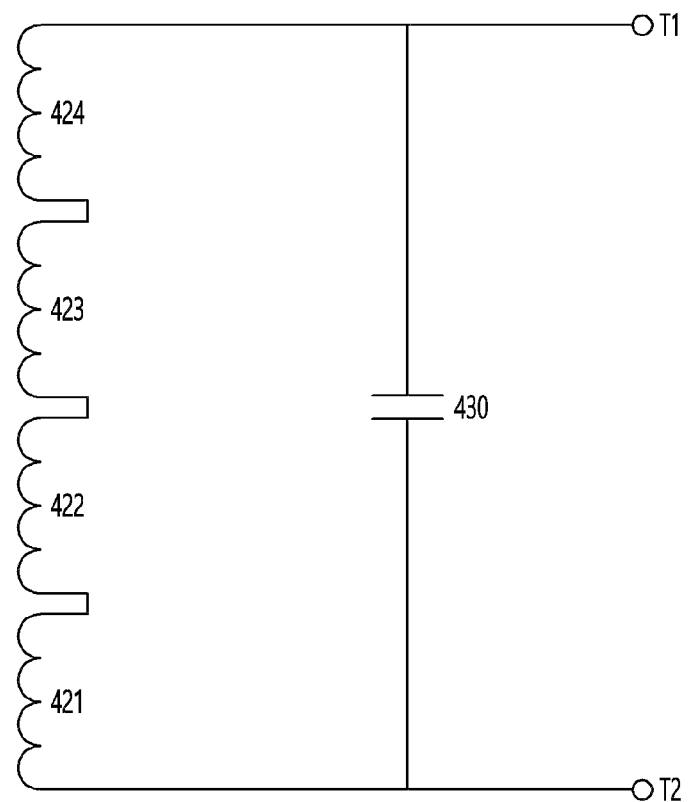
FIG. 20c is an equivalent circuit diagram of the resonator shown in FIGS. 20a and 20b.

FIG. 20a is a cross-sectional view schematically showing a resonator according to another exemplary embodiment, FIG. 20b is a view specifically showing a resonance coil in the resonator shown in FIG. 20a, and FIG. 20c is an equivalent circuit diagram of the resonator shown in FIGS. 20a and 20b.

Referring to FIG. 20a, the camera module includes a resonator 400. In this case, the resonator 400 may be any one of the previously described first resonator 161a and the second resonator 161b. Hereinafter, for convenience of description of the first resonator 161a and the second resonator 161b, one of them will be referred to as the resonator 400. However, it should be borne in mind that the resonator 400 below may replace the first resonator 161a and the second resonator 161b.

The resonator 400 may have a plurality of layer structures. More preferably, as described above, the resonator 400 may include an insulating layer 410, a resonance coil 420 and a resonance capacitor 430 disposed on the insulating layer 410. In addition, the insulating layer 410 may have a plurality of stacked structures.

The insulating layer 410 may include a first insulating layer 411, a second insulating layer 412, a third insulating layer 413, and a fourth insulating layer 414. That is, the insulating layer 410 may have a four-layer structure, but is not limited thereto.

In addition, the resonance coil 420 includes a first coil portion 421 disposed on the first insulating layer 411, a second coil portion 422 disposed on the second insulating layer 412, a third coil portion 423 disposed on the third insulating layer 413, and a fourth coil portion 424 disposed on the fourth insulating layer 414.

That is, in the embodiment, the resonance coil 420 has a plurality of layer structures and is disposed on the plurality of insulating layers. Accordingly, in the embodiment, the length of the resonance coil 420 may be increased, and correspondingly, the total inductance of the resonator may be increased to increase the change width.

At this time, each of the first coil portion 421, the second coil portion 422, the third coil portion 423, and the fourth coil portion 424 is disposed to have a circular spiral structure as shown in FIG. 19b.

The first coil portion 421, the second coil portion 422, the third coil portion 423, and the fourth coil portion 424 may be connected to each other in series through the vias V1, V2, V3, and V4. Accordingly, in the embodiment, it is possible to provide a resonator having a high inductance within a minimum PCB area.

To this end, a first via V1 is formed in the second insulating layer 412. The first via V1 may have one end connected to the first coil portion 421 and the other end connected to the second coil portion 422. In addition, the first coil portion 421 may be connected in series with the second coil portion 422 through the first via V1.

A second via V2 is formed in the third insulating layer 413. The second via V2 may have one end connected to the second coil portion 422 and the other end connected to the third coil portion 423. In addition, the second coil portion 422 may be connected in series with the third coil portion 423 through the second via V2.

A third via V3 is formed in the fourth insulating layer 414. The third via V3 may have one end connected to the third coil portion 423 and the other end connected to the fourth coil portion 424. In addition, the third coil portion 423 may be connected in series with the fourth coil portion 424 through the third via V3.

At this time, the first coil portion 421, the second coil portion 422, the third coil portion 423, and the fourth coil portion may be formed by an additive process, a subtractive process, a modified semi additive process (MSAP) and a semi additive process (SAP) method, which is a typical printed circuit board manufacturing process, and a detailed description thereof will be omitted herein.

In addition, each of the first to third vias V1, V2, and V3 is disposed to pass through any one of the second to fourth insulating layers 412, 413, and 414. Preferably, each of the first to third vias V1, V2, and V3 may be formed by filling an inside of a via hole (not shown) passing through any one of the second to fourth insulating layers 412, 413, and 414 with a conductive material or plating with a conductive material.

A metal material for forming the first to third vias V1, V2, V3 may be any one material selected from Cu, Ag, Sn, Au, Ni, and Pd, and the metal material may be filled using any one of electroless plating, electrolytic plating, screen printing, sputtering, evaporation, ink jetting and dispensing or combination thereof.

In this case, the via hole may be formed by any one of processing methods, including mechanical, laser, and chemical processing.

When the via hole is formed by mechanical processing, methods such as milling, drilling, and routing may be used, and when the via hole is formed by laser processing, a UV or $CO_2$ laser method may be used, and when the via hole is formed by chemical processing, drugs containing aminosilane, ketones, etc. may be used, and the like, thereby the insulating layers may be opened.

Meanwhile, a pad portion 440 is disposed on the fourth insulating layer 414, and a resonance capacitor 430 may be attached to the pad portion 440. In this case, one end of the resonance capacitor 430 is connected to the fourth coil portion 424, and the other end of the resonance capacitor 430 is connected to the first coil portion 421. To this end, the resonator 400 may include a fourth via V4 disposed to pass through the second insulating layer 412, the third insulating layer 413, and the fourth insulating layer 414 in common. The fourth via V4 may have one end connected to the first coil portion 421 and the other end connected to the resonance capacitor 430.

Referring to FIG. 20b, currents may flow in the same direction as each other in the first coil portion 421, the second coil portion 422, the third coil portion 423, and the fourth coil portion 424. To this end, the first coil portion 421, the second coil portion 422, the third coil portion 423, and the fourth coil portion 424 may be disposed on the insulating layer 410 by turning in different directions.

Preferably, the first coil portion 421, the second coil portion 422, the third coil portion 423, and the fourth coil portion 424 may include one end and the other end, respectively.

In this case, one end of each of the first coil portion 421, the second coil portion 422, the third coil portion 423, and the fourth coil portion 424 may be an end disposed on an inner side of the coil, and the other end may be an end disposed on an outer side the coil.

In addition, the turning direction of each of the first coil portion 421, the second coil portion 422, the third coil portion 423, and the fourth coil portion 424 may mean a direction starting from the other end and turning to one end, differently, it may mean a direction starting from the other end and turning to one end. Hereinafter, the turning direction of each coil portion will be described as a rotational direction from the other end positioned on the inner side to one end positioned on the outer side.

For example, the first coil portion 421 may be disposed on the first insulating layer 411 by turning in a clockwise direction. In addition, the second coil portion 422 may be disposed on the second insulating layer 412 by turning in a counterclockwise direction opposite to the turning direction of the first coil portion 421. Also, the third coil portion 423 may be disposed on the third insulating layer 413 by turning in a clockwise direction opposite to the turning direction of the second coil portion 422. In addition, the fourth coil portion 424 may be disposed on the fourth insulating layer 414 by turning in a counterclockwise direction opposite to the turning direction of the third coil portion 423. In other words, each coil portion may be disposed by turning in a direction opposite to the turning direction of the coil portion disposed in a neighboring layer.

Meanwhile, the resonance capacitor 430 of the resonator 400 has one end connected to the first coil portion 421 and the other end connected to the fourth coil portion 424. In addition, one end of the resonance capacitor may be connected to the first output terminal T1 connected to the inductance digital converter LDC, and the other end of the resonance capacitor may be connected to the second output terminal T2 connected to the inductance digital converter LDC.

Referring to FIG. 20c, the resonator 400 as described above includes a resonance coil 420 including a first coil portion 421, a second coil portion 422, a third coil portion 423, and a fourth coil portion 424 connected in series with each other, and a resonance capacitor 430 may be connected to both ends thereof, and both ends of the resonance capacitor 430 may constitute a resonance circuit connected to the inductance digital converter (LDC).

As described above, in the embodiment, the resonance coil 420 is disposed on the plurality of insulating layers to have a plurality of layer structures, so that the total inductance of the resonator 400 can be maximally increased within a limited space. Meanwhile, the thickness of the resonator having the four-layer structure (more specifically, the thickness of the substrate in the first rigid region) may be in the range of 0.4 mm to 0.8 mm. Preferably, the thickness of the resonator having a four-layer structure may be in the range of 0.5 mm to 0.6 mm.

Hereinafter, a resonator according to another embodiment will be described.

Figure 21:
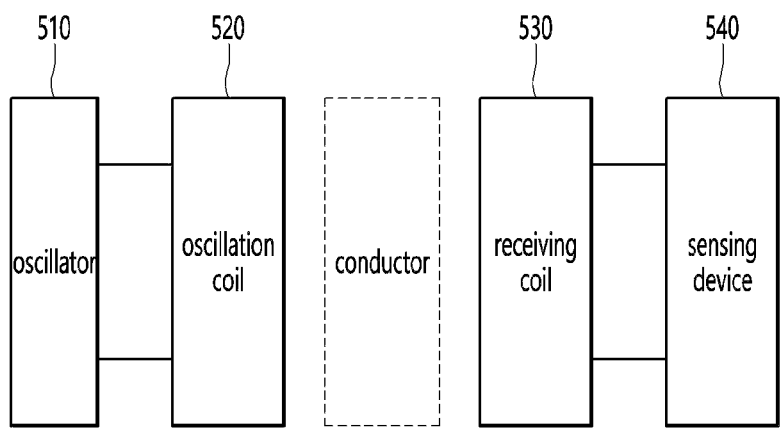
FIG. 21 is a block diagram showing a resonator according to another exemplary embodiment.

FIG. 21 is a block diagram showing a resonator according to another exemplary embodiment.

The resonator described with reference to FIGS. 19A to 20C includes only an oscillation coil that generates a magnetic field by an AC signal having a predetermined resonance frequency generated by an oscillator (not shown). In addition, the inductance of the oscillation coil is changed by a conductor approaching the surroundings, and the position of the lens assembly is sensed by detecting the changed inductance by an inductance digital converter LDC.

On the other hand, referring to FIG. 21, the resonance coil of the resonator 500 according to another embodiment of the present invention includes an oscillation coil 520 and a receiving coil 530. In addition, the oscillation coil 520 generates a magnetic field by an AC signal applied from the oscillator 510. At this time, the magnetic field generated in the oscillation coil 520 induces a voltage in the receiving coil 530. At this time, when the conductor approaches the periphery of the resonator 500, the magnitude of the magnetic field generated in the oscillation coil 520 is reduced, thereby reducing the voltage induced in the receiving coil 530. Then, the sensing device 540 is connected to the receiving coil 530 to sense the voltage induced in the receiving coil 540, and to sense the position of the lens assembly based on this.

More specifically, the magnetic field generated in the oscillation coil 520 may be induced in the receiving coil 530. In this case, as the position of the conductor changes in a situation where a magnetic field is generated in the receiving coil 530, the overlap area between the receiving coil 530 and the conductor changes.

At this time, the receiving coil 530 resonates with the oscillation coil 520 to generate an AC frequency having a constant amplitude, the amount of eddy current generated varies according to the overlap area with the conductor. And, by the flow of such the eddy current, a magnetic flux in the opposite direction to the magnetic flux generated in the receiving coil 530 is generated, and the amplitude of the signal output to the oscillator 510 is reduced by the influence of the magnetic flux. Therefore, in the embodiment, an AC signal having a different amplitude is generated according to the overlap area between the receiving coil 530 and the conductor, and the sensing device 540 may sense the position of the lens assembly by sensing the intensity of the generated AC signal.

That is, the resonator described with reference to FIGS. 19a to 20c has a structure including only an oscillation coil, and the resonator of FIG. 21 has a structure including an oscillation coil and a receiving coil. In this case, the structure including the oscillation coil and the receiving coil may acquire an accurate sensing value without being affected by external noise compared to the structure including only the oscillation coil. That is, in the resonator including only the oscillation coil, the oscillation operation by the resonance frequency and the position sensing operation of the lens assembly by the conductor are performed using only the oscillation coil. Accordingly, in the resonator including only the oscillation coil, noise generated by an external magnetic material other than the conductor corresponding to the target directly affects the sensing value, and thus it may be difficult to accurately detect the position of the lens assembly. On the other hand, in the resonator including the oscillation coil and the receiving coil, a coil for performing an oscillation operation and a coil for acquiring a position sensing value by a conductor exist separately. Accordingly, in the resonator including the oscillation coil and the receiving coil, the external noise as described above is mutually canceled out between the oscillating coil and the receiving coil, so that the sensed value is not greatly affected, accordingly, it is possible to obtain a sensed value having a strong noise characteristic.

Hereinafter, a detailed arrangement structure of the resonance coil shown in FIG. 21 will be described.

Figure 22A:
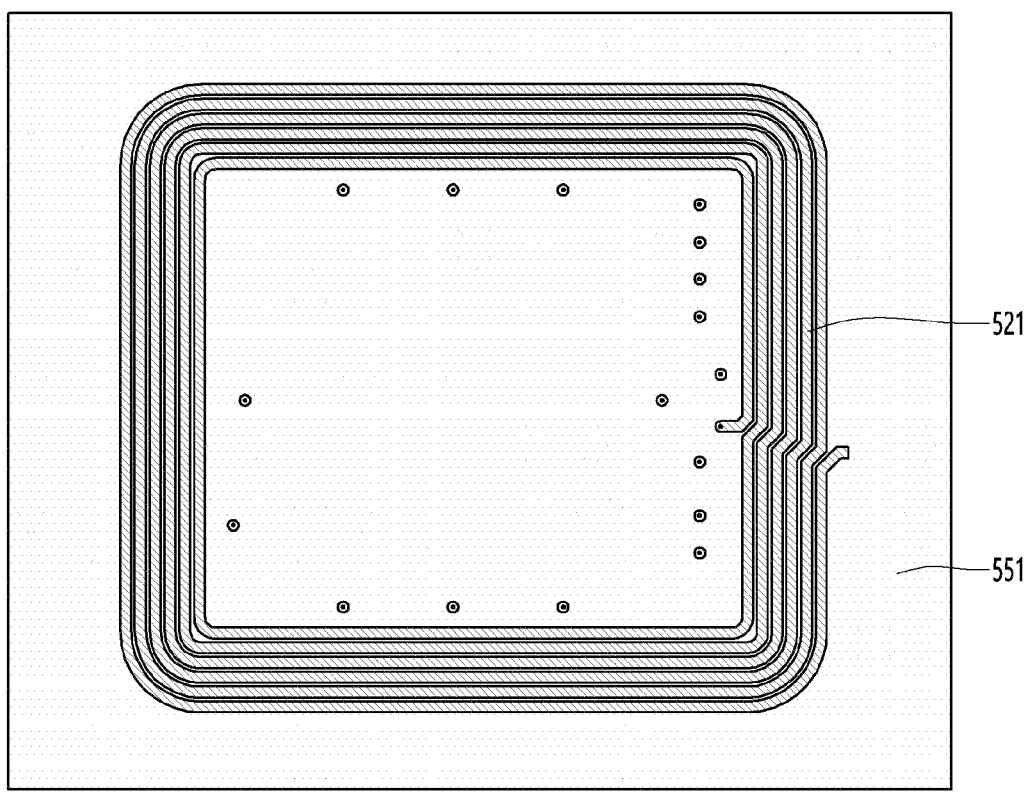
FIGS. 22a to 22f are plan views showing layer-by-layer structure of FIG. 21.
Figure 22B:
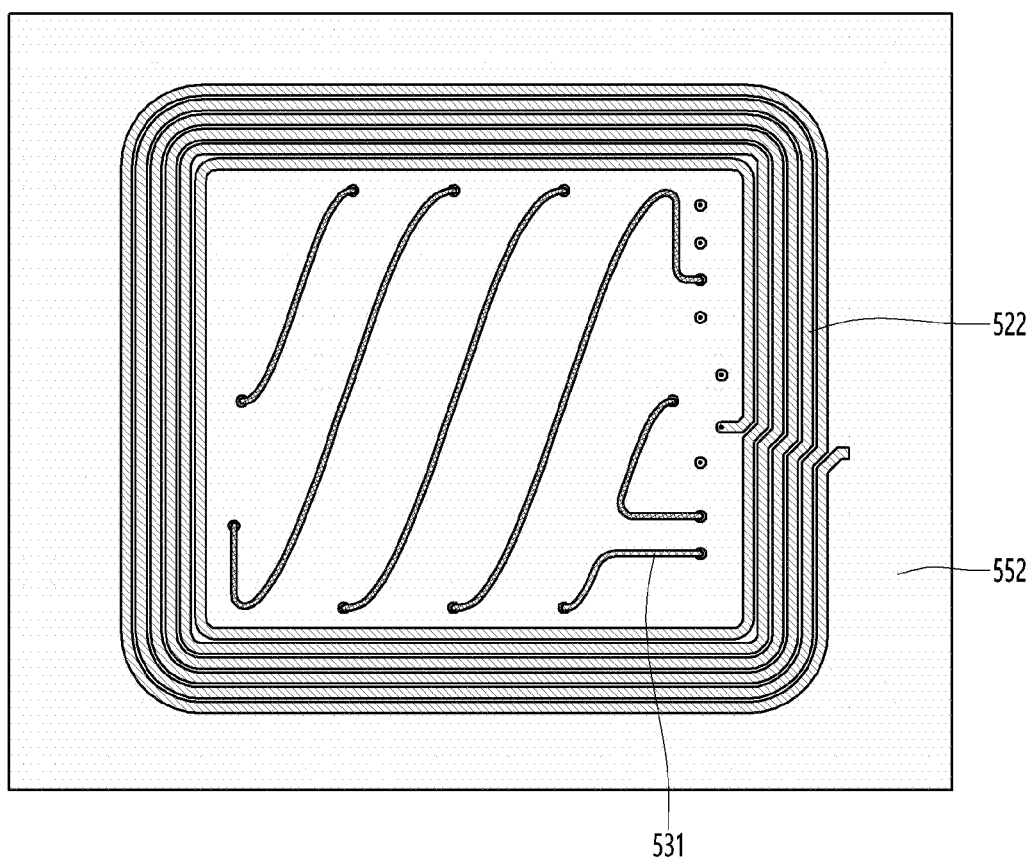
Figure 22C:
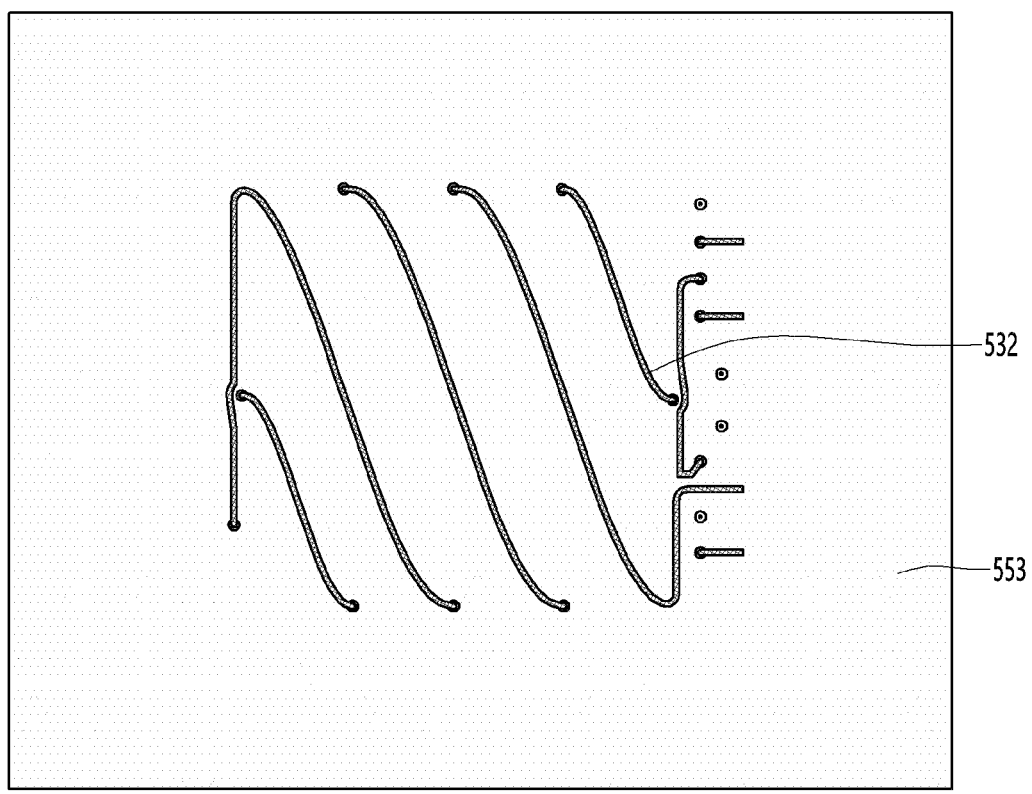
Figure 22D:
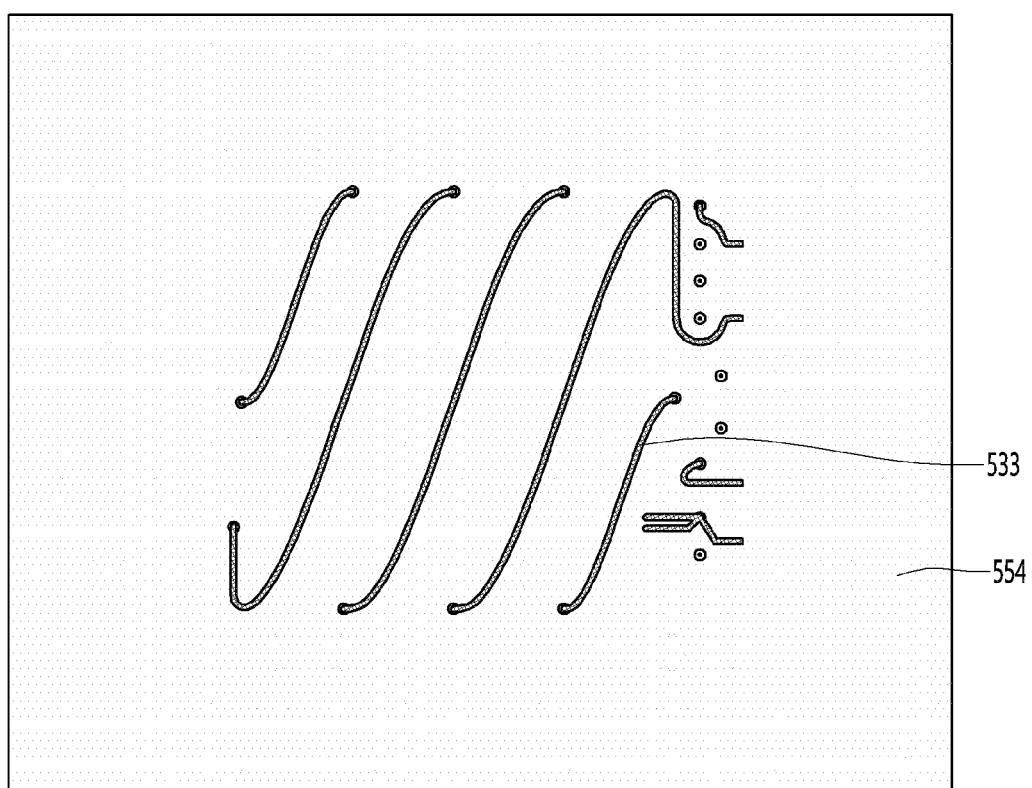
Figure 22E:
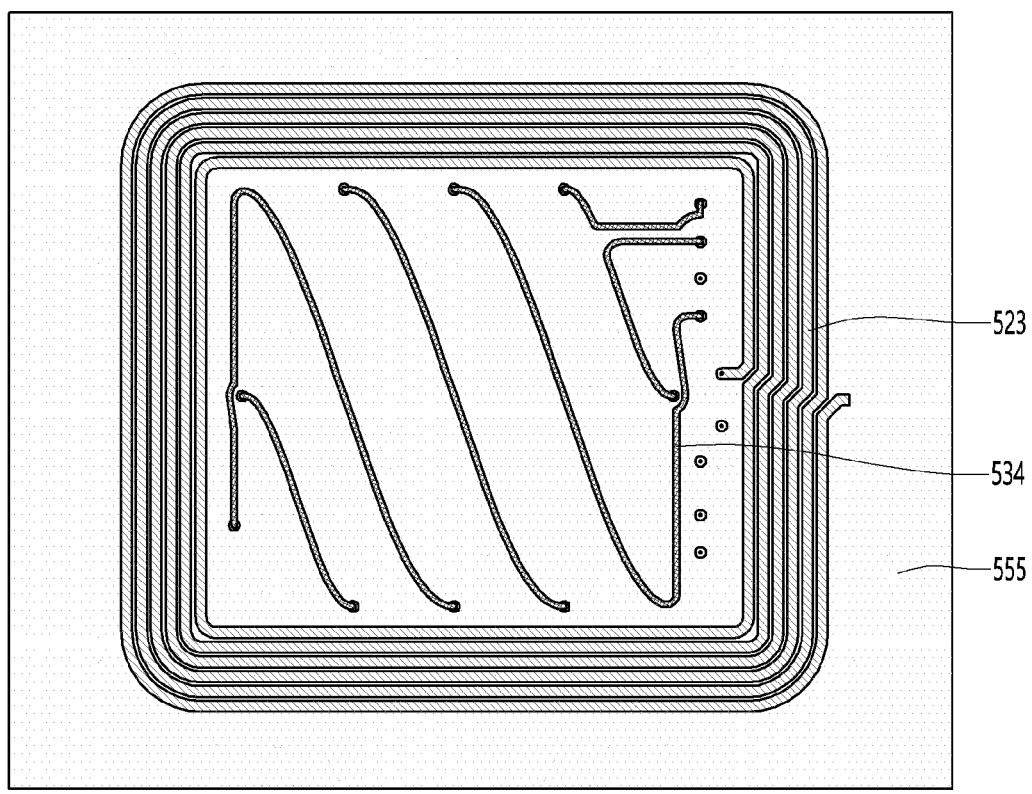
Figure 22F:
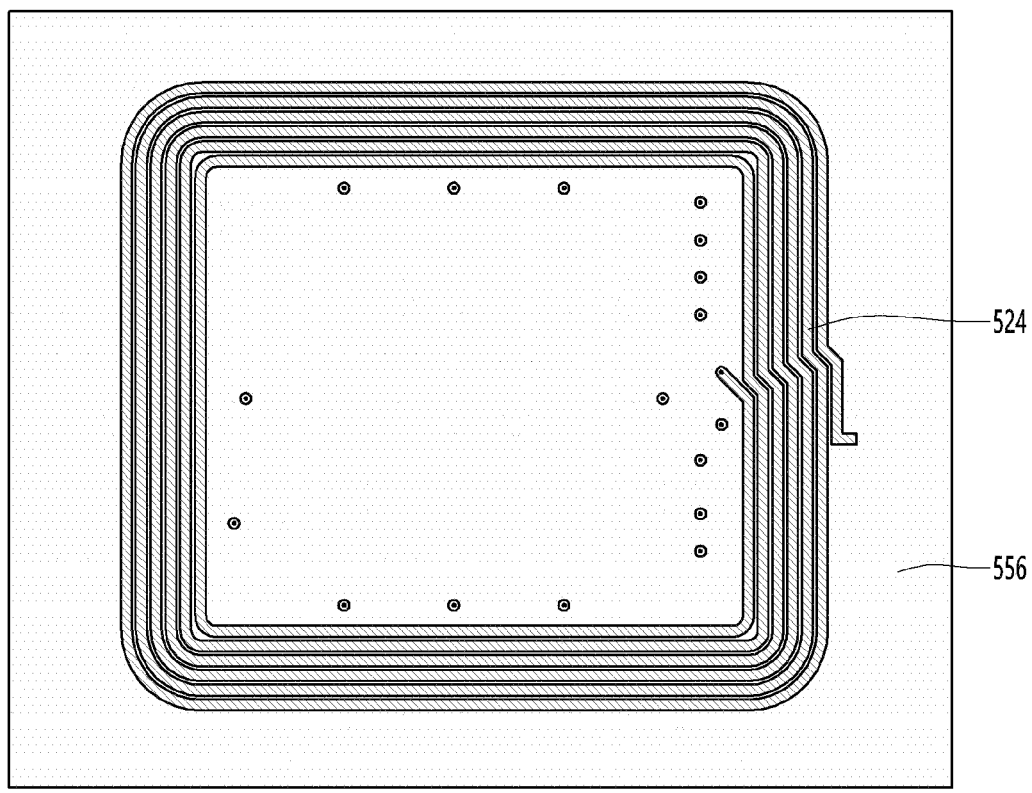
Figure 22G:
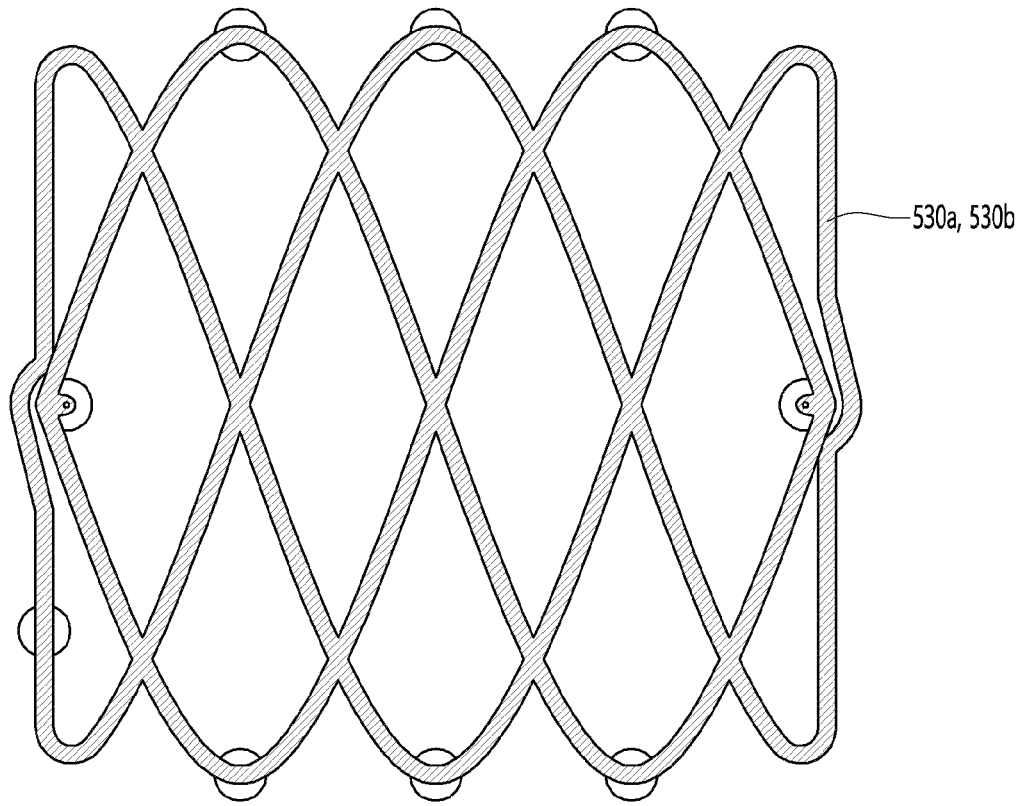
FIG. 22g is a view for explaining a planar shape of the receiving coil shown in FIGS. 22a to 22f.

FIGS. 22a to 22f are plan views showing layer-by-layer structure of FIG. 21, and FIG. 22g is a view for explaining a planar shape of the receiving coil shown in FIGS. 22a to 22f.

The resonator 500 according to the embodiment includes an insulating layer 550, a receiving coil 530, and an oscillation coil 520.

In this case, the oscillation coil 520 may have the same structure as the resonance coil 420 described with reference to FIG. 20b. For example, the oscillation coil 520 may include first to fourth portions 521, 522, 523, and 524 having a four-layer structure.

In addition, the first to fourth portions 521, 522, 523, and 524 may be connected in series with each other. In this case, the turn directions of adjacent portions may be opposite to each other so that the directions of currents flowing in the first to fourth portions 521, 522, 523, and 524 are the same.

The insulating layer 550 may have a six-layer structure. That is, the insulating layer 550 may include a first insulating layer 551 disposed on the uppermost portion and a sixth insulating layer 556 disposed on the bottommost portion. In addition, second to fifth insulating layers 552, 553, 554, and 555 may be sequentially disposed between the first insulating layer 551 and the sixth insulating layer 556.

In this case, the upper surfaces of the first to sixth insulating layers 551, 552, 553, 554, 555 and 556 may be divided into a region where an oscillation coil is disposed and a region where a receiving coil is disposed.

For example, an edge region (or an outer region) of an upper surface of the first to sixth insulating layers 551, 552, 553, 554, 555 and 556 may be a first region in which an oscillation coil is disposed. In addition, a second region other than the first region among upper surfaces of the first to sixth insulating layers 551, 552, 553, 554, 555 and 556 may be a region in which a receiving coil is disposed. Preferably, the second region may be a central region of the upper surface of the first to sixth insulating layers 551, 552, 553, 554, 555, 556, and the first region may be an outer region that surrounds the first region.

A first portion 521 of the oscillation coil 520 may be disposed on the first insulating layer 551. Preferably, the first portion 521 of the oscillation coil 520 may be disposed on the first region of the first insulating layer 551.

A second portion 522 of the oscillation coil 520 and a portion of the receiving coil 530 may be disposed on the second insulating layer 552. In this case, the number of receiving coils 530 in the embodiment may be plural. For example, the receiving coil 530 in the embodiment may include a first receiving coil 530a and a second receiving coil 530b.

In addition, the second portion 522 of the oscillation coil 520 and the first portion 531 of the first receiving coil 530a may be disposed in the first region of the second insulating layer 552.

A portion of the receiving coil 530 may be disposed on the third insulating layer 553. Preferably, the second portion 532 of the first receiving coil 530a connected to the first portion 531 may be disposed in the second region of the third insulating layer 553. The first portion 531 and the second portion 532 of the first receiving coil 530a may be interconnected at a plurality of points through vias (not shown). In this case, the first receiving coil 530a including the first portion 531 and the second portion 532 may have a shape in which a sine wave and a cosine wave are mixed.

A portion of the receiving coil 530 may be disposed on the fourth insulating layer 554. Preferably, the first portion 533 of the second receiving coil 530b may be disposed on the second region of the fourth insulating layer 554.

A third portion 523 of the oscillation coil 520 and a second portion 534 of the second receiving coil 530b may be disposed on the fifth insulating layer 555. Preferably, the third portion 523 of the oscillation coil 520 may be disposed in the first region of the upper surface of the fifth insulating layer 555. In addition, the second portion 534 of the second receiving coil 530b may be disposed in the second region of the upper surface of the fifth insulating layer 555.

The second receiving coil 530b may include a first portion 533 and a second portion 534 respectively disposed on the fourth insulating layer 554 and the fifth insulating layer 555. The first portion 533 and the second portion 534 of the second receiving coil 530b may be interconnected at a plurality of points through vias (not shown). In this case, the second receiving coil 530b including the first portion 533 and the second portion 534 may have a shape in which a sine wave and a cosine wave are mixed.

A fourth portion 524 of the oscillation coil 520 may be disposed on the sixth insulating layer 556. Preferably, the fourth portion 524 of the oscillation coil 520 may be disposed in the first region of the sixth insulating layer 556.

Referring to FIG. 22g, each of the first receiving coil 530a and the second receiving coil 530b constituting the receiving coil 530 may have a shape in which a sine wave and a cosine wave are mixed. In addition, each of the first receiving coil 530a and the second receiving coil 530b has the above shape through interconnection of coil patterns disposed on a plurality of layers, respectively. In this case, the sine wave and the cosine wave may include a rising part and a falling part.

In addition, a rising part and a falling part of each of the first receiving coil 530a and the second receiving coil 530b may be disposed on different layers.

For example, a rising part of the first receiving coil 530a may be disposed on the second insulating layer 552, and a falling part of the first receiving coil 530a may be disposed on the third insulating layer 553. That is, the first portion 531 of the first receiving coil 530a disposed on the second insulating layer 552 may be the rising part, and the second portion 532 of the first receiving coil 530a disposed on the third insulating layer 553 may be the falling part.

For example, a rising part of the second receiving coil 530b may be disposed on the fourth insulating layer 554, and a falling part of the second receiving coil 530b may be disposed on the fifth insulating layer 555. That is, the first portion 533 of the second receiving coil 530b disposed on the fourth insulating layer 554 may be the rising part, and the second portion 534 of the second receiving coil 530b disposed on the fifth insulating layer 555 may be the falling part.

Figure 23:
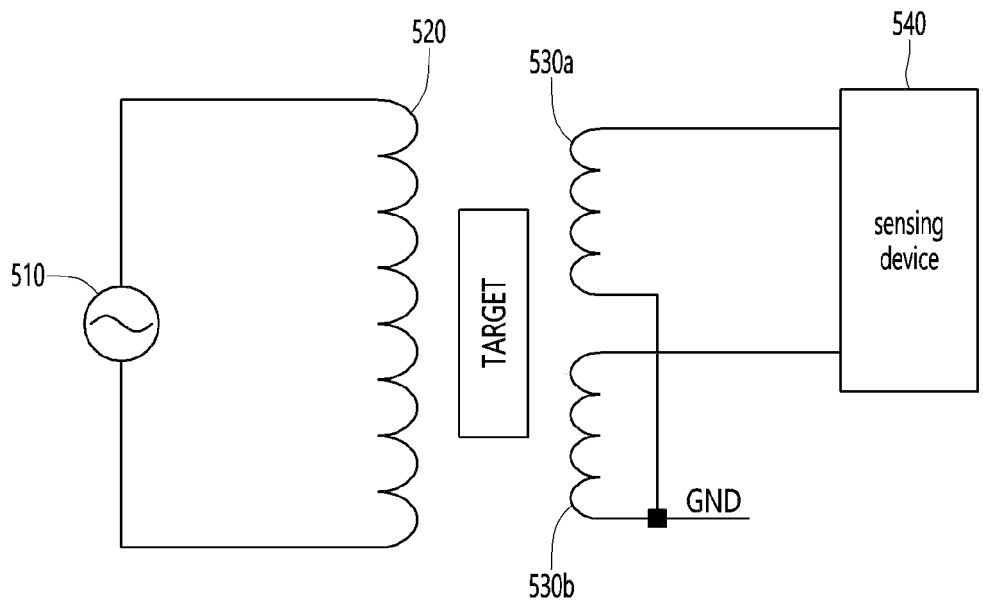
FIG. 23 is a view showing an equivalent circuit diagram of the resonance coil shown in FIG. 21.

FIG. 23 is a view showing an equivalent circuit diagram of the resonance coil shown in FIG. 21.

Referring to FIG. 23, it may be connected to the oscillator 510 of the oscillation coil 520.

In addition, one end of the first receiving coil 530a and one end of the second receiving coil 530b may be connected to each other, and thus may be commonly grounded to the ground.

In addition, the other end of the first receiving coil 530a may be connected to one end of the sensing device 540, and the other end of the second receiving coil 530b may be connected to the other end of the sensing device 540.

Accordingly, the sensing device 540 may mutually subtract and/or add signals sensed from the first receiving coil 530a and the second receiving coil 530b, and may detect the position of the lens assembly based on this.

Figure 24:
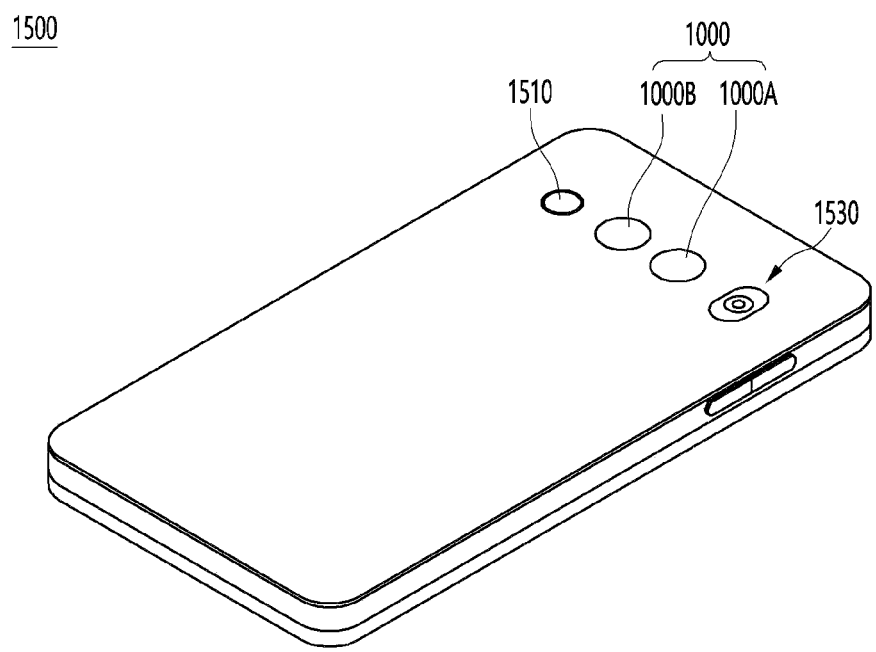
FIG. 24 is a perspective view of a mobile terminal to which a camera module according to an embodiment is applied.

Next, FIG. 24 is a perspective view of a mobile terminal to which a camera module according to an embodiment is applied.

Referring to FIG. 24, the mobile terminal 1500 according to the embodiment may include a camera module 1000, a flash module 1530, and an autofocus device 1510 provided on the rear side.

The camera module 1000 may include an image capturing function and an auto focus function. For example, the camera module 1000 may include an auto-focus function using an image.

The camera module 1000 processes an image frame of a still image or a moving image obtained by an image sensor in a shooting mode or a video call mode. The processed image frame may be displayed on a predetermined display unit and stored in a memory. A camera (not shown) may also be disposed on the front of the mobile terminal body.

For example, the camera module 1000 may include a first camera module 1000A and a second camera module 1000B, and OIS may be implemented together with an AF or zoom function by the first camera module 1000A.

The flash module 1530 may include a light emitting device emitting light therein. The flash module 1530 may be operated by a camera operation of a mobile terminal or a user's control.

The autofocus device 1510 may include one of the packages of the surface light emitting laser device as a light emitting part.

The auto focus device 1510 may include an auto focus function using a laser. The auto focus device 1510 may be mainly used in a condition in which the auto focus function using the image of the camera module 1000 is deteriorated, for example, in proximity of 10 m or less or in a dark environment. The autofocus device 1510 may include a light emitting unit including a vertical cavity surface emitting laser (VCSEL) semiconductor device and a light receiving unit that converts light energy such as a photodiode into electrical energy.

The invention claimed is:

1. A camera module comprising:
   base;
   a guide portion disposed on an inner side of the base;
   a lens assembly moving along the guide portion; and
   a substrate disposed on an outer side of the base,
   wherein the lens assembly includes a conductor disposed under a lower surface thereof,
   wherein the substrate includes a resonance coil disposed in a region facing the lower surface of the lens assembly and overlapping at least a part of the conductor in a direction perpendicular to an optical axis direction in response to movement of the lens assembly, and wherein the resonant coil generates a magnetic field by resonating with a resonance frequency, and sensing a position of the lens assembly based on an inductance value that changes according to a change in a strength of the generated magnetic field.

2. The camera module of claim 1, wherein the guide portion includes:
 a first guide portion disposed on a first inner side of the base; and
 a second guide portion disposed on a second inner side facing the first inner side of the base,
 wherein the lens assembly includes:
  a first lens assembly moving along the first guide portion; and
  a second lens assembly moving along the second guide portion.

3. The camera module of claim 2, wherein the conductor includes:
 a first conductor disposed under a lower surface of the first lens assembly; and
 a second conductor disposed under a lower surface of the second lens assembly;
 wherein the resonance coil includes:
  a first resonance coil overlapping at least a part of the first conductor within a movement range of the first conductor corresponding to a stroke of the first lens assembly; and
  a second resonance coil overlapping at least a part of the second conductor within a movement range of the second conductor corresponding to a stroke of the second lens assembly.

4. The camera module of claim 3, wherein the first resonance coil is disposed on the substrate to be spaced apart from the second resonance coil.

5. The camera module of claim 3, wherein movement range of the first conductor does not overlap the movement range of the second conductor in a direction perpendicular to the optical axis direction.

6. The camera module of claim 3, wherein the first resonance coil is spaced apart from the first conductor by a first distance,
 wherein the second resonance coil is spaced apart from the second conductor by a second distance,
 wherein at least one of the first and second distances is in the range of 1.0 min to 2.0 mm.

7. The camera module of claim 3, wherein at least one of the first and second resonance coils has a thickness of 50 μm or more.

8. The camera module of claim 3, wherein at least one of the first and second resonance coils has a width in the range of 50 um to 1 mm.

9. The camera module of claim 3, wherein at least one of the first and second resonance coils is disposed by turning a plurality of times with a spacing in the range of 50 um to 300 um on the substrate.

10. The camera module of claim 3, wherein at least one of the first and second resonance coils has an outer width that is at least three times greater than an inner width.

11. The camera module of claim 3, wherein the substrate includes a plurality of insulating layers, and
 wherein each of the first and second resonance coils is disposed on the plurality of insulating layers to have a plurality of layer structures.

12. The camera module of claim 11, wherein the plurality of insulating layers includes first and second insulating layers,
 wherein each of the first and second resonance coils includes a first portion disposed on the first insulating layer and disposed by turning in a first direction; and
 a second portion disposed on the second insulating layer, connected to the first portion, and disposed by turning in a second direction opposite to the first direction.

13. The camera module of claim 11, wherein each of the first and second resonance coils includes an oscillation coil and a first and second receiving coil, and
 wherein the oscillation coil is disposed to surround an outer side of the first and second receiving coils.

14. The camera module of claim 13, wherein the plurality of insulating layers includes first to sixth insulating layers,
 wherein each of the first and second resonance coils includes:
  a first portion of the oscillation coil disposed on the first insulating layer and disposed by turning in a first direction;
  a second portion of the oscillation coil disposed on the second insulating layer, connected to the first portion of the oscillation coil, and disposed by turning in a second direction opposite to the first direction;
  a first portion of the first receiving coil disposed on the second insulating layer;
  a second portion of the first receiving coil disposed on the third insulating layer and connected to the first portion of the first receiving coil;
  a first portion of the second receiving coil disposed on the fourth insulating layer;
  a third portion of the oscillation coil disposed on the fifth insulating layer, connected to the second portion of the oscillation coil, and disposed by turning in the first direction;
  a second portion of the second receiving coil disposed on the fifth insulating layer and connected to the first portion of the second receiving coil; and
  a fourth portion of the oscillation coil disposed on the sixth insulating layer, connected to the third portion of the oscillation coil, and disposed by turning in the second direction.

15. The camera module of claim 13, wherein the first receiving coil and the second receiving coil have a shape in which a sine wave and a cosine wave are combined.

16. The camera module of claim 15, wherein the sine wave and the cosine wave include a rising part and a falling part,
 wherein a rising part of the first receiving coil is disposed on a different layer from a falling part of the first receiving coil, and
 wherein a rising part of the second receiving coil s disposed on a different layer from a falling; part of the first receiving coil.

17. The camera module of claim 3, wherein at least one of the first and second conductors has a triangular shape whose width is linearly changed in the direction of the optical axis direction.

18. The camera module of claim 2, wherein the substrate includes:
 a first region disposed on the lower surface of the base;
 a second region disposed on a first outer side corresponding to the first inner side of the base; and
 a third region disposed on a second outer side corresponding to the second inner side of the base.

19. The camera module of claim 18, wherein the first lens assembly includes:
a first lens barrel in which a first lens is disposed, and
a first mover in which a first driving portion is disposed,
wherein the second lens assembly includes:
a second lens barrel in which a second lens is disposed, and
a second mover in which a second driving portion is disposed, and
wherein the substrate includes:
a third driving portion disposed on the second region to face the first driving portion, and
a fourth driving portion disposed on the third region to face the second driving portion.

20. The camera module of claim 19, wherein the first driving portion includes a first magnet,
wherein the second driving portion includes a second magnet,
wherein the first conductor is disposed to be spaced apart from the first magnet in the first lens assembly, and
wherein the second conductor is disposed to be spaced apart from the second magnet in the second lens assembly.

* * * * *